(12) United States Patent
Maeda et al.

(10) Patent No.: US 9,219,920 B2
(45) Date of Patent: Dec. 22, 2015

(54) IMAGE ENCODING METHOD, IMAGE ENCODING APPARATUS, AND RELATED ENCODING MEDIUM, IMAGE DECODING METHOD, IMAGE DECODING APPARATUS, AND RELATED DECODING MEDIUM

(71) Applicant: CANON KABUSHIKI KAISHA, Tokyo (JP)

(72) Inventors: Mitsuru Maeda, Tokyo (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 13/667,865

(22) Filed: Nov. 2, 2012

(65) Prior Publication Data

US 2013/0114724 A1    May 9, 2013

(30) Foreign Application Priority Data

Nov. 7, 2011 (JP) .................... 2011-243938

(51) Int. Cl.
| | | |
|---|---|---|
| *H04N 7/32* | (2006.01) | |
| *H04N 19/174* | (2014.01) | |
| *H04N 19/105* | (2014.01) | |
| *H04N 19/159* | (2014.01) | |
| *H04N 19/176* | (2014.01) | |
| *H04N 19/463* | (2014.01) | |
| *H04N 19/124* | (2014.01) | |

(52) U.S. Cl.
CPC .......... *H04N 19/174* (2013.01); *H04N 19/105* (2013.01); *H04N 19/124* (2013.01); *H04N 19/159* (2013.01); *H04N 19/176* (2013.01); *H04N 19/463* (2013.01)

(58) Field of Classification Search
CPC . H04N 19/105; H04N 19/124; H04N 19/159; H04N 19/174; H04N 19/176; H04N 19/463; H04N 7/50; H04N 7/26244; H04N 7/26085; H04N 7/26079; H04N 7/26271
USPC ...................................... 375/240.03
See application file for complete search history.

(56) References Cited

U.S. PATENT DOCUMENTS

| | | | | |
|---|---|---|---|---|
| 5,675,696 | A  * | 10/1997 | Ishimoto et al. | 386/329 |
| 5,729,295 | A | 3/1998 | Okada | |
| 6,078,694 | A  * | 6/2000 | Takahashi et al. | 382/238 |
| 6,205,177 | B1 * | 3/2001 | Girod et al. | 375/240.14 |
| 6,212,235 | B1 * | 4/2001 | Nieweglowski et al. | 375/240.08 |
| 6,249,318 | B1 * | 6/2001 | Girod et al. | 375/240.16 |
| 6,404,815 | B1 | 6/2002 | Sekiguchi et al. | |
| 6,560,284 | B1 * | 5/2003 | Girod et al. | 375/240.12 |
| 7,751,633 | B1 | 7/2010 | Mukherjee | |
| 8,238,418 | B2 * | 8/2012 | Hong | 375/240.01 |
| 8,675,976 | B2 | 3/2014 | Suzuki et al. | |
| 8,787,459 | B2 * | 7/2014 | Wang | 375/240.13 |
| 8,885,956 | B2 | 11/2014 | Sato | |

(Continued)

OTHER PUBLICATIONS

U.S. Appl. No. 13/667,881, filed Nov. 2, 2012, Masato Shima.

(Continued)

*Primary Examiner* — Shan Elahi
(74) *Attorney, Agent, or Firm* — Canon USA, Inc. I.P. Division

(57) ABSTRACT

The invention is directed to a technique capable of improving an coding efficiency by setting a quantization parameter of a peripheral block that is strongly correlated with a quantization parameter of an encoding target block as a prediction value.

9 Claims, 29 Drawing Sheets

(56) References Cited

U.S. PATENT DOCUMENTS

| | | | |
|---|---|---|---|
| 2001/0053186 | A1 | 12/2001 | Nakaya |
| 2002/0065952 | A1* | 5/2002 | Sullivan et al. ............... 709/328 |
| 2002/0066007 | A1 | 5/2002 | Wise et al. |
| 2002/0163965 | A1* | 11/2002 | Lee et al. ................. 375/240.03 |
| 2004/0125952 | A1* | 7/2004 | Alattar et al. ................. 380/202 |
| 2004/0136458 | A1 | 7/2004 | Dahlhoff et al. |
| 2005/0062746 | A1* | 3/2005 | Kataoka et al. ............... 345/505 |
| 2007/0074266 | A1* | 3/2007 | Raveendran et al. ......... 725/135 |
| 2008/0307198 | A1* | 12/2008 | Kataoka et al. ................. 712/28 |
| 2008/0310504 | A1 | 12/2008 | Ye et al. |
| 2008/0310507 | A1 | 12/2008 | Ye et al. |
| 2008/0310512 | A1 | 12/2008 | Ye et al. |
| 2009/0097548 | A1 | 4/2009 | Karczewicz et al. |
| 2009/0097558 | A1* | 4/2009 | Ye et al. ................... 375/240.13 |
| 2009/0213930 | A1* | 8/2009 | Ye et al. ................... 375/240.03 |
| 2010/0046625 | A1* | 2/2010 | Song et al. ............... 375/240.16 |
| 2010/0074332 | A1 | 3/2010 | Karczewicz et al. |
| 2010/0086049 | A1 | 4/2010 | Ye et al. |
| 2011/0200111 | A1 | 8/2011 | Chen et al. |
| 2013/0101039 | A1* | 4/2013 | Florencio ................. 375/240.16 |

OTHER PUBLICATIONS

JCT-VC of ITU-T SG16 WP3 and ISO/IEC JTC1/SC29/WG11, JCTVC-A205, Test Model under Consideration, Draft007, Jul. 18, 2010, [online] [retrieved on Oct. 12, 2012] <http://wftp3.itu.int/av-arch/jctvc-site/2010_04_A_Dresden/JCTVC-A205.zip/JCTVC-A205_draft007.doc>.

Yoshinori Suzuki et al., JCTVC-D421, Extension of uni-prediction simplification in B slices, Jan. 1, 2011. JCT-VC of ITU-T SG16 WP3 and ISO/IEC JTC1/SC29/WG11, [online] [retrieved on Oct. 12, 2012] <http://phenix.int-evry.fr/jct/doc_end_user/documents/4_Daegu/wg11/JCTVC-D421-v3.zip/JCTVC-D421_r1.doc>.

Ken McCann et al., JCTVC-A124, Samsung's Response to the Call for Proposals on Video Compression Technology, Apr. 11, 2010, JCT-VC of ITU-T SG16 WP3 and ISO/IEC JTC1/SC291WG11 [online] [retrieved on Oct. 12, 2012] <http://wftp3.itu.int/av-arch/jctvc-site/2010_04_A_Dresden/JCTVC-A124.zip/JCTVC-A124.doc>.

Itu-T H.264 (Mar. 2010) Ch. 7.3.2.1.1.1, pp. 40, 41, 44 ITU, Geneva, Switzerland, Mar. 2010.

* cited by examiner

IMAGE ENCODING METHOD, IMAGE ENCODING APPARATUS, AND RELATED ENCODING MEDIUM, IMAGE DECODING METHOD, IMAGE DECODING APPARATUS, AND RELATED DECODING MEDIUM

BACKGROUND OF THE INVENTION

1. Field of the Invention

The claimed invention relates to an image encoding method, an image encoding apparatus, and a related decoding medium, which are using quantization. Further, the claimed invention relates to an image decoding method, an image decoding apparatus, and a related decoding medium, which are using inverse quantization. More specifically, the claimed invention relates to a method for predictive coding of a quantization parameter.

2. Description of the Related Art

H.264/MPEG-4 AVC (hereinafter, referred to as H.264) is conventionally known as a moving image compression and recording method (ISO/IEC14496-10:2004 Information technology—Coding of audio-visual objects—Part 10: Advanced Video Coding). The characteristic features of H.264 includes newly applying a block size of 4×4 pixels for the transform and quantization in addition to a block size of 8×8 pixels used for a conventional encoding method.

In the H.264-based technique, it is feasible to change a quantization parameter for each macro block (16 pixels×16 pixels). In fact, an mb_qp_delta code is usable to change the quantization parameter. More specifically, an mb_qp_delta value (i.e., a difference value) is added to a quantization parameter QPYPREV of a macro block decoded in a block encoding order.

Further, in the H.264-based technique, it is feasible to perform a motion compensation prediction by referring to a plurality of pictures. On the other hand, the pictures that can be referred to in the conventional MPEG-2 and MPEG-4 techniques are limited to only one past picture and/or only one future picture. Two arbitrary reference pictures can be referred to in the motion compensation in H.264 technique. To discriminate respective reference pictures, the first reference picture is referred to as List0 prediction (hereinafter, referred to as L0 prediction) and the second reference picture is referred to List1 prediction (hereinafter, referred to as L1 prediction).

The L0 prediction is mainly used for the forward prediction, in which the prediction is performed using at least one reference picture. The L1 prediction is mainly used for the backward prediction, in which the prediction is performed using at least one reference picture.

In particular, in a case where a processing target picture is a B picture, it is feasible to use a plurality of block prediction modes in these predictions. More specifically, the block prediction modes usable in this case include intra prediction, L0 prediction (i.e., one-way prediction based on only L0 information), L1 prediction (i.e., one-way prediction based on only L1 information), bidirectional prediction (i.e., prediction based on a mean value obtained from L0 and L1 information), and direct mode.

A recent technique, which follows the above-described H.264-based technique, is directed to international standardization of the coding method that intends to further improve the coding efficiency. For example, Joint Collaborative Team on Video Coding (JCT-VC) has been established by ISO/IEC and ITU-T for the purpose of standardizing it as a High Efficiency Video Coding method (hereinafter, referred to as HEVC).

With expanding the target image size, it is intended to use a large block whose size is greater than that of the conventional macro block (16 pixels×16 pixels). According to a contribution (JCT-VC of ITU-T SG16 WP3 and ISO/IEC JTC1/SC29/WG11, JCTVC-A205, Test Model under Construction, Draft007, Jul. 18, 2010), the above-described large-size basic block is referred to as Largest Coding Unit (LCU). The maximum size of the LCU is 64 pixels×64 pixels. The LCU can be further divided into smaller sub blocks, which are respectively referred to as Coding Unit (CU) usable to perform motion compensation, transform, and quantization. An example division method includes obtaining an areal quad tree structure by successively dividing one block into two sub blocks in each of the horizontal and vertical directions.

FIG. 29 illustrates an example areal quad tree structure. A thick-bordered frame 2900 indicates a basic block. To simplify the description, the basic block has a square shape of 64 pixels×64 pixels. The basic block includes two sub blocks 2901 and 2910, each having a square shape of 32 pixels×32 pixels. The basic block further includes eight sub blocks 2902 to 2909, each having a square shape of 16 pixels×16 pixels. Each of these finely divided blocks can be subjected to encoding processing (including transform processing). In this case, the sub blocks 2901, 2902, 2903, 2904, 2905, 2906, 2907, 2908, 2909, and 2910 are sequentially subjected to the encoding processing in this order.

Further, to improve the coding efficiency, the above-described HEVC technique includes a newly proposed LC prediction that can set a reference picture from one list integrating the L1 prediction and the L0 prediction of the H.264-based technique (Yoshinori Suzuki et al., JCTVC-D421, Extension of uni-prediction simplification in B slices, Jan. 1, 2011, JCT-VC of ITU-T SG16 WP3 and ISO/IEC JTC1/SC29/WG11).

Further, the above-described HEVC technique includes the following new proposal to improve the coding efficiency in motion vector coding (Ken McCann et al., JCTVC-A124, Samsung's Response to the Call for Proposals on Video Compression Technology, Apr. 11, 2010, JCT-VC of ITU-T SG16 WP3 and ISO/IEC JTC1/SC29/WG11). A new motion vector prediction method (i.e., advanced motion vector prediction (hereinafter, referred to as AMVP)) in the proposal includes referring to a motion vector of a peripheral block and a motion vector of a temporally preceding basic or sub block. The method further includes selecting a reference of an optimum motion vector from the above-described motion vectors, and encoding and transmitting an index of a block having its prediction vector. In the above-described selection stage, a plurality of same motion vectors is grouped to differentiate the motion vectors from each other. More specifically, to improve the coding efficiency, the method includes limiting the total number of motion vectors to be referred to in such a way as to reduce the size of the index.

According to the HEVC technique, a quantization parameter control is performed for each basic block, which is similar to the macro block of the H.264-based technique. However, in fact, it is desired to perform the quantization parameter control for each sub block in view of image quality.

In this case, to realize the quantization parameter control, the control processing is performed according to the areal quad tree structure. However, the areal quad tree structure illustrated in FIG. 29 is composed of larger sub blocks 2901 and 2910 each having the size of 32 pixels×32 pixels and smaller sub blocks 2902 to 2909 each having the size of 16 pixels×16 pixels. According to the H.264-based technique, the leftmost sub block (see sub block 2906) is located far from the preceding sub block (see sub block 2905). Therefore, if a prediction value is obtained by referring to the most recently encoded quantization parameter and a difference is obtained, the leftmost sub block (see sub block 2906) and the preceding sub block (i.e., sub block 2905) may belong to mutually different objects. In such a case, correctly performing the prediction is difficult.

SUMMARY OF THE INVENTION

An example of the invention is directed to a technique capable of improving an coding efficiency by setting a quantization parameter of a peripheral block that is strongly correlated with a quantization parameter of an encoding target block as a prediction value.

An image encoding method includes inputting image data; dividing the image data into a plurality of blocks; calculating motion compensation information with reference to pictures that temporally precede and follow a picture that includes an encoding target block; storing the motion compensation information of the encoding target block; encoding the motion compensation information to generate motion compensation information encoded data; performing motion compensation processing on the encoding target block according to the calculated motion compensation information to calculate a predicted error; transforming the predicted error to generate transform coefficients; determining a quantization parameter that can be used to quantize the transform coefficients; storing the quantization parameter; determining a quantization parameter prediction value of the stored quantization parameter with reference to the motion compensation information of the encoding target block and the stored motion compensation information of a peripheral block of the encoding target block; encoding the quantization parameter based on the quantization parameter prediction value to calculate quantization parameter encoded data; quantizing the transform coefficients based on the quantization parameter to calculate quantization coefficients; and encoding the quantization coefficients to generate quantization coefficients encoded data.

The image processing apparatus according to an example of the invention can improve the coding efficiency by setting the quantization parameter of a peripheral block that is strongly correlated with the quantization parameter of the encoding target block as the prediction value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An image processing apparatus according to a first exemplary embodiment of the claimed invention is described in detail below with reference to FIG. 1 to FIG. 7. The system configuration described in the following exemplary embodiment is a mere example. The claimed invention is not limited to the illustrated configuration.

Figure 1:
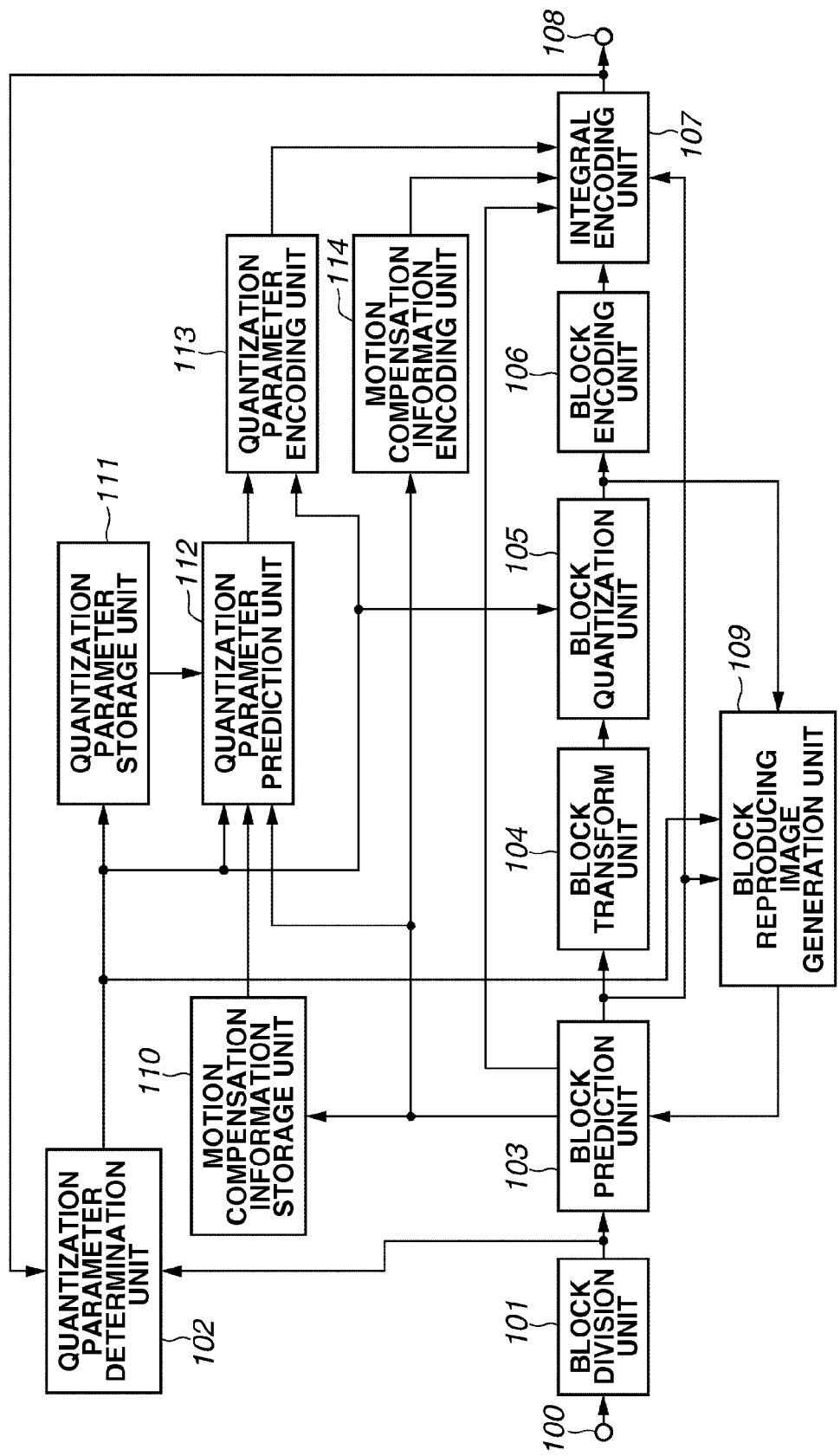
FIG. 1 is a block diagram illustrating an example configuration of an image encoding apparatus according to a first exemplary embodiment.

The present exemplary embodiment is described below as an example based on the H.264-based technique. FIG. 1 is a block diagram illustrating an image encoding apparatus according to the present exemplary embodiment. The image encoding apparatus illustrated in FIG. 1 includes an input terminal 100 via which image data of a moving image can be input. A block division unit 101 can divide an input image into a plurality of blocks. To simplify the description, the input image has an 8-bit pixel value, although the pixel value is not limited to a specific value. Further, the size of each block is fixed to 16 pixels×16 pixels in the image encoding method described in the present exemplary embodiment. However, each block is not limited to a specific shape and a specific size.

A quantization parameter determination unit 102 can determine a quantization parameter of each block. A block prediction unit 103 can perform prediction processing for each of the plurality of blocks divided by the block division unit 101 and can calculate a predicted error of each block. The block prediction unit 103 can divide a picture into an intra-coded picture that is to be subjected only to the intra prediction and an inter-coded picture that is to be subjected only to the motion compensation prediction.

The block prediction unit 103 performs the intra prediction processing for the intra-coded picture. The block prediction unit 103 generates motion compensation information (i.e., information required in the motion compensation) for the inter-coded picture, and performs the motion compensation prediction according to the motion compensation information with reference to the past and future pictures. A plurality of reference pictures can be referred to according to the H.264-based technique. Therefore, the motion compensation information includes a block prediction mode, L0 prediction reference picture, L1 prediction reference picture, L0 prediction motion vector, and L1 prediction motion vector.

A block transform unit 104 can calculate orthogonal transform coefficients through the orthogonal transform performed on the predicted error of each block. The orthogonal transform is not limited to a specific type and can be any one of discrete cosine transform, discrete sine transform, and Hadamard transform.

A block quantization unit 105 can quantize the orthogonal transform coefficients with the quantization parameter determined by the quantization parameter determination unit 102. Quantization coefficients are obtainable through the above-described quantization processing. A block encoding unit 106 can generate quantization coefficients encoded data by encoding the obtained quantization coefficients. In this case, the encoding method is not limited to a specific one. For example, Huffman code or arithmetic code is employable.

A block reproduced image generation unit 109 can reproduce orthogonal transform coefficients by performing an operation that is the opposite of the operation performed by the block quantization unit 105, with the quantization parameter determined by the quantization parameter determination unit 102. Further, the block reproduced image generation unit 109 can reproduce a predicted error by performing an operation that is the opposite of the operation performed by the block transform unit 104, and generate a decoded image of a basic block based on the result of the block prediction unit 103. The reproduced image data is stored and is usable when the block prediction unit 103 performs the prediction.

A motion compensation information storage unit 110 can store motion compensation information of each block when it is generated by the block prediction unit 103. A quantization parameter storage unit 111 can store the quantization parameter determined by the quantization parameter determination unit 102.

A quantization parameter prediction unit 112 can predict a quantization parameter determined by the quantization parameter determination unit 102 based on the quantization parameter of the peripheral block stored in the quantization parameter storage unit 111. The quantization parameter prediction unit 112 can input the motion compensation information of the peripheral block stored in the motion compensation information storage unit 110 and the motion compensation information of an encoding target block from the block prediction unit 103.

The quantization parameter prediction unit 112 can calculate a quantization parameter prediction value based on a comparison between the input motion compensation information of the peripheral block and the motion compensation information of the encoding target block. Further, the quantization parameter prediction unit 112 can calculate a difference between the quantization parameter prediction value and a quantization parameter of the encoding target block.

A quantization parameter encoding unit 113 can generate a quantization parameter encoded data by encoding the quantization parameter difference calculated by the quantization parameter prediction unit 112. In this case, the encoding method is not limited to a specific one. For example, Huffman code or arithmetic code is employable. A motion compensation information encoding unit 114 can generate a motion compensation information encoded data by encoding the motion compensation information generated for each block.

An integral encoding unit 107 can generate a code (e.g., header information). Further, the integral encoding unit 107 can encode a coding mode determined for each block. Further, the integral encoding unit 107 can generate a bit stream by integrating the quantization parameter encoded data generated by the quantization parameter encoding unit 113, the motion compensation information encoded data generated by the motion compensation information encoding unit 114, and the quantization coefficients encoded data generated by the block encoding unit 106. The bit stream generated by the integral encoding unit 107 can be output to an external device via an output terminal 108.

An example of an image encoding operation that can be performed by the above-described image encoding apparatus is described in detail below.

If the block division unit 101 receives image data of a single picture via the input terminal 100, the block division unit 101 divides the input image data into a plurality of basic blocks each having the size of 16 pixels×16 pixels. Then, each of the divided image data is output to the quantization parameter determination unit 102 and to the block prediction unit 103.

The block prediction unit 103 generates a predicted error by performing a prediction with reference to the reproduced image stored in the block reproduced image generation unit 109. The block prediction unit 103 supplies the generated predicted error to the block transform unit 104 and the block reproduced image generation unit 109. If the processing target is an intra-coded picture, the block prediction unit 103 calculates a predicted error by performing intra prediction processing based on a peripheral block of the encoding target stored in the block reproduced image generation unit 109.

If the processing target is an inter-coded picture, the block prediction unit 103 determines whether to perform intra encoding or perform inter encoding for each block and outputs the result as a block coding mode. The block coding mode is encoded by the integral encoding unit 107. The encoded block coding mode is output as a header of the block.

In a case where the encoding target block is subjected to intra encoding, the block prediction unit 103 performs intra prediction processing in the same manner as the above-described intra-coded picture. Further, in a case where the encoding target block is subjected to inter encoding, the block prediction unit 103 performs motion compensation processing to perform the prediction and the encoding.

The block prediction unit 103 searches for a block closest to the encoding target block with reference to a plurality of reference pictures that are in the past and future of an encoding target picture. Then, the block prediction unit 103 acquires a motion vector. Further, the block prediction unit 103 selects a block prediction mode based on the search result. The block prediction unit 103 outputs motion compensation information (i.e., the block prediction mode, the reference pictures, and the motion vector), for each block, to each of the motion compensation information storage unit 110, the quantization parameter prediction unit 112, and the motion compensation information encoding unit 114.

The motion compensation information storage unit 110 stores the received motion compensation information on a block-by-block basis so that the quantization parameter prediction unit 112 can refer to the stored information. The motion compensation information encoding unit 114 generates the motion compensation information encoded data according to the H.264-based technique. The generated motion compensation information encoded data is output to the integral encoding unit 107.

On the other hand, the quantization parameter determination unit 102 sets a target bit rate with reference to the code amount of the bit stream output from the integral encoding unit 107, and determines a quantization parameter with reference to the characteristics of the block input from the block division unit 101. The determined quantization parameter is output to the block quantization unit 105, the quantization parameter storage unit 111, the quantization parameter prediction unit 112, and the block reproduced image generation unit 109. The quantization parameter storage unit 111 stores the quantization parameter of each block. Thus, the quantization parameter prediction unit 112 can refer to the quantization parameter stored in quantization parameter storage unit 111.

The quantization parameter prediction unit 112 receives the motion compensation information of a peripheral block from the motion compensation information storage unit 110 and receives a peripheral quantization parameter from the quantization parameter storage unit 111. Regarding the encoding target block, the quantization parameter prediction unit 112 receives the motion compensation information from the block prediction unit 103 and receives the quantization parameter from the quantization parameter determination unit 102.

The quantization parameter prediction unit 112 compares the motion compensation information of the peripheral block with the motion compensation information of the encoding target block and selects the quantization parameter from the peripheral block as a quantization parameter prediction value. The quantization parameter prediction unit 112 obtains a difference between the quantization parameter prediction value and the quantization parameter of the encoding target block.

Figure 4:
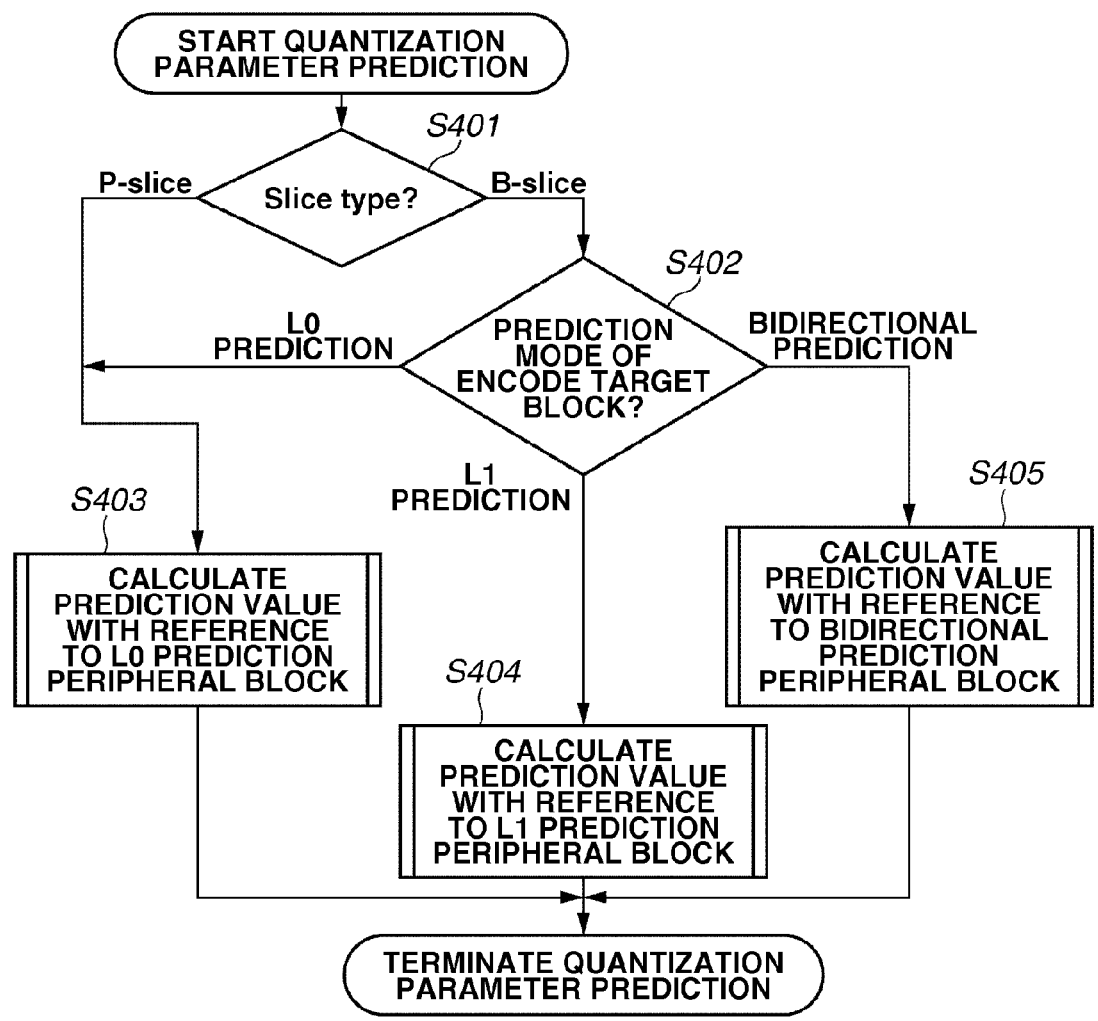
FIG. 4 is a flowchart illustrating an example of quantization parameter prediction processing according to the first exemplary embodiment.
Figure 5:
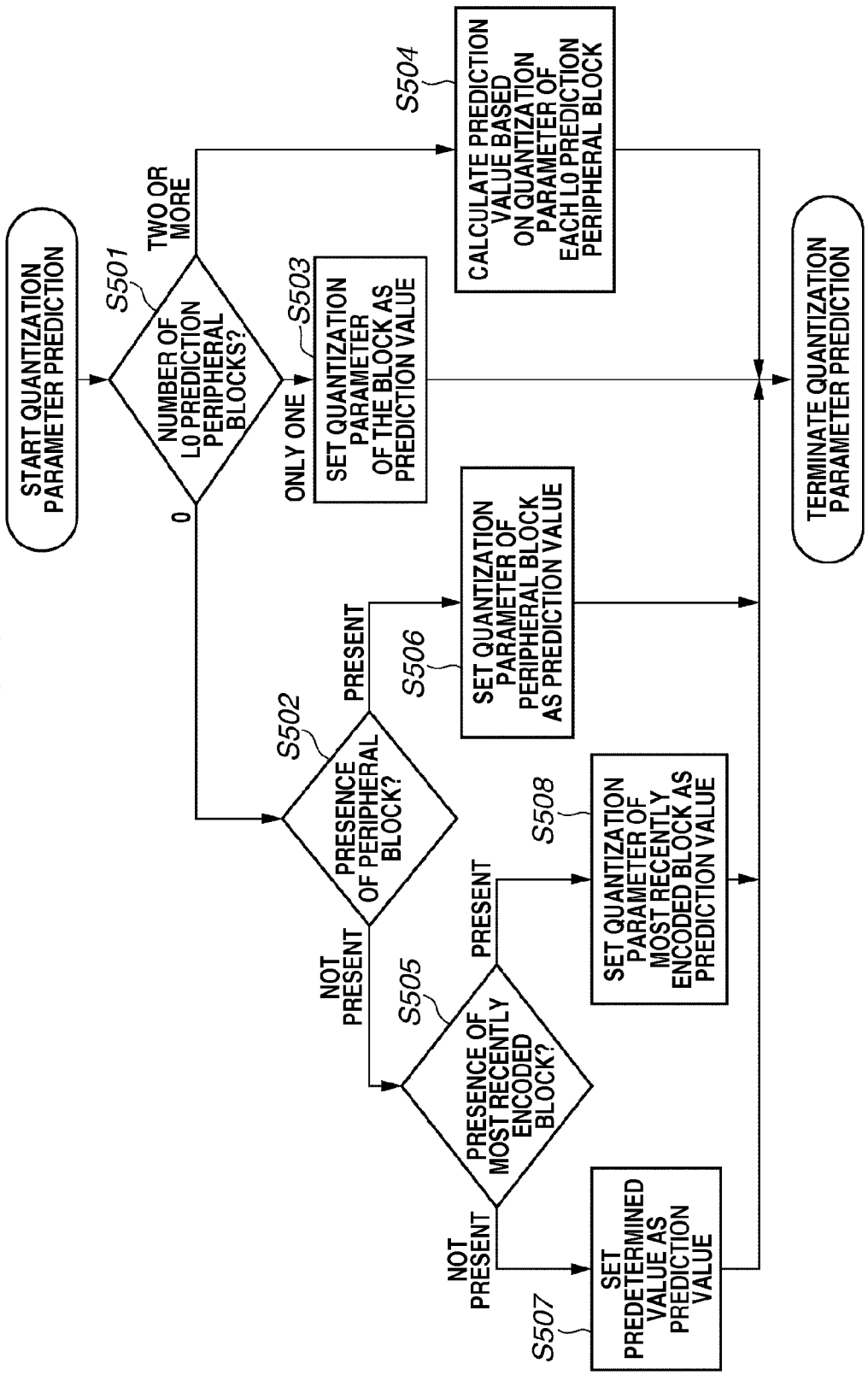
FIG. 5 is a flowchart illustrating an example of quantization parameter prediction processing according to the first and second exemplary embodiments.
Figure 6:
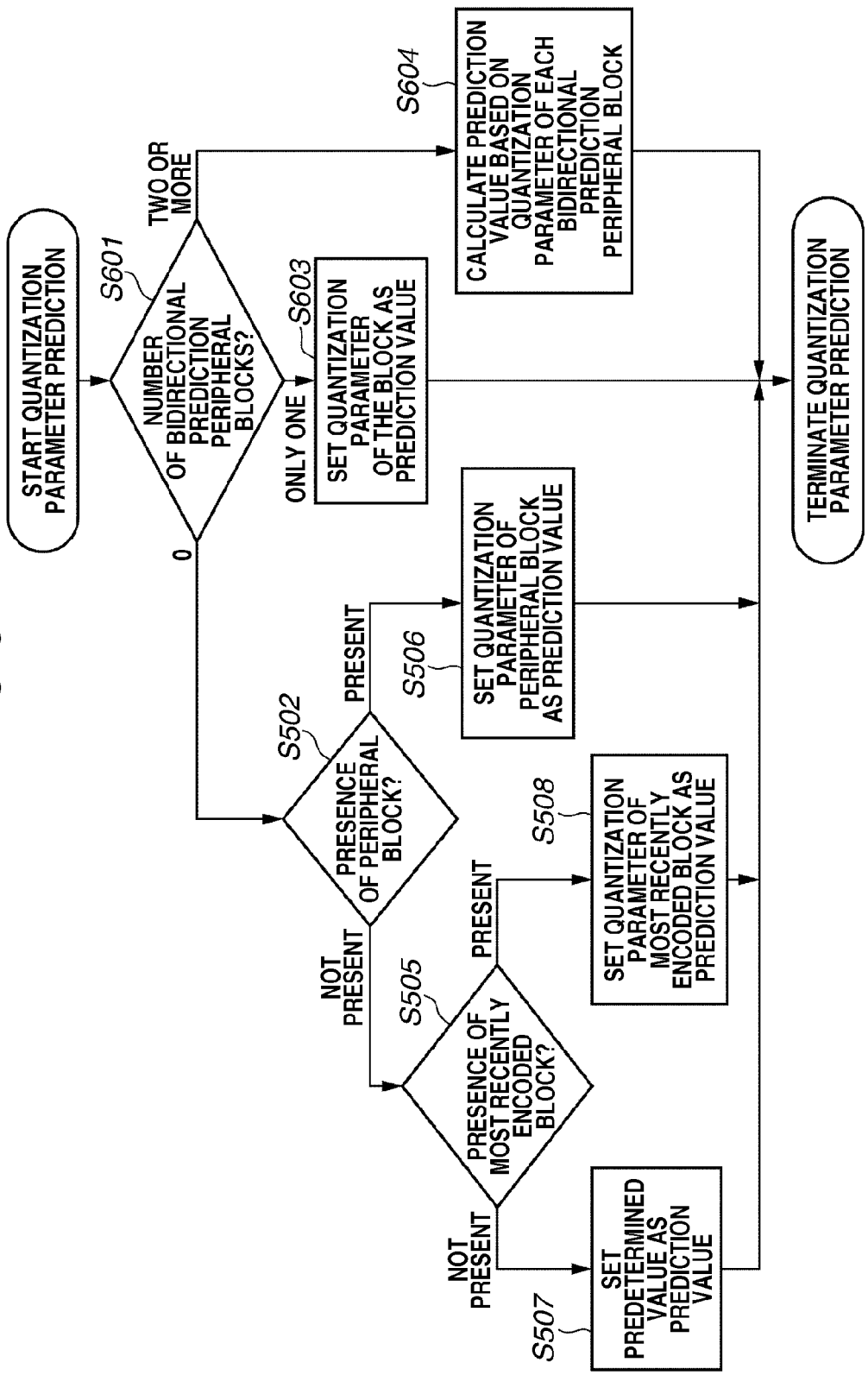
FIG. 6 is a flowchart illustrating an example of the quantization parameter prediction processing according to the first and second exemplary embodiments.

FIG. 4 through FIG. 6 are flowcharts illustrating an example of quantization parameter prediction value calculation processing that can be performed by the quantization parameter prediction unit 112 according to the first exemplary embodiment. In the flowchart illustrated in FIG. 4, in step S401, the quantization parameter prediction unit 112 determines whether the slice including the target block is a P slice or a B slice. If it is determined that the slice including the target block is the P slice, the operation proceeds to step S403. If it is determined that the slice including the target block is the B slice, the operation proceeds to step S402.

In step S402, the quantization parameter prediction unit 112 checks the prediction mode of the encoding target block. If it is determined that the block prediction mode of the encoding target block is the L0 prediction, the operation proceeds to step S403. If it is determined that the block prediction mode of the encoding target block is the L1 prediction, the operation proceeds to step S404. If it is determined that the block prediction mode of the encoding target block is the remaining one (i.e., the bidirectional prediction), the operation proceeds to step S405.

In step S403, the quantization parameter prediction unit 112 calculates the quantization parameter prediction value with reference to a peripheral block of the encoding target block whose block prediction mode is the L0 prediction. If the slice including the target block is the P slice, the L0 prediction is used. Therefore, the operation of the quantization parameter prediction unit 112 proceeds to step S403 to calculate the quantization parameter prediction value.

FIG. 5 is a flowchart illustrating an example of the quantization parameter prediction value calculation processing to be performed in step S403 when the block prediction mode of the encoding target block is the L0 prediction. In the present exemplary embodiment, the peripheral block is any one of three blocks, which are located adjacently on the upper side, the upper left side, and the left side of the encoding target block, although the total number of the peripheral blocks is not limited to three and can be another value.

In step S501, the quantization parameter prediction unit 112 checks the number of peripheral blocks that are currently subjected to the L0 prediction. If it is determined that there is not any peripheral block that is currently subjected to the L0 prediction, the operation proceeds to step S502. If it is determined that there is only one peripheral block that is currently subjected to the L0 prediction, the operation proceeds to step S503. If it is determined that there is a plurality of (2 or 3 in the present exemplary embodiment) peripheral blocks that are currently subjected to the L0 prediction block, the operation proceeds to step S504.

In step S502, the quantization parameter prediction unit 112 determines whether a peripheral block is present. If a peripheral block that can be referred to at the edge of the slice or the picture is not present, the operation proceeds to step S505. If at least one peripheral block is present, the operation proceeds to step S506.

In step S505, the quantization parameter prediction unit 112 determines whether there is any block (not limited to the peripheral block) that has been most recently encoded. If it is determined that the most recently encoded block is not present, the operation proceeds to step S507. If it is determined that the most recently encoded block is present, the operation proceeds to step S508.

In step S507, namely, there is not any peripheral block that can be referred to and the most recently encoded block is not present. In this case, the quantization parameter prediction unit 112 sets a predetermined value as the quantization parameter prediction value. In step S508, namely, there is not any peripheral block that can be referred to and the most recently encoded block is present. In this case, the quantization parameter prediction unit 112 sets a quantization parameter of the most recently encoded block as the quantization parameter prediction value.

In step S506, namely, there is at least one peripheral block that can be referred to. In this case, the quantization parameter prediction unit 112 calculates the quantization parameter prediction value based on the quantization parameter of each peripheral block that can be referred to. The quantization parameter prediction value calculation method is not limited to a specific method. An appropriate method, e.g., calculating a mean quantization parameter value of peripheral blocks, calculating a median, or setting a quantization parameter of the left block as the quantization parameter prediction value, is employable to calculate the quantization parameter prediction value.

In step S503, namely, the only one peripheral block is currently subjected to the L0 prediction. In this case, the quantization parameter prediction unit 112 sets the quantization parameter of the only one L0 prediction peripheral block as the quantization parameter prediction value. In step S504, namely, a plurality of peripheral blocks is currently subjected to the L0 prediction. In this case, the quantization parameter prediction unit 112 calculates the quantization parameter prediction value based on the quantization parameter of each peripheral block that is currently subjected to the L0 prediction.

The quantization parameter prediction value calculation method is not limited to a specific method. An appropriate method, e.g., calculating a mean quantization parameter value of peripheral blocks, calculating a median, or setting a quantization parameter of the left block as the quantization parameter prediction value, is employable to calculate the quantization parameter prediction value.

Referring back to FIG. 4, in step S404, the quantization parameter prediction unit 112 calculates the quantization parameter prediction value with reference to a peripheral block of the encoding target block whose block prediction mode is the L1 prediction. Processing to be performed in step S404 is similar to the processing performed in step S403 except that the L0 prediction is replaced by the L1 prediction. Therefore, the description thereof is not repeated. In step S405, the quantization parameter prediction unit 112 calculates the quantization parameter prediction value with reference to a peripheral block of the encoding target block whose block prediction mode is the bidirectional prediction.

FIG. 6 is a flowchart illustrating an example of the quantization parameter prediction value calculation processing to be performed in step S405 when the block prediction mode of the encoding target block is the bidirectional prediction. In FIG. 6, steps that are functionally similar to those of the flowchart illustrated in FIG. 5 are denoted by the same step numbers and the descriptions thereof are not repeated. Further, in the present exemplary embodiment, the peripheral block is any one of three blocks, which are located adjacently on the upper side, the upper left side, and the left side of the encoding target block, although the peripheral blocks are not limited to these blocks.

In step S601, the quantization parameter prediction unit 112 checks the number of peripheral blocks that are currently subjected to the bidirectional prediction. If it is determined that there is not any peripheral block that is currently subjected to the bidirectional prediction, the operation proceeds to step S502. If it is determined that only one peripheral block is currently subjected to the bidirectional prediction, the operation proceeds to step S603. If it is determined that a plurality of (2 or 3 in the present exemplary embodiment) peripheral blocks is currently subjected to the bidirectional prediction, the operation proceeds to step S604.

In step S603, namely, the only one peripheral block is currently subjected to the bidirectional prediction. In this case, the quantization parameter prediction unit 112 sets the quantization parameter of the only one bidirectional prediction peripheral block as the quantization parameter prediction value. In step S604, namely, a plurality of peripheral blocks is currently subjected to the bidirectional prediction. In this case, the quantization parameter prediction unit 112 calculates the quantization parameter prediction value based on the quantization parameter of each peripheral block that is currently subjected to the bidirectional prediction.

The quantization parameter prediction value calculation method is not limited to a specific method. An appropriate method, e.g., calculating a mean quantization parameter value of peripheral blocks, calculating a median, or setting a quantization parameter of the left block as the quantization parameter prediction value, is employable to calculate the quantization parameter prediction value.

Referring back to FIG. 1, the quantization parameter encoding unit 113 calculates a difference value between the quantization parameter prediction value calculated by the quantization parameter prediction unit 112 and the quantization parameter of the encoding target block determined by the quantization parameter determination unit 102. Subsequently, the quantization parameter encoding unit 113 encodes the calculated difference value and generates a quantization parameter encoded data based on the H.264 format. The generated quantization parameter encoded data is output to the integral encoding unit 107.

The integral encoding unit 107 generates a code, such as header information relating to the sequence, picture, or each slice. The integral encoding unit 107 receives the block coding mode generated by the block prediction unit 103 and the motion compensation information encoded data generated by the motion compensation information encoding unit 114 for each block. Similarly, the integral encoding unit 107 receives the quantization parameter encoded data generated by the quantization parameter encoding unit 113 and the quantization coefficients encoded data generated by the block encoding unit 106. The integral encoding unit 107 encodes and integrates the input data and generates an encoded data on the block-by-block basis. The generated encoded data is output, as a bit stream, to an external device via the output terminal 108.

Figure 2:
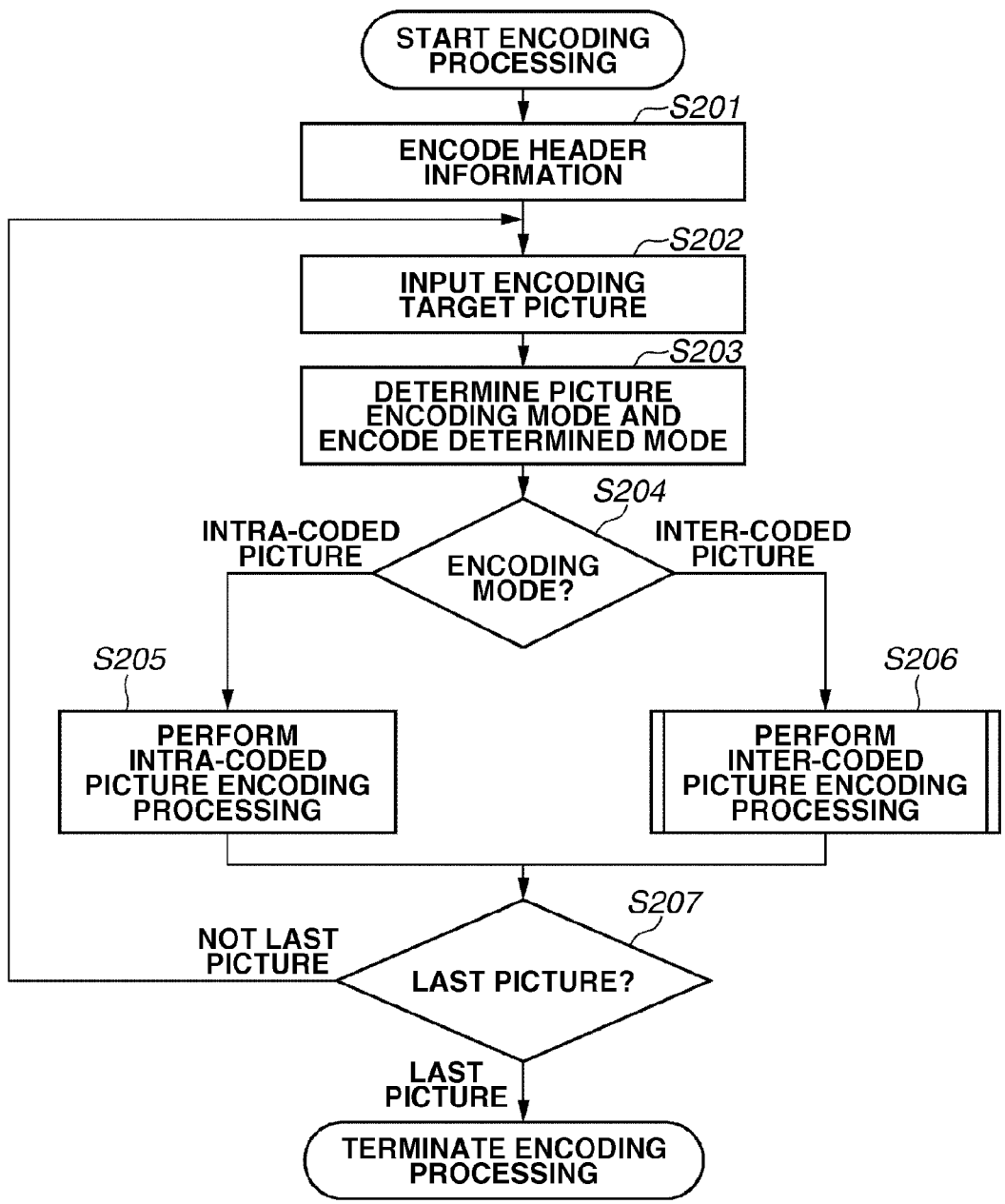
FIG. 2 is a flowchart illustrating an example of image encoding processing that can be performed by the image encoding apparatus according to the first exemplary embodiment.

FIG. 2 is a flowchart illustrating an example of image encoding processing that can be performed by the image encoding apparatus according to the first exemplary embodiment.

In step S201, the image encoding apparatus generates and outputs header information (e.g., an encoding target sequence). In step S202, the image encoding apparatus inputs an encoding target picture. In step S203, the image encoding apparatus determines the picture encoding mode, which is the intra-coded picture or the inter-coded picture. The determined picture encoding mode is encoded as picture mode encoded data and integrated with the encoded data of a picture header before it is output.

In step S204, the image encoding apparatus checks the encoding mode of the picture. If it is determined that the encoding mode of the picture is the intra-coded picture, the operation proceeds to step S205. If it is determined that the encoding mode of the picture is the inter-coded picture, the operation proceeds to step S206.

In step S205, namely, the input picture is the intra-coded picture. The image encoding apparatus generates a bit stream through the intra prediction, transform, quantization, and encoding processing. In step S206, the image encoding apparatus generates a bit stream by performing inter-coded picture encoding processing (i.e., the encoding based on motion compensation) on the input picture.

Figure 3:
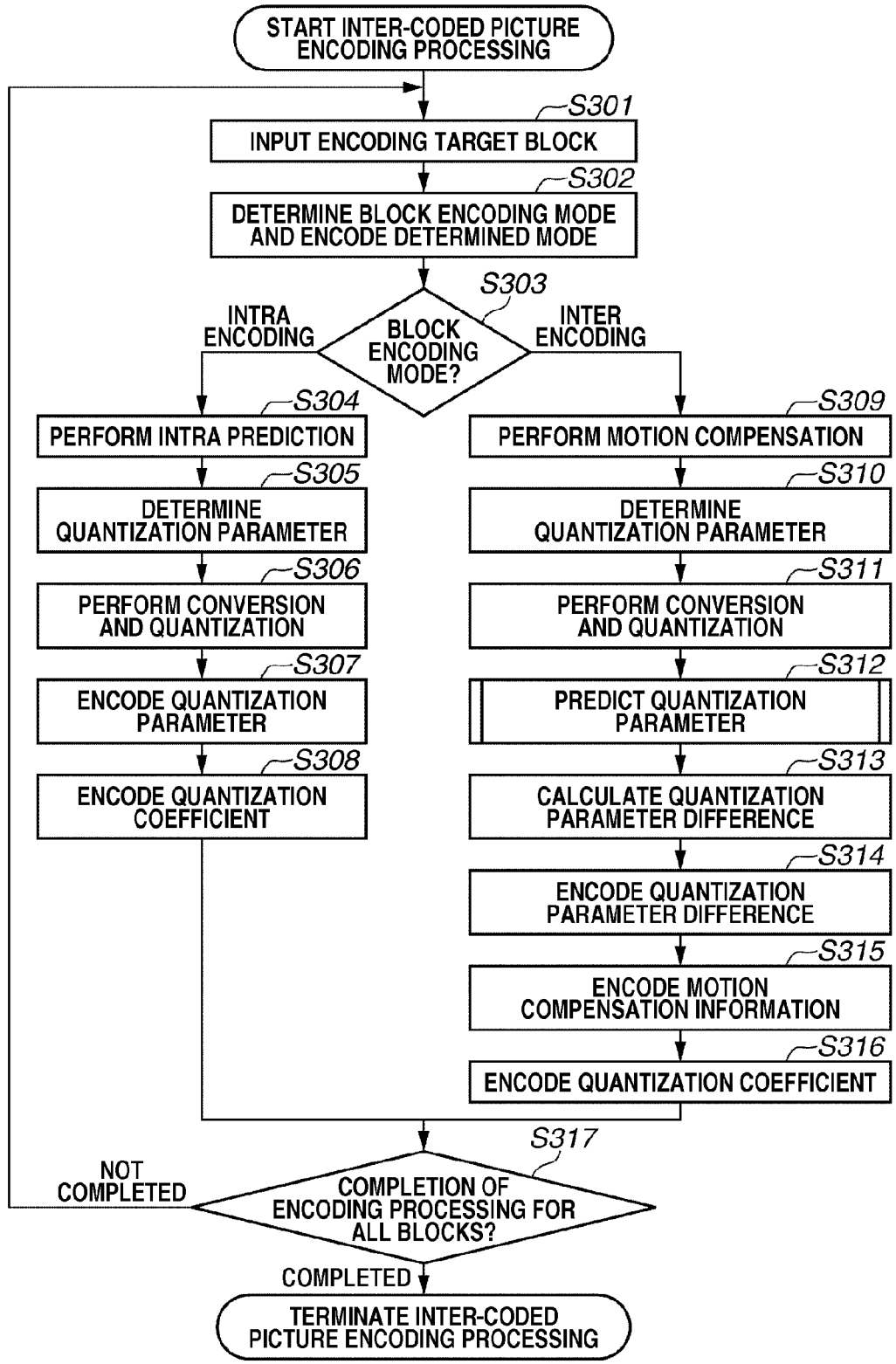
FIG. 3 is a flowchart illustrating an example of inter-coded picture encoding processing that can be performed by the image encoding apparatus according to the first exemplary embodiment.

FIG. 3 is a flowchart illustrating details of the inter-coded picture encoding processing to be performed in step S206. In step S301, the image encoding apparatus inputs an encoding target block of the encoding target picture. In step S302, the image encoding apparatus determines a block coding mode with reference to characteristics of the encoding target block and a correlation with another picture.

The block coding mode is the intra coding (i.e., the encoding based on the intra prediction) or the inter encoding (i.e., the encoding based on the motion compensation). If a motion vector is calculated in a case where the correlation with another picture is calculated in the block coding mode determination, the calculated motion vector is stored. The determined block coding mode is encoded and a block coding mode encoded data is generated.

In step S303, the image encoding apparatus checks the block coding mode determined in step S302. If it is determined that the block coding mode is the intra encoding, the operation proceeds to step S304. If it is determined that the block coding mode is not the intra encoding, the operation proceeds to step S308. In step S304, the image encoding apparatus performs intra prediction processing based on a pixel value of the peripheral block and calculates a predicted error. In step S305, the image encoding apparatus determines a quantization parameter with reference to characteristics of the predicted error and the amount of the generated code.

In step S306, the image encoding apparatus transforms the predicted error calculated in step S304 and calculates quantization coefficients by performing quantization processing on the quantization parameter determined in step S305. In step S307, the image encoding apparatus encodes the quantization parameter determined in step S305 and adds the encoded quantization parameter to the bit stream. In step S308, the image encoding apparatus encodes the quantization coefficients calculated in step S306 and adds the encoded quantization coefficients to the bit stream. Subsequently, the operation proceeds to step S316.

On the other hand, if in step S303 the block prediction mode of the encoding target block is the inter prediction, then in step S309, the image encoding apparatus searches for a vector moving in the encoding target block and other reference picture. The image encoding apparatus determines motion compensation information of the block prediction mode, the motion vector, and the reference picture, based on the search result. The image encoding apparatus performs motion compensation prediction and calculates a predicted error. The determined motion compensation information can be later used in referring to motion compensation information of a peripheral block. Therefore, the determined motion compensation information is stored for a while.

In step S310, the image encoding apparatus determines a quantization parameter with reference to characteristics of the predicted error and the amount of the generated code. The determined quantization parameter can be later used in referring to the quantization parameter of a peripheral block. Therefore, the determined quantization parameter is stored for a while. In step S311, the image encoding apparatus transforms the predicted error calculated in step S309 and calculates quantization coefficients by performing quantization based on the quantization parameter determined in step S310.

In step S312, the image encoding apparatus predicts the quantization parameter to encode the quantization parameter and calculates the quantization parameter prediction value. In the present exemplary embodiment, the image encoding apparatus performs processing of the flowcharts illustrated in FIG. 4 to FIG. 6 to calculate the quantization parameter prediction value.

In step S313, the image encoding apparatus calculates a difference value between the calculated quantization parameter prediction value and the quantization parameter of the encoding target block. In step S314, the image encoding apparatus generates a quantization parameter encoded data by encoding the quantization parameter difference value calculated in step S313.

In step S315, the image encoding apparatus encodes the motion compensation information determined in step S309 and generates a motion compensation information encoded data. In step S316, the image encoding apparatus generates quantization coefficients encoded data by encoding the quantization coefficient calculated in step S311.

In step S317, the image encoding apparatus determines whether the encoding processing for all blocks of the encoding target picture has been completed. If it is determined that the encoding processing for all blocks is not yet completed, the operation returns to step S301 to restart the above-described encoding processing for the next block. If it is determined that the encoding processing for all blocks has been completed, the image encoding apparatus terminates the inter-coded picture encoding processing.

Referring back to FIG. 2, in step S207, the image encoding apparatus determines whether the encoding target picture is the last picture of the sequence. If it is determined that the encoding target picture is not the last picture, the operation returns to step S202 to restart the above-described encoding processing for the next picture. If it is determined that the encoding target picture is the last picture, the image encoding apparatus terminates the encoding processing.

The image encoding apparatus having the above-described configuration and performing the above-described operations can encode a quantization parameter difference value on the block-by-block basis according to the motion compensation information (in particular, according to the block prediction mode). The image encoding apparatus according to the present exemplary embodiment can improve the coding efficiency, for an object included in an encoding target, by predicting the quantization parameter according to the motion in the object and a block prediction mode that represents the motion.

Further, in the present exemplary embodiment, the H.264-based technique has been described as an example of the encoding technique. However, the claimed invention is not limited to the above-described example. Any other encoding method (e.g., MPEG-1, MPEG-2, or MPEG-4) is employable. In the present exemplary embodiment, the L0 prediction, the L1 prediction, and the bidirectional prediction have been described as examples of the prediction usable in the H.264-based technique. However, it is useful to add a direct mode and a skip mode as the block prediction mode.

Figure 7:
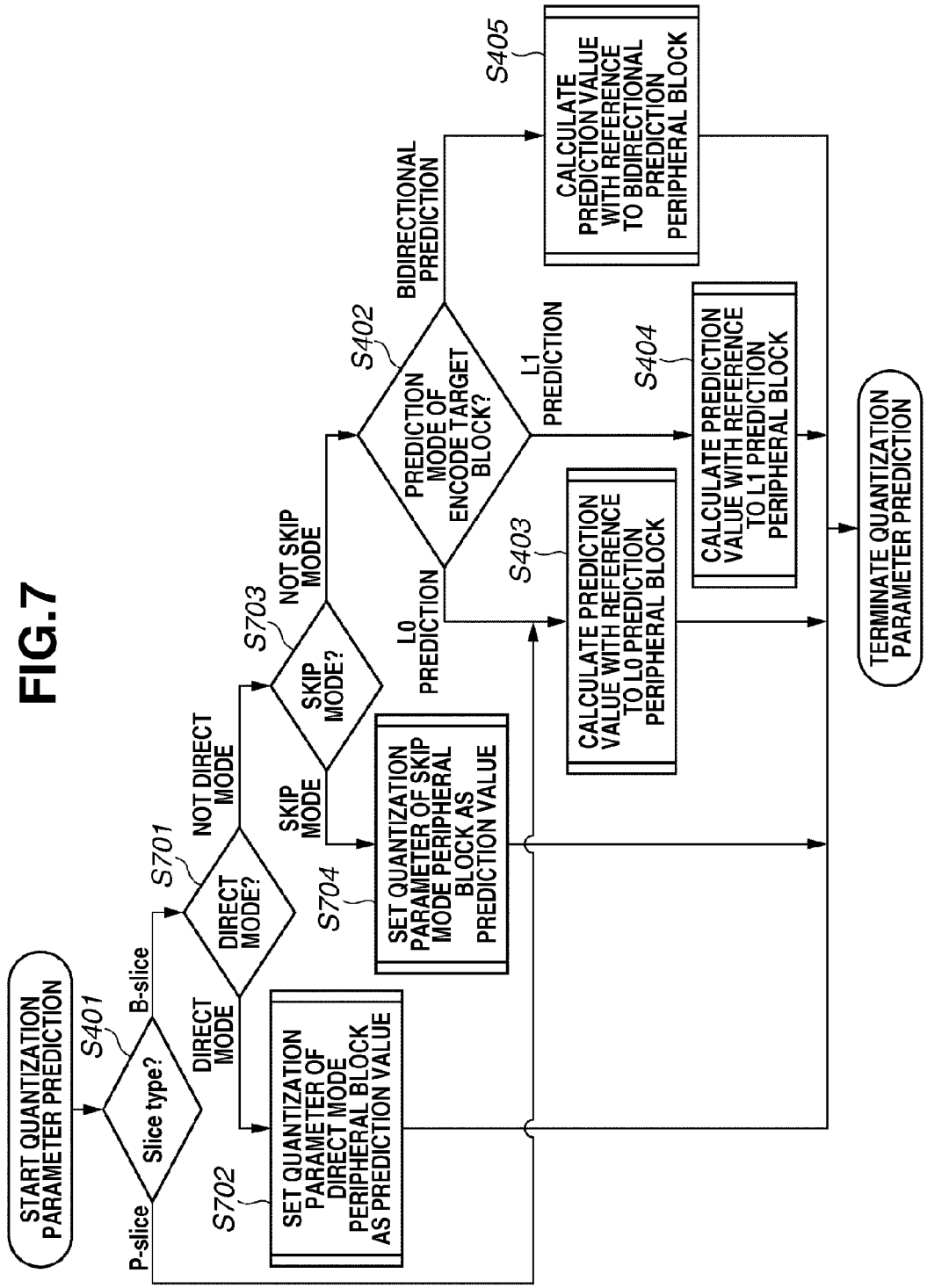
FIG. 7 is a flowchart illustrating another example of the quantization parameter prediction processing according to the first and second exemplary embodiments.

FIG. 7 is a flowchart illustrating an example of quantization parameter prediction processing including the above-described modes. In FIG. 7, steps that are functionally similar to those of the flowchart illustrated in FIG. 4 are denoted by the same step numbers and the descriptions thereof are not repeated.

In step S701, if it is determined that the encoding target block is subjected to the direct mode, the operation proceeds to step S702. If it is determined that the encoding target block is not the direct mode, the operation proceeds to step S703. In step S702, the quantization parameter prediction unit 112 calculates the quantization parameter prediction value with reference to a direct mode encoded peripheral block of the encoding target block. Although the method is not limited to a specific method, it is useful to perform processing similar to the processing illustrated in FIG. 5 although the L0 prediction may be replaced by the direct mode.

In step S703, if it is determined that the encoding target block is subjected to the skip mode, the operation proceeds to step S704. If it is determined that the encoding target block is not the skip mode, the operation proceeds to step S402. In step S704, the quantization parameter prediction unit 112 calculates the quantization parameter prediction value with reference to a direct mode encoded peripheral block of the encoding target block. Although the method is not limited to a specific method, it is useful to perform processing similar to the processing illustrated in FIG. 5 although the L0 prediction may be replaced by the direct mode.

Through the above-described operation, the image encoding apparatus can calculate the quantization parameter prediction value in each of the direct mode or the skip mode to realize precise encoding processing.

In the present exemplary embodiment, although the direct mode and the skip mode are independently separated, the method is not limited to this. However, when the encoding target block is either the direct mode or the skip mode, it is also useful to calculate the quantization parameter prediction value based on a direct mode or skip mode peripheral block.

Further, the block prediction mode determination order is not limited to the above-described example. For example, it is useful to determine whether a prediction block is the bidirectional prediction. If there is a non-bidirectional prediction block, it is also useful to determine whether the prediction block is the L0 prediction or the L1 prediction.

Further, the peripheral blocks are not limited to the above-described examples. It is useful to add the upper right block as one of the peripheral blocks. Further, it is also useful to designate a non-adjacent block as one of the peripheral blocks. Further, the block prediction mode is not limited to the above-described examples. For example, it is also useful that the block prediction mode can include a prediction mode that refers to two or more pictures.

An image processing apparatus according to a second exemplary embodiment of the claimed invention is described in detail below with reference to FIG. 1 through FIG. 3, FIG. 8, and FIG. 9. The system configuration described in the following exemplary embodiment is a mere example. The claimed invention is not limited to the described configuration.

An exemplary embodiment of the claimed invention is described in detail below with reference to the drawing. An image encoding apparatus according to the present exemplary embodiment has a configuration similar to that illustrated in FIG. 1. In the present exemplary embodiment, the image encoding apparatus is described below based on the HEVC technique.

According to the method of the present exemplary embodiment, the block division unit 101 divides a basic block having a square shape of 16 pixels×16 pixels into sub blocks each having a square shape of 8 pixels×8 pixels. However, the shape and size of each block are not limited to the illustrated examples. The block prediction unit 103 performs prediction processing according to the block prediction mode of the HEVC technique. According the HEVC technique, the block prediction mode is any one of the L0 prediction, the LC prediction, and the bidirectional prediction.

If the slice including a target block is the P slice, the image encoding apparatus performs the L0 prediction. If the block prediction mode is the LC prediction, the LC prediction reference picture and the LC prediction motion vector constitute the motion compensation information. The LC prediction is an integration of the L0 prediction and the L1 prediction. If the block prediction mode is the bidirectional prediction, similar to the H.264-based technique, the block prediction mode, the L0 prediction reference picture, the L1 prediction reference picture, the L0 prediction motion vector, and the L1 prediction motion vector constitute the motion compensation information.

An example of an image encoding operation that can be performed by the above-described image encoding apparatus is described in detail below.

If the block division unit 101 receives image data of a single picture via the input terminal 100, the block division unit 101 divides the input image data into a plurality of basic blocks each having the size of 16 pixels×16 pixels. Further, if necessary, the block division unit 101 divides the basic block into a plurality of sub blocks each having the size of 8 pixels×8 pixels. Each of the divided image data is output to the quantization parameter determination unit 102 and the block prediction unit 103.

The block prediction unit 103 performs prediction processing for each input basic block or for each input sub block. The block prediction unit 103 generates a predicted error and motion compensation information, which result from the prediction. The block encoding unit 106 encodes the predicted error, after it is subjected to the orthogonal transform and quantization, according to the HEVC format and generates quantization coefficients encoded data. The motion compensation information encoding unit 114 encodes the motion compensation information according to the HEVC format and generates a motion compensation information encoded data.

Figure 8:
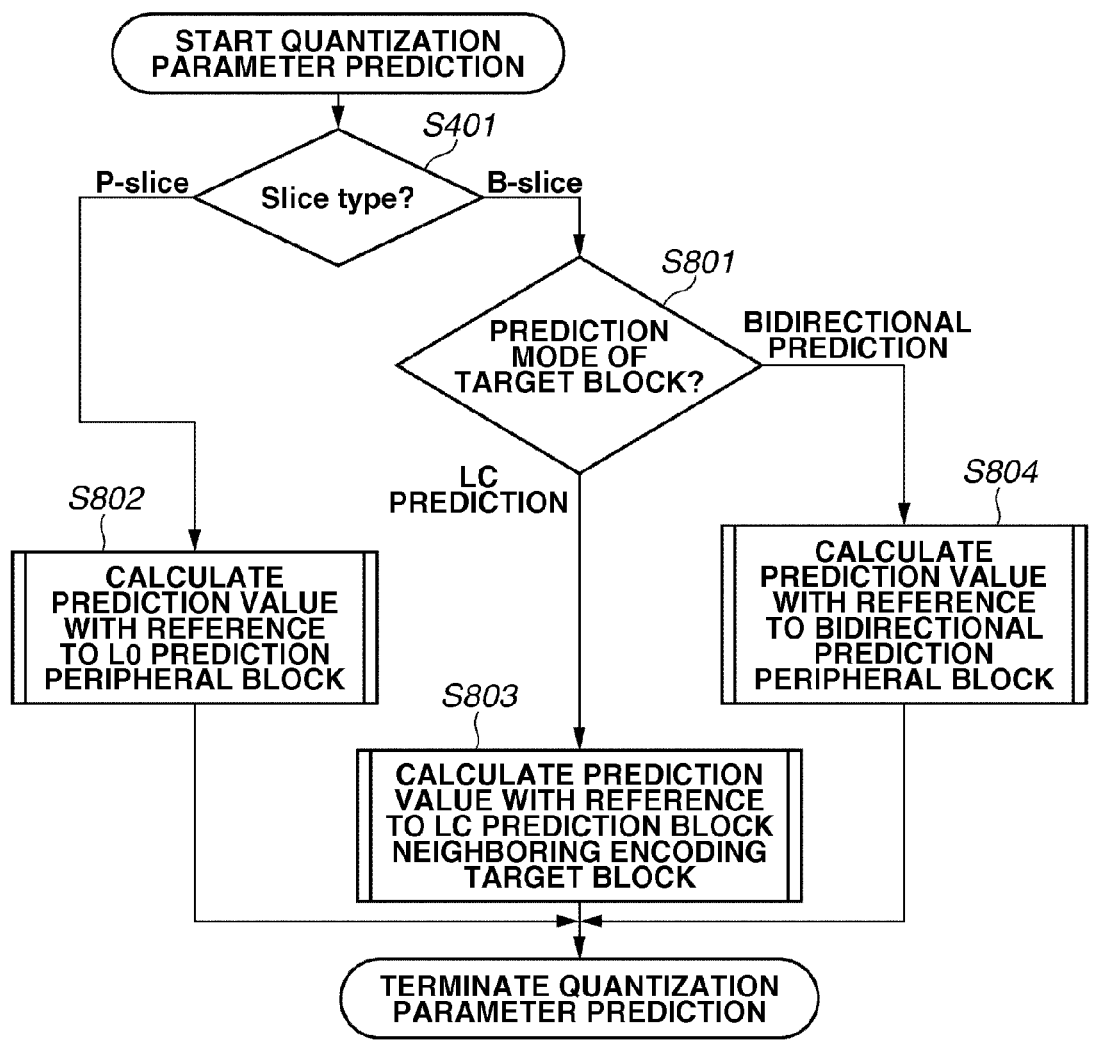
FIG. 8 is a flowchart illustrating an example of the quantization parameter prediction processing according to the first and second exemplary embodiments.

The quantization parameter prediction unit 112 performs quantization prediction value calculation processing illustrated in FIG. 8. In FIG. 8, steps that are functionally similar to those of the flowchart illustrated in FIG. 4 are denoted by the same step numbers and the descriptions thereof are not repeated.

In step S401, the quantization parameter prediction unit 112 determines whether the slice including the target block is the P slice or the B slice. If it is determined that the slice including the target block is the P slice, the operation proceeds to step S802. If it is determined that the slice including the target block is the B slice, the operation proceeds to step S801.

In step S801, the quantization parameter prediction unit 112 checks the block prediction mode of the encoding target block. If it is determined that the block prediction mode of the encoding target block is the LC prediction, the operation proceeds to step S803. If it is determined that the block prediction mode of the encoding target block is the bidirectional prediction, the operation proceeds to step S804. In step S803, the quantization parameter prediction unit 112 calculates the quantization parameter prediction value with reference to a peripheral block of the encoding target block whose block prediction mode is the LC prediction.

Figure 9:
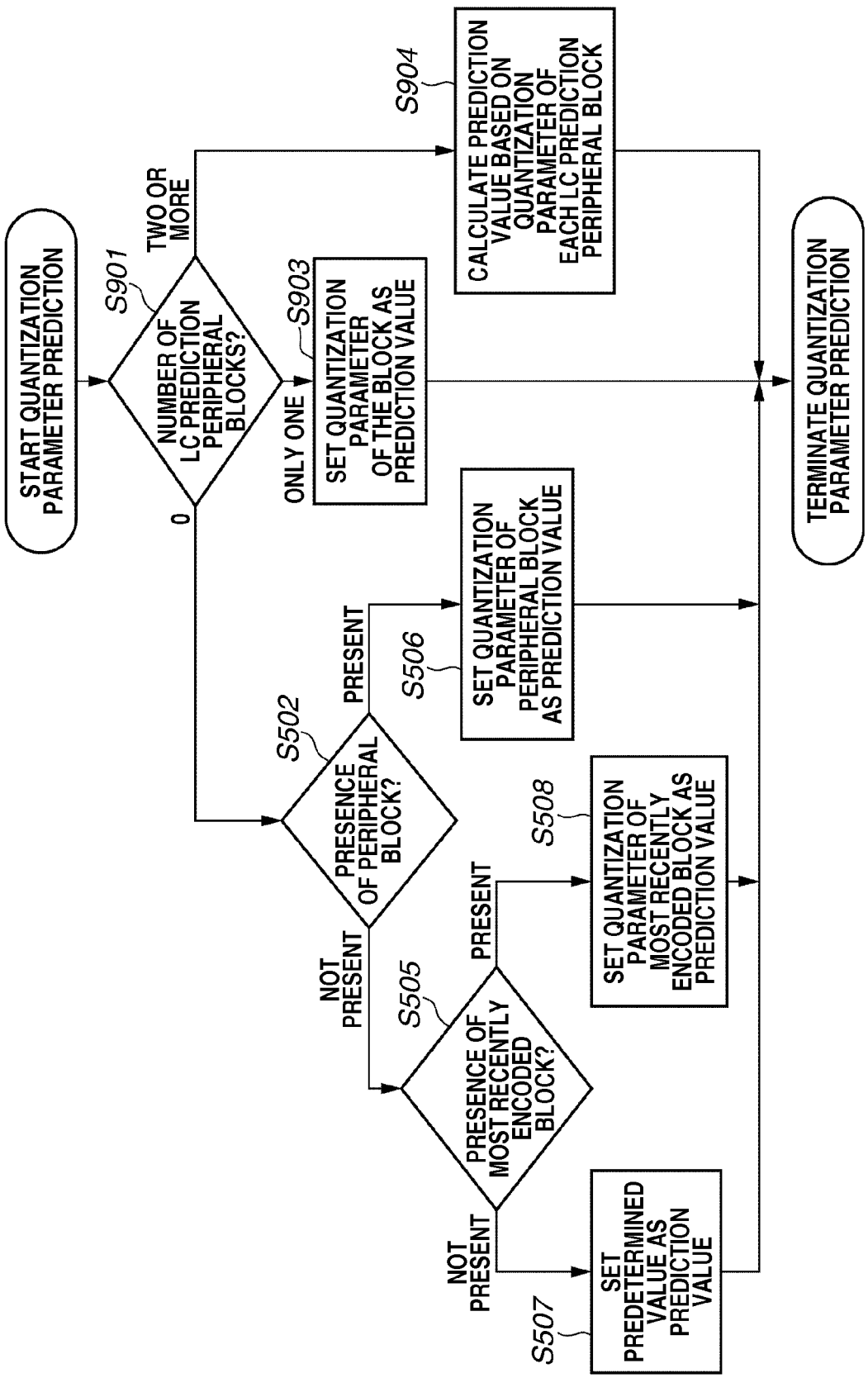
FIG. 9 is a flowchart illustrating an example of the quantization parameter prediction processing according to the first and second exemplary embodiments.

FIG. 9 is a flowchart illustrating an example of the quantization parameter prediction value calculation processing to be performed in step S803 when the block prediction mode of the encoding target block is the LC prediction. In FIG. 9, steps that are functionally similar to those of the flowchart illustrated in FIG. 5 are denoted by the same step numbers and the descriptions thereof are not repeated.

In step S901, the quantization parameter prediction unit 112 checks the number of peripheral blocks that are currently subjected to the LC prediction. In this case, the peripheral blocks include at least one peripheral block that has the square shape of 16 pixels×16 pixels and at least one peripheral block that has the square shape of 8 pixels×8 pixels, although any block size is employable.

If it is determined that there is not any peripheral block that is currently subjected to the LC prediction, the operation proceeds to step S502. If it is determined that only one peripheral block is currently subjected to the LC prediction, the operation proceeds to step S903. If it is determined that a plurality of (2 to 5 in the present exemplary embodiment) peripheral blocks is currently subjected to the LC prediction, the operation proceeds to step S904.

In step S903, namely, only one peripheral block is currently subjected to the LC prediction. In this case, the quantization parameter prediction unit 112 sets the quantization parameter of the only one LC prediction peripheral block as the quantization parameter prediction value. In step S904, namely, a plurality of peripheral blocks (regardless of block size) is currently subjected to the LC prediction. In this case, the quantization parameter prediction unit 112 calculates the quantization parameter prediction value based on the quantization parameter of the LC prediction peripheral block.

The quantization parameter prediction value calculation method is not limited to a specific method. An appropriate method, e.g., calculating a mean quantization parameter value of peripheral blocks, calculating a median, or setting a quantization parameter of the left block as the quantization parameter prediction value, is employable to calculate the quantization parameter prediction value.

Referring back to FIG. 8, in step S802, namely, the P slice is currently subjected to the L0 prediction. In this case, the quantization parameter prediction unit 112 calculates the quantization parameter prediction value of the encoding target block with reference to a peripheral block that is currently subjected to the L0 prediction. Detailed processing to be performed in step S802 is similar to the processing performed in step S803 (illustrated in FIG. 9), although the LC prediction is replaced by the L0 prediction. Therefore, the description thereof is not repeated.

In step S804, the quantization parameter prediction unit 112 calculates the quantization parameter prediction value with reference to a peripheral block of the encoding target block, whose block prediction mode is the bidirectional prediction. The bidirectional prediction is described below with reference to the flowchart of the quantization parameter prediction value calculation processing to be performed in step S405 illustrated in FIG. 6 when the block prediction mode of the encoding target block is the bidirectional prediction. In FIG. 6, there is a plurality of block sizes with respect to the configuration of the peripheral block, and the number of blocks that can be referred to is different. The rest of the processing is basically similar.

Referring back to FIG. 4, the quantization parameter prediction unit 112 terminates the quantization parameter prediction value calculation processing. Further, a flowchart illustrating image encoding processing is similar to the flowcharts illustrated in FIG. 2 and FIG. 3. Therefore, the description thereof is not repeated.

The image encoding apparatus having the above-described configuration and performing the above-described operations can encode a sub block quantization parameter difference value according to the motion compensation information that corresponds to the HEVC technique (in particular, according to the block prediction mode). Thus, further improving the coding efficiency is feasible.

In the present exemplary embodiment, the image encoding apparatus selects a peripheral block of the encoding target block regardless of block size. However, the method for selecting blocks is not limited to the above-described example. For example, it is also useful to select a limited number of peripheral blocks. For example, the size of the upper left block can be 16 pixels×16 pixels or 8 pixels×8 pixels. Any upper left block, if its lower right pixel adjoins the upper right edge of the encoding target block, is selectable.

Further, if the upper block is a sub block of 8 pixels×8 pixels and the encoding target block is 16 pixels×16 pixels, only one sub block that adjoins the upper right edge of the encoding target block is selectable. The above-described relationship can be similarly applied to the left block. Further, the peripheral blocks are not limited to the above-described examples. For example, it is useful to add the upper right block as one of the peripheral blocks. It is also useful to designate a non-adjacent block as one of the peripheral blocks.

An image processing apparatus according to a third exemplary embodiment of the claimed invention is described in detail below with reference to FIG. 10 through FIG. 12. The system configuration described in the present exemplary embodiment is a mere example. The claimed invention is not limited to the described configuration.

An exemplary embodiment of the claimed invention is described in detail below with reference to the attached drawing. FIG. 10 is a block diagram illustrating an image decoding apparatus according to the present exemplary embodiment. The image decoding apparatus according to the third exemplary embodiment can decode the bit stream generated by the image encoding apparatus described in the first exemplary embodiment.

Figure 10:
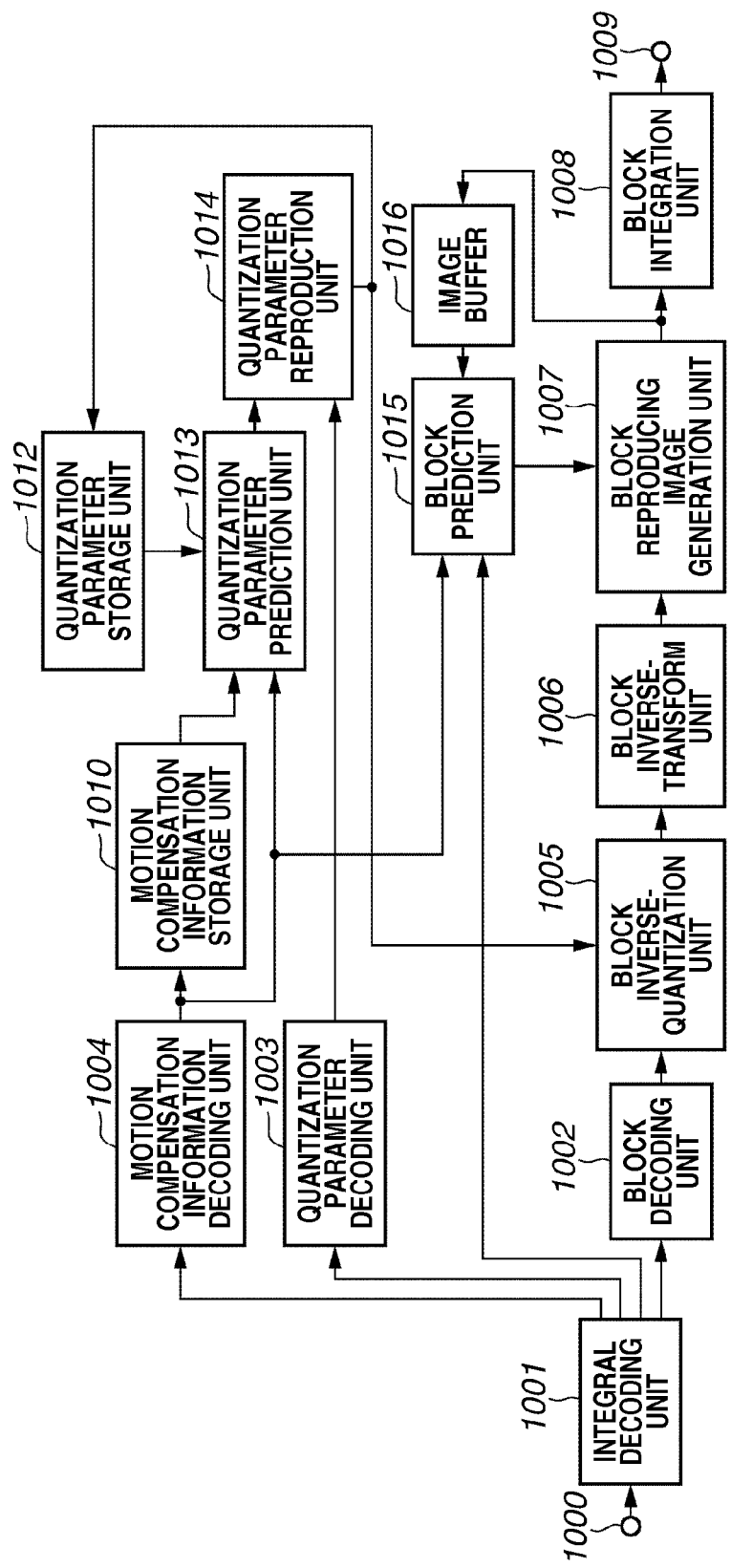
FIG. 10 is a block diagram illustrating an example configuration of an image decoding apparatus according to the second exemplary embodiment.

The image decoding apparatus illustrated in FIG. 10 includes an input terminal 1000 via which encoded data of a moving image can be input. An integral decoding unit 1001 can perform a decoding operation that is opposite to the above-described operation of the integral encoding unit 107 illustrated in FIG. 1 in the first exemplary embodiment. More specifically, the integral decoding unit 1001 can decode a header and divide each encoded data. The quantization coefficients encoded data is output to a block decoding unit 1002. The quantization parameter encoded data is output to the quantization parameter decoding unit 1003. The motion compensation information encoded data is output to a motion compensation information decoding unit 1004.

Further, the integral decoding unit 1001 can decode the intra prediction related information and outputs the decoded intra prediction related information to a block prediction unit 1015. The block decoding unit 1002 can perform a decoding operation that is opposite to the above-described operation of the block encoding unit 106 illustrated in FIG. 1 in the first exemplary embodiment. More specifically, the block decoding unit 1002 can decode the quantization coefficients encoded data and reproduce the quantization coefficients.

A quantization parameter decoding unit 1003 can perform a decoding operation that is opposite to the above-described operation of the quantization parameter encoding unit 113 illustrated in FIG. 1 in the first exemplary embodiment. More specifically, the quantization parameter decoding unit 1003 can reproduce the quantization parameter difference value. A motion compensation information decoding unit 1004 can perform a decoding operation that is opposite to the above-described operation of the motion compensation information encoding unit 114 illustrated in FIG. 1 in the first exemplary embodiment. The motion compensation information decoding unit 1004 can reproduce the motion compensation information by decoding the motion compensation information encoded data.

A motion compensation information storage unit 1010 can store the decoded motion compensation information on the block-by-block basis, similar to the motion compensation information storage unit 110 illustrated in FIG. 1 in the first exemplary embodiment. A quantization parameter storage unit 1012 can store the decoded quantization parameter on the block-by-block basis, similar to the quantization parameter storage unit 111 illustrated in FIG. 1 in the first exemplary embodiment. A quantization parameter prediction unit 1013 can calculate the quantization parameter prediction value of a decoding target block based on the motion compensation information of the encoding target block, the motion compensation information of a peripheral block, and the quantization parameter.

A quantization parameter reproduction unit 1014 can reproduce the quantization parameter based on the quantization parameter prediction value and the quantization parameter difference value decoded by the quantization parameter decoding unit 1003. A block inverse quantization unit 1005 can perform a quantization operation that is opposite to the above-described operation of the block quantization unit 105 illustrated in FIG. 1 in the first exemplary embodiment. The block inverse quantization unit 1005 can reproduce the orthogonal transform coefficients from quantization coefficient, according to the reproduced quantization parameter.

A block inverse transform unit 1006 can perform a transform operation that is opposite to the above-described operation of the block transform unit 104 illustrated in FIG. 1 in the first exemplary embodiment. The block inverse transform unit 1006 can reproduce the predicted error from the orthogonal transform coefficients. The block prediction unit 1015 can perform prediction processing with reference to decoded image data of a decoding target picture and a reference picture, based on the reproduced motion compensation information, regarding the inter-coded picture.

A block reproduced image generation unit 1007 can generate a decoded image based on the block data predicted by the block prediction unit 1015 and the predicted error reproduced by the block inverse transform unit 1006. A block integration unit 1008 can reproduce a picture by integrating a plurality of images decoded on the block-by-block basis. An image buffer 1016 can store the reproduced picture. The reproduced picture can be output to an external device via an output terminal 1009.

An image decoding operation that can be performed by the above-described image decoding apparatus is described in detail below.

If the integral decoding unit 1001 receives a bit stream of a single picture via the input terminal 1000, the integral decoding unit 1001 decodes the sequence header and the picture header and separates the quantization coefficients encoded data, the quantization parameter encoded data, and the motion compensation information encoded data. The separated quantization coefficients encoded data is output to the block decoding unit 1002. The quantization parameter encoded data is output to the quantization parameter decoding unit 1003. The motion compensation information encoded data is output to the motion compensation information decoding unit 1004.

The motion compensation information decoding unit 1004 decodes the motion compensation information encoded data and reproduces the motion compensation information of the decoding target block. The reproduced motion compensation information includes the block prediction mode, the reference picture, and the motion vector. The decoded motion compensation information is stored in the motion compensation information storage unit 1010 on the block-by-block basis.

Further, the quantization parameter decoding unit 1003 decodes the received quantization parameter encoded data and reproduces the quantization parameter difference value. The quantization parameter prediction unit 1013 receives peripheral motion compensation information from the motion compensation information storage unit 1010 and the motion compensation information of the decoding target block from the motion compensation information decoding unit 1004.

The quantization parameter prediction unit 1013 calculates the quantization parameter prediction value based on the input motion compensation information with reference to a peripheral block quantization parameter stored in the quantization parameter holding unit 1012. The quantization parameter prediction value calculation to be performed by the quantization parameter prediction unit 1013 is similar to that described with reference to FIG. 4 to FIG. 6 in the first exemplary embodiment and the description thereof is not repeated.

The quantization parameter reproduction unit 1014 receives the quantization parameter difference value from the quantization parameter decoding unit 1003 and the quantization parameter prediction value from the quantization parameter prediction unit 1013. The quantization parameter reproduction unit 1014 adds the input values to reproduce a quantization parameter. The reproduced quantization parameter is output to the block inverse quantization unit 1005 and to the quantization parameter holding unit 1012. The quantization parameter holding unit 1012 stores the quantization parameter on the block-by-block basis, so that the stored quantization parameter can be used when a peripheral block is referred to.

Further, the quantization coefficients encoded data separated by the integral decoding unit 1001 is output to the block decoding unit 1002. The block decoding unit 1002 decodes the input quantization coefficients encoded data of each block to reproduce the quantization coefficients. The reproduced quantization coefficients are output to the block inverse quantization unit 1005. The block inverse quantization unit 1005 performs inverse quantization with reference to the quantization parameter reproduced by the quantization parameter reproduction unit 1014 and reproduces the orthogonal transform coefficients. The reproduced orthogonal transform coefficients are output to the block inverse transform unit 1006. The block inverse transform unit 1006 reproduces the predicted error by inverse orthogonal transforming of the input coefficients.

On the other hand, if the decoding target block is the inter prediction, the motion compensation information is output to the block prediction unit 1015. If the decoding target block is the intra prediction, the intra prediction information is input from the integral decoding unit 1001. The block prediction unit 1015 calculates a prediction value by performing prediction on the image data stored in the image buffer 1016 according to the input information. The block prediction unit 1015 outputs the calculated prediction value to the block reproduced image generation unit 1007.

The block reproduced image generation unit 1007 generates a decoded image for each block based on the predicted error input from the block inverse transform unit 1006 and the prediction value input from the block prediction unit 1015. The reproduced image data is stored in the image buffer 1016 and can be later used in the prediction. Simultaneously, the reproduced image data is output to the block integration unit 1008. The block integration unit 1008 integrates the reproduced image data with other data for each picture and outputs the decoded picture via the input terminal 1009.

Figure 11:
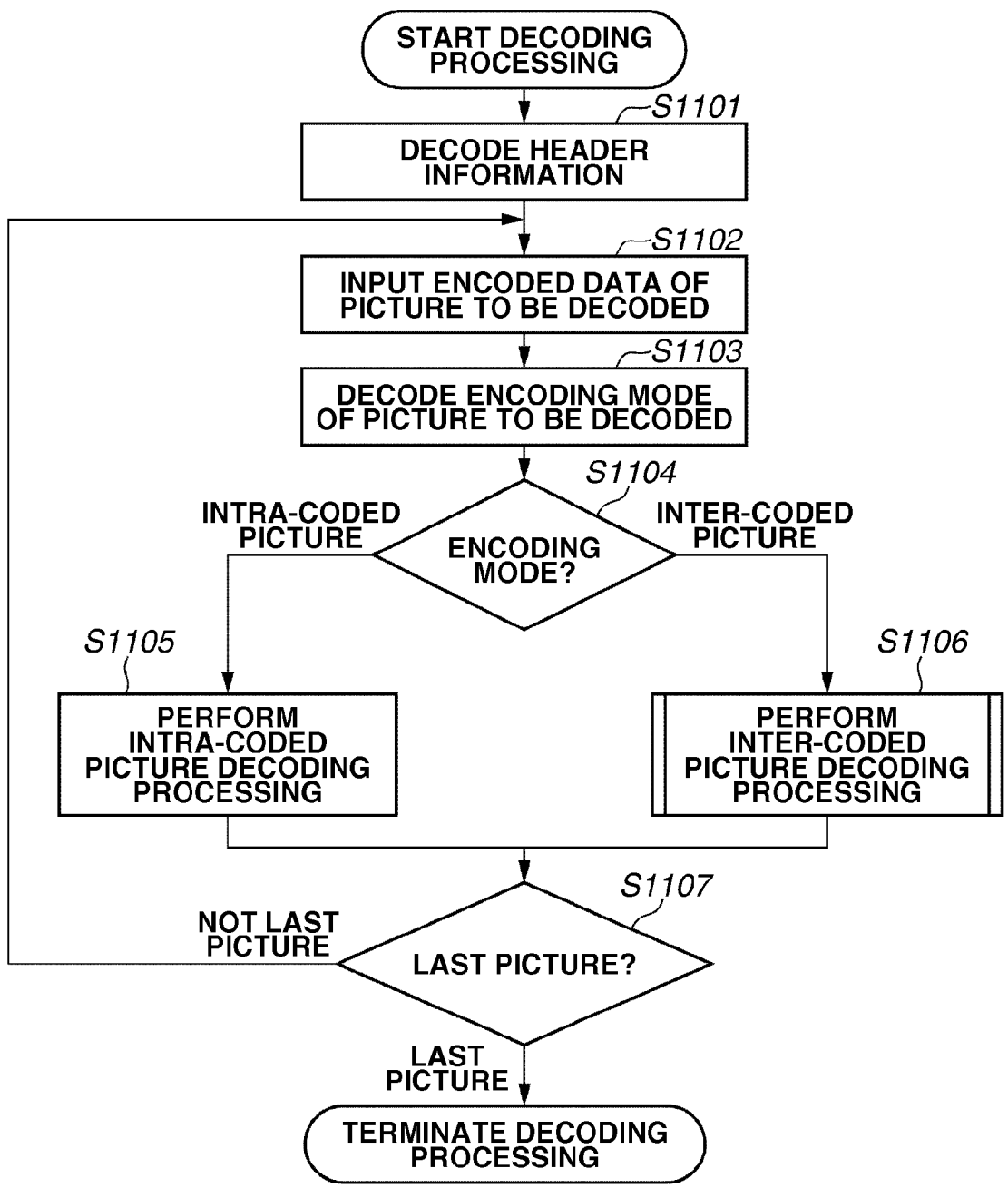
FIG. 11 is a flowchart illustrating an example of image decoding processing that can be performed by the image decoding apparatus according to the second exemplary embodiment.
Figure 12:
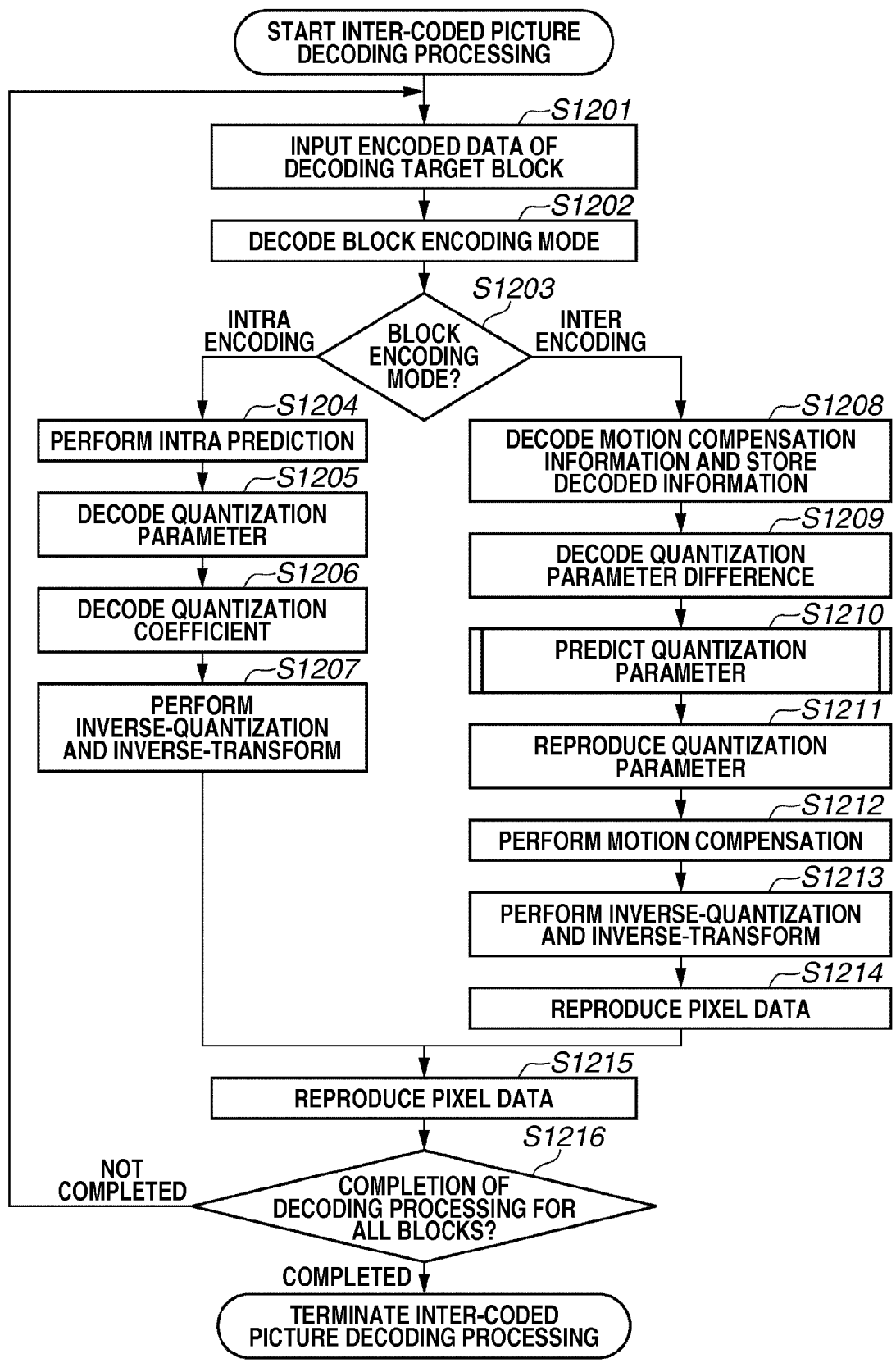
FIG. 12 is a flowchart illustrating an example of inter-coded picture decoding processing that can be performed by the image decoding apparatus according to the second exemplary embodiment.

FIG. 11 is a flowchart illustrating an example of image decoding processing that can be performed by the image decoding apparatus according to the third exemplary embodiment.

In step S1101, the image decoding apparatus decodes and reproduces the header information (e.g. decoding target sequence header). In step S1102, the image decoding apparatus inputs encoded data of a picture to be decoded. In step S1103, the image decoding apparatus decodes the encoding mode of the picture to be decoded.

In step S1104, the image decoding apparatus determines whether the picture encoding mode decoded in step S1103 is the intra-coded picture or the inter-coded picture. If it is determined that the decoding target picture is the intra-coded picture, the operation proceeds to step S1105. If it is determined that the decoding target picture is the inter-coded picture, the operation proceeds to step S1106. In step S1105, namely, when the decoding target picture is the intra-coded picture, the image decoding apparatus decodes the intra-coded picture and reproduces a decoded image.

In step S1106, namely, when the decoding target picture is the inter-coded picture, the image decoding apparatus decodes the inter-coded picture and reproduces a decoded image. FIG. 12 is a flowchart illustrating details of the inter-coded picture decoding processing. In step S1201, the image decoding apparatus inputs encoded data of a block to be decoded from the encoded data of the decoding target picture. In step S1202, the image decoding apparatus decodes the block coding mode encoded data of the decoding target block and reproduces the block coding mode of the decoding target block.

In step S1203, the image decoding apparatus checks the block coding mode of the decoding target block. If it is determined that the block coding mode is the intra coding, the operation proceeds to step S1204. If it is determined that the block coding mode is the inter coding, the operation proceeds to step S1208. In step S1204, namely, the decoding target block is currently subjected to the intra coding. In this case, the image decoding apparatus decodes the intra prediction information, and calculates a prediction value by performing prediction based on peripheral pixels.

In step S1205, the image decoding apparatus decodes the quantization parameter encoded data of the decoding target block and reproduces the quantization parameter. In step S1206, the image decoding apparatus decodes the quantization coefficients encoded data of the decoding target block and reproduces the quantization coefficients. In step S1207, the image decoding apparatus performs inverse quantization processing on the quantization coefficients with the quantization parameter reproduced in step S1205 and reproduces the orthogonal transform coefficients. The image decoding apparatus performs inverse orthogonal transform processing on the reproduced orthogonal transform coefficients to reproduce the predicted error.

On the other hand, in step S1208, the decoding target block is currently subjected to the inter coding. In this case, the image decoding apparatus decodes the motion compensation information encoded data of the decoding target block and reproduces the motion compensation information. The reproduced motion compensation information is stored for a while so that the stored information can be later referred to.

In step S1209, the image decoding apparatus decodes the quantization parameter encoded data of the decoding target block and reproduces the quantization parameter difference value. In step S1210, to reproduce the quantization parameter, the image decoding apparatus predicts a quantization parameter from the peripheral block of the decoding target block and calculates the quantization parameter prediction value. More specifically, the image decoding apparatus compares the motion compensation information reproduced in step S1208 with the motion compensation information of the peripheral block and determines the quantization parameter that serves as the quantization parameter prediction value.

Then, the image decoding apparatus calculates the quantization parameter prediction value. More specifically, the image decoding apparatus performs quantization parameter prediction value calculation processing similar to the processing described in the first exemplary embodiment with reference to the flowcharts illustrated in FIG. 4 to FIG. 6.

In step S1211, the image decoding apparatus reproduces the quantization parameter of the decoding target block based on the quantization parameter difference value reproduced in step S1209 and the quantization parameter prediction value calculated in step S1210. The reproduced quantization parameter is stored for a while so that the stored information can be later referred to.

In step S1212, the image decoding apparatus performs motion compensation processing based on the motion compensation information reproduced in step S1208 with reference to the block prediction mode, the reference picture, and the motion vector. Then, the image decoding apparatus calculates a prediction value, which results from the motion compensation. In step S1213, the image decoding apparatus decodes the quantization coefficients encoded data of the decoding target block and reproduces the quantization coefficients.

In step S1214, the image decoding apparatus performs inverse quantization processing on the quantization coefficients reproduced in step S1213 using the quantization parameter reproduced in step S1211 and reproduces the orthogonal transform coefficients. Further, the image decoding apparatus performs inverse orthogonal transform processing on the orthogonal transform coefficients and reproduces the predicted error.

In step S1215, the image decoding apparatus reproduces the pixel data of the decoding target block by adding the reproduced predicted error and the reproduced prediction value, in each of the case where the block coding mode is the intra coding and the case where the block coding mode is the inter coding. In step S1216, the image decoding apparatus determines whether the decoding processing for all blocks of the decoding target picture has been completed. If it is determined that the decoding processing for all blocks is not yet completed, the operation returns to step S1201 to restart the above-described decoding processing for the next block. If it is determined that the decoding processing for all blocks has been completed, the image decoding apparatus terminates the inter-coded picture decoding processing.

Referring back to FIG. 11, in step S1107, the image decoding apparatus determines whether the picture subjected to the decoding processing is the last picture of the sequence. If it is determined that the picture subjected to the decoding processing is not the last picture, the operation returns to step S1102 to restart the above-described decoding processing for the next picture. If it is determined that the picture subjected to the decoding processing is the last picture, the image decoding apparatus terminates the decoding processing.

The image decoding apparatus having the above-described configuration and performing the above-described operations can obtain an optimum quantization parameter prediction value that is necessary in decoding a bit stream subjected to the encoding of a quantization parameter difference value on the block-by-block basis according to the motion compensation information (in particular, according to the block prediction mode). Thus, the image decoding apparatus according to the present exemplary embodiment can reproduce a decoded image by predicting the quantization parameter according to the motion in the object and a block prediction mode that represents the motion.

Further, the decoding described in the present exemplary embodiment is decoding a bit stream generated according to the H.264-based technique described in the first exemplary embodiment. However, the claimed invention is not limited to the above-described example. Any other coding method (e.g., MPEG-1, MPEG-2, or MPEG-4) is employable. Further, to apply the present exemplary embodiment to the HEVC-based image processing apparatus, it is useful to configure the processing content of step S1210 illustrated in FIG. 12 in such a way as to perform the quantization parameter prediction processing (see FIGS. 8 and 9 in the second exemplary embodiment) on the bit stream generated in the second exemplary embodiment.

An image processing apparatus according to a fourth exemplary embodiment of the claimed invention is described in detail below with reference to FIG. 1, FIG. 4, and FIG. 13 through FIG. 15. The system configuration described in the present exemplary embodiment is a mere example. The claimed invention is not limited to the described configuration.

An exemplary embodiment of the claimed invention is described in detail below with reference to the attached drawing. An image encoding apparatus according to the present exemplary embodiment has a configuration similar to that illustrated in FIG. 1. In the present exemplary embodiment, the image encoding apparatus is an example of the H.264-based image processing apparatus.

In the above-described first exemplary embodiment, the quantization parameter prediction unit 112 calculates the quantization parameter prediction value with reference to the block prediction mode (i.e., one of the motion compensation information). On the other hand, the image encoding apparatus according to the present exemplary embodiment is configured to calculate the quantization parameter prediction value with reference to the reference picture in addition to the block prediction mode.

An example of the image encoding operation that can be performed by the image encoding apparatus is described in detail below. Similar to the first exemplary embodiment, the quantization parameter determination unit 102 determines a quantization parameter of an encoding target. Further, the block prediction unit 103 calculates motion compensation information of the encoding target block. The motion compensation information storage unit 110 stores the motion compensation information on the block-by-block basis to refer to motion compensation information of a peripheral block. The quantization parameter storage unit 111 stores the quantization parameter on the block-by-block basis to refer to a quantization parameter of a peripheral block.

An example of the quantization parameter prediction value calculation processing that can be performed by the quantization parameter prediction unit 112 based on the above-described input information is described in detail below with reference to the flowcharts illustrated in FIG. 4 and FIG. 13 to FIG. 15. In FIG. 4, similar to the first exemplary embodiment, the quantization parameter prediction unit 112 determines whether the slice type is the P slice or the B slice. The quantization parameter prediction unit 112 selects one of three steps S403 to S405 according to a determination result with respect to the block prediction mode of the encoding target block.

Figure 13:
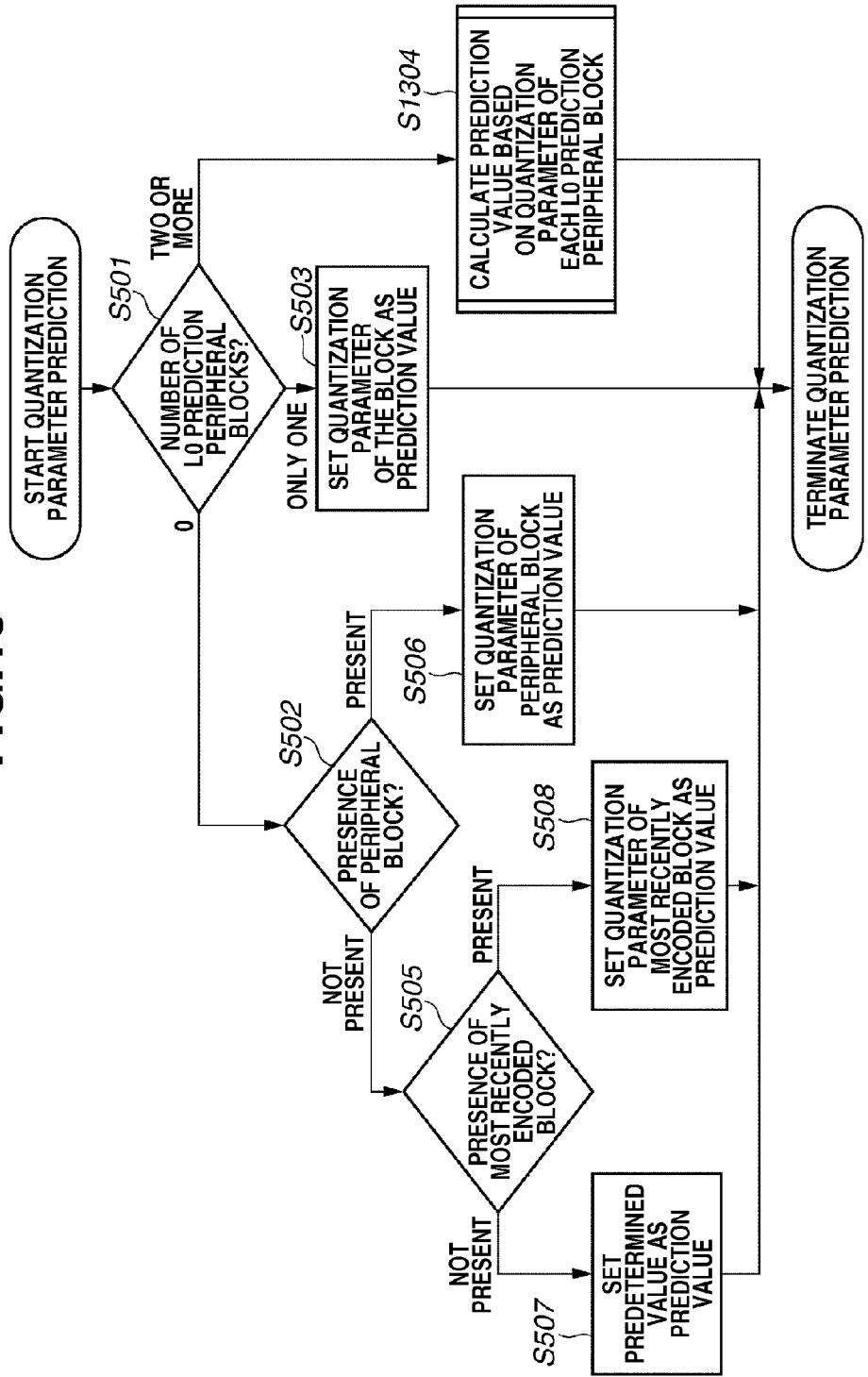
FIG. 13 is a flowchart illustrating an example of quantization parameter prediction processing according to a third exemplary embodiment.

In step S403, namely, the encoding target block is subjected to the L0 prediction. In this case, the quantization parameter prediction unit 112 calculates the quantization parameter prediction value with reference to a peripheral block of the encoding target block whose peripheral block is currently subjected to the L0 prediction block. FIG. 13 is a flowchart illustrating details of the processing to be performed in step S403 according to the fourth exemplary embodiment.

In FIG. 13, steps that are functionally similar to those of the flowchart illustrated in FIG. 5 are denoted by the same step numbers and the descriptions thereof are not repeated. The flowchart illustrated in FIG. 13 is a detailed content of the quantization parameter prediction value calculation processing to be performed when the block prediction mode of the encoding target block is the L0 prediction.

Similar to the first exemplary embodiment, in step S501, the quantization parameter prediction unit 112 checks the number of peripheral blocks that are currently subjected to the L0 prediction with reference to the block prediction mode included in the motion compensation information of the peripheral block. If it is determined that the number of peripheral blocks that are currently subjected to the L0 prediction is other than 0 or 1, the operation proceeds to step S1304.

Figure 14:
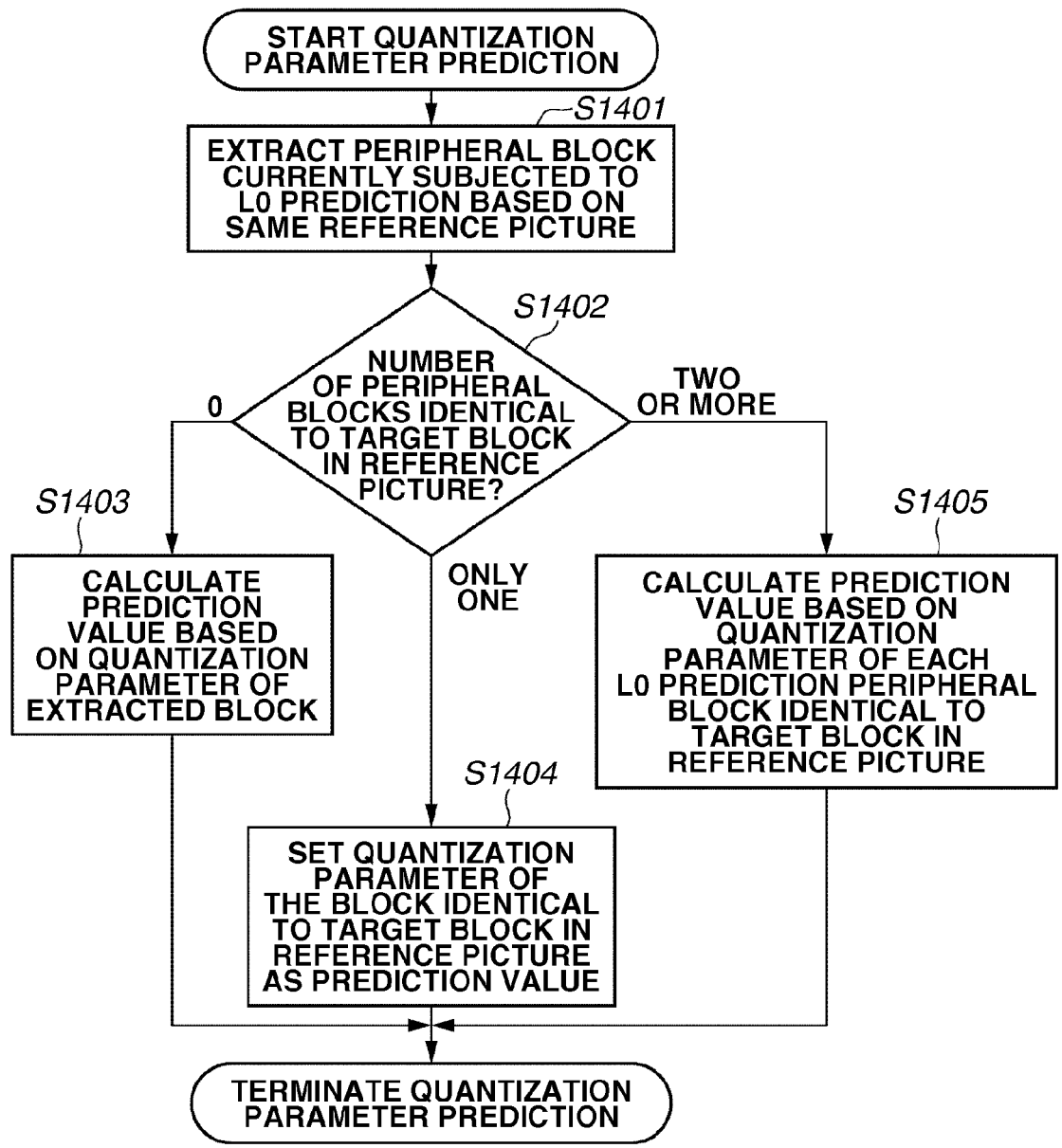
FIG. 14 is a flowchart illustrating an example of quantization parameter prediction processing according to the third exemplary embodiment.

In step S1304, the quantization parameter prediction unit 112 calculates the quantization parameter prediction value based on the quantization parameter of each peripheral block that is currently subjected to the L0 prediction. FIG. 14 is a flowchart illustrating an example of the quantization parameter prediction value calculation processing to be performed in step S1304.

In step S1401, the quantization parameter prediction unit 112 extracts any peripheral block that is currently subjected to the L0 prediction. In step S1402, the quantization parameter prediction unit 112 checks the number of peripheral blocks that are extracted in step S1401 and identical to the encoding target block in reference picture to be referred to. If it is determined that there is not any peripheral block that refers to the same reference picture as the encoding target block, the operation proceeds to step S1403. If it is determined that there is only one peripheral block that refers to the same reference picture, the operation proceeds to step S1404. If it is determined that there are two or peripheral blocks that refer to the same reference picture, the operation proceeds to step S1405.

In step S1403, the quantization parameter prediction unit 112 calculates the quantization parameter prediction value based on the quantization parameter of the peripheral block extracted in step S1401 and is currently subjected to the L0 prediction. The quantization parameter prediction value calculation method is not limited to a specific method. For example, an example method includes comparing the reference picture of the extracted peripheral block with the reference picture included in the motion compensation information of the encoding target block, and setting the quantization parameter of a peripheral block that refers to a reference picture that is closest to the reference picture included in the motion compensation information of the encoding target block as the quantization parameter prediction value.

Further, the quantization parameter prediction value calculation method is not limited to the above-described example. For example, an appropriate method, e.g., calculating a mean quantization parameter value of the extracted peripheral blocks, calculating a median, or setting a quantization parameter of the left block as the quantization parameter prediction value, is employable to calculate the quantization parameter prediction value.

In step S1404, namely, there is only one peripheral block that is identical to the encoding target block in reference picture to be referred to. In this case, the quantization parameter prediction unit 112 sets the quantization parameter of the only one same reference picture peripheral block as the quantization parameter prediction value.

In step S1405, namely, there are two or more peripheral blocks that are identical to the encoding target block in reference picture to be referred to. In this case, the quantization parameter prediction unit 112 calculates the quantization parameter prediction value based on the quantization parameter of each peripheral block that refers to same reference picture. The quantization parameter prediction value calculation method is not limited to a specific method. An appropriate method, e.g., calculating a mean quantization parameter value of peripheral blocks, calculating a median, or setting a quantization parameter of the left block as the quantization parameter prediction value, is employable to calculate the quantization parameter prediction value.

Further, the quantization parameter prediction unit 112 can calculate the quantization parameter prediction value with reference to other information. For example, it is useful to refer to CBP encoded data of a peripheral block in the above-described determination. The CBP code represents the presence of a significant coefficient in the block. Therefore, the quantization parameter prediction unit 112 can set the quantization parameter of a block including many significant coefficients as the quantization parameter prediction value.

Referring back to FIG. 4, in step S404, the quantization parameter prediction unit 112 calculates the quantization parameter prediction value with reference to a peripheral block of the encoding target block whose block prediction mode is the L1 prediction. A detailed content of the processing to be performed in step S404 is similar to that of the flowcharts illustrated in FIG. 13 and FIG. 14 although the L0 prediction is replaced by the L1 prediction. Therefore, the description thereof is not repeated.

Figure 15:
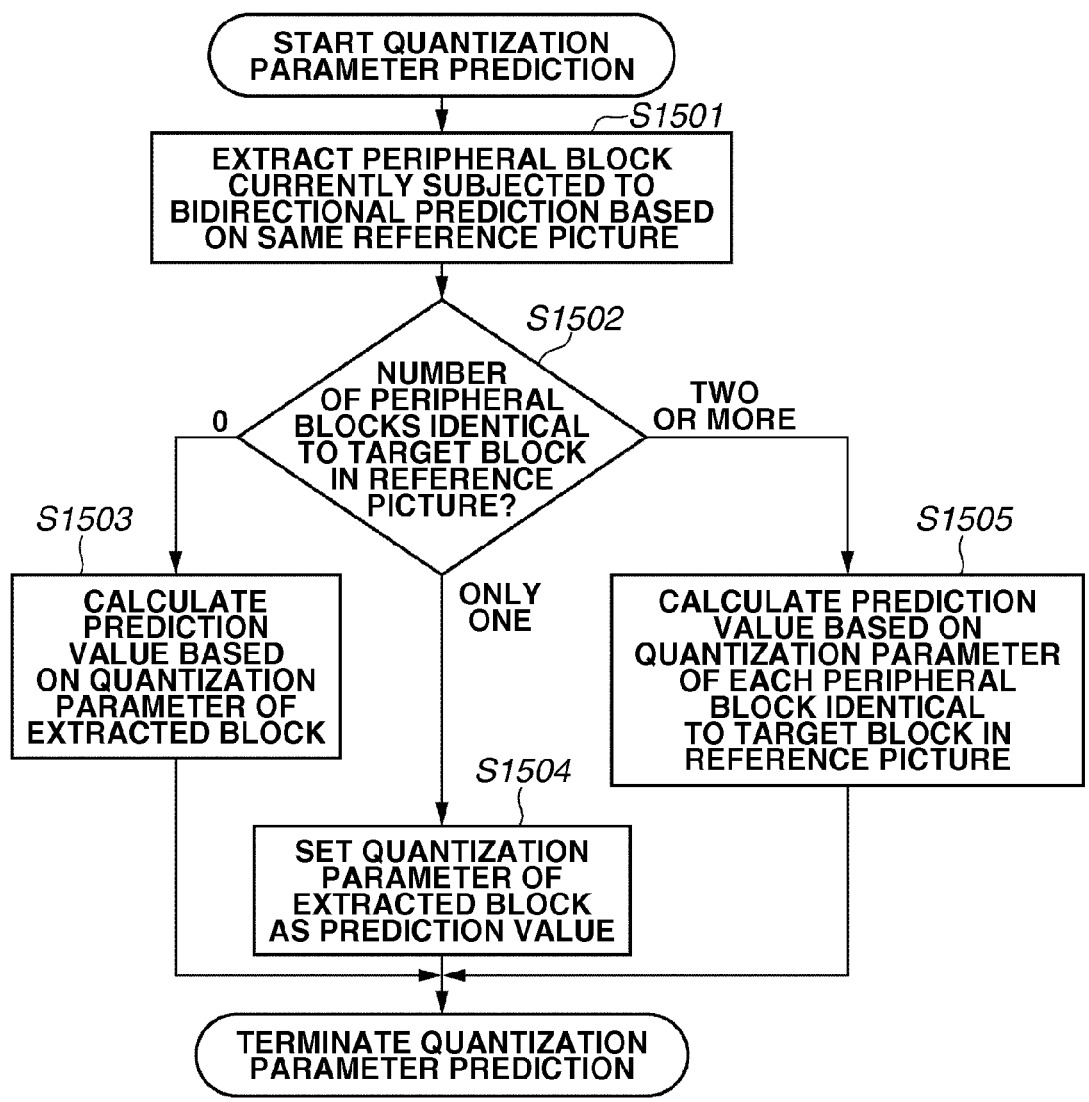
FIG. 15 is a flowchart illustrating an example of quantization parameter prediction processing according to the third exemplary embodiment.
Figure 16:
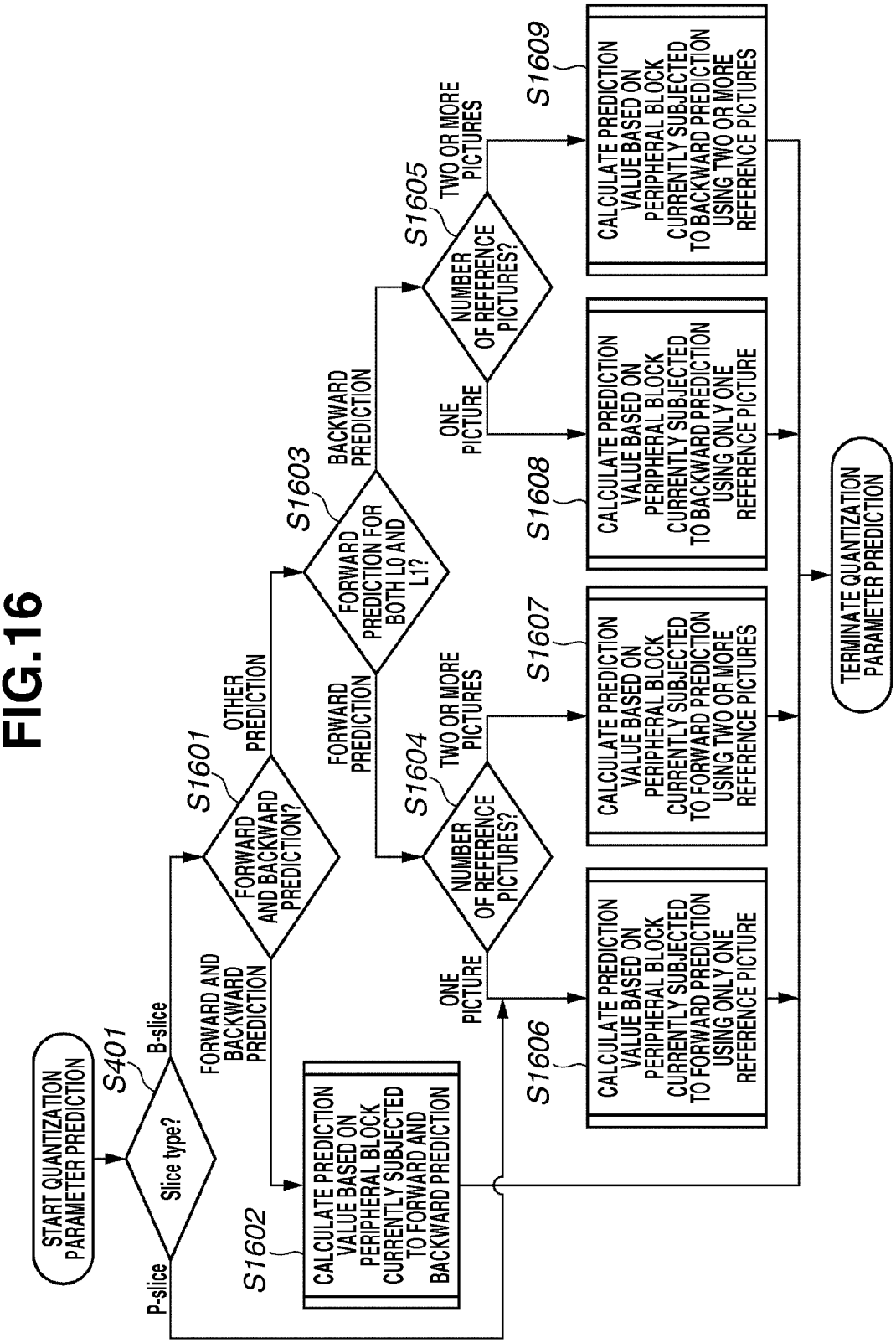
FIG. 16 is a flowchart illustrating an example of quantization parameter prediction processing according to a fourth exemplary embodiment.

In step S405, namely, the encoding target block is subjected to the bidirectional prediction. In this case, the quantization parameter prediction unit 112 calculates the quantization parameter prediction value with reference to a peripheral block that is currently subjected to the bidirectional prediction. The processing to be performed in step S405 is similar to the processing illustrated in FIG. 13 although the L0 prediction is replaced by the bidirectional prediction. FIG. 15 is a flowchart illustrating an example of the quantization parameter prediction value calculation processing to be performed in step S1304 when the encoding target block is subjected to the bidirectional prediction.

In step S1501, the quantization parameter prediction unit 112 extracts any peripheral block that is currently subjected to the bidirectional prediction. In step S1502, the quantization parameter prediction unit 112 checks the number of peripheral blocks extracted in step S1501 that are identical to the encoding target block in reference picture to be referred to in each of the L0 prediction and the L1 prediction. If it is determined that there is not any peripheral block that refers to the same reference picture, the operation proceeds to step S1503. If it is determined that there is only one peripheral block that refers to the same reference picture, the operation proceeds to step S1504. If in step S1502 it is determined that there are two or more peripheral blocks, the operation proceeds to step S1505.

In step S1503, the quantization parameter prediction unit 112 calculates the quantization parameter prediction value based on the quantization parameter of a peripheral block extracted in step S1501 and is currently subjected to the bidirectional prediction. The quantization parameter prediction value calculation method is not limited to a specific method. For example, the quantization parameter prediction unit 112 can compare two reference pictures of the extracted peripheral block with two reference pictures included in the motion compensation information of the encoding target block.

The quantization parameter prediction unit 112 can set the quantization parameter of a peripheral block that refers to two reference pictures closest to the two reference pictures included in the motion compensation information of the encoding target block as the quantization parameter prediction value. For example, the quantization parameter prediction unit 112 can calculate a time difference between closest ones of the compared two reference pictures, and can select the one that is smallest in its sum value.

Further, the calculation method is not limited to the above-described example. For example, an appropriate method, e.g., calculating a mean quantization parameter value of the extracted peripheral blocks, calculating a median, or setting a quantization parameter of the left block as the quantization parameter prediction value, is employable to calculate the quantization parameter prediction value.

In step S1504, namely, there is only one peripheral block that is identical to the encoding target block in two reference pictures to be referred to. In this case, the quantization parameter prediction unit 112 sets the quantization parameter of the only one same reference picture peripheral block as the quantization parameter prediction value.

In step S1505, namely, there are two or more blocks that are identical to the encoding target block in two reference pictures to be referred to. In this case, the quantization parameter prediction unit 112 calculates the quantization parameter prediction value based on the quantization parameter of each same reference picture peripheral block. The quantization parameter prediction value calculation method is not limited to a specific method. An appropriate method, e.g., calculating a mean quantization parameter value of peripheral blocks, calculating a median, or setting a quantization parameter of the left block as the quantization parameter prediction value, is employable to calculate the quantization parameter prediction value.

Further, the quantization parameter prediction unit 112 can calculate the quantization parameter prediction value with reference to other information. For example, it is useful to refer to CBP encoded data of a peripheral block in the above-described determination. The CBP code represents the presence of a significant coefficient in the block. Therefore, the quantization parameter prediction unit 112 can set the quantization parameter of a block including many significant coefficients as the quantization parameter prediction value.

Referring back to FIG. 4, the quantization parameter prediction unit 112 terminates the quantization parameter prediction value calculation processing.

The image encoding apparatus having the above-described configuration and performing the above-described operations can encode the quantization parameter difference value on the block-by-block basis according to the reference picture in addition to the motion compensation information (in particular, according to the block prediction mode). Thus, further improving the coding efficiency is feasible.

Further, in the present exemplary embodiment, the H.264-based technique has been described as an example of the encoding technique. However, the claimed invention is not limited to the above-described example. Any other coding method (e.g., MPEG-1, MPEG-2, MPEG-4, or HEVC) is employable. In the present exemplary embodiment, the L0 prediction, the L1 prediction, and the bidirectional prediction have been described as examples of the prediction usable in the H.264-based technique. However, any other prediction is employable.

An image processing apparatus according to a fifth exemplary embodiment of the claimed invention is described in detail below with reference to FIG. 1, FIG. 4, and FIG. 16 through FIG. 20. The system configuration described in the present exemplary embodiment is a mere example. The claimed invention is not limited to the described configuration.

An exemplary embodiment of the claimed invention is described in detail below with reference to the attached drawing. An image encoding apparatus according to the present exemplary embodiment has a configuration similar to that illustrated in FIG. 1. In the present exemplary embodiment, the image encoding apparatus is an example of the H.264-based image processing apparatus.

In the above-described first exemplary embodiment, the quantization parameter prediction unit 112 calculates the quantization parameter prediction value with reference to the block prediction mode included in the motion compensation information. On the other hand, the quantization parameter prediction unit 112 according to the present exemplary embodiment is configured to calculate the quantization parameter prediction value with reference to a reference direction in addition to the block prediction mode.

An image encoding operation that can be performed by the above-described image encoding apparatus is described in detail below. Similar to the first exemplary embodiment, the quantization parameter determination unit 102 determines a quantization parameter of an encoding target. Further, the block prediction unit 103 calculates motion compensation information of the encoding target block. The motion compensation information storage unit 110 stores the motion compensation information on the block-by-block basis to refer to motion compensation information of a peripheral block. The quantization parameter storage unit 111 stores the quantization parameter on the block-by-block basis to refer to a quantization parameter of a peripheral block.

The quantization parameter prediction unit 112 receives the above-described information and performs quantization parameter prediction value calculation processing according to flowcharts illustrated in FIG. 16 through FIG. 19. Similar to the first exemplary embodiment, in step S401 of FIG. 16, the quantization parameter prediction unit 112 determines whether the slice type is the P slice or the B slice. If it is determined that the slice type is the P slice, the operation proceeds to step S1606. If it is determined that the slice type is not the P slice, the operation proceeds to step S1601.

In step S1601, the quantization parameter prediction unit 112 determines whether the encoding target block is performing prediction with reference to the preceding and following pictures of the encoding target picture based on the prediction mode and the reference picture. In the following description, performing prediction with reference to the preceding and following pictures is referred to as a forward and backward prediction. If it is determined that the encoding target block is subjected to the forward and backward prediction, the operation proceeds to step S1602. If it is determined that the encoding target block is other than the forward and backward prediction, the operation proceeds to step S1603.

In step S1603, the quantization parameter prediction unit 112 determines whether the encoding target block is a forward prediction in which the L0 prediction and the L1 prediction of the encoding target block refers to a past picture. If it is determined that each of the L0 prediction and the L1 prediction of the encoding target block is subjected to the forward prediction, the operation proceeds to step S1604. Otherwise, namely, if it is determined that the encoding target block is a backward prediction in which a future picture is referred to, the operation proceeds to step S1605.

In each of step S1604 and step S1605, the quantization parameter prediction unit 112 determines whether only one reference picture is referred to or a plurality of reference pictures is referred to. More specifically, in step S1604, if it is determined that only one reference picture is referred to in the forward prediction, the operation proceeds to step S1606. If it is determined that a plurality of reference pictures is referred to in the forward prediction, the operation proceeds to step S1607.

Figure 17:
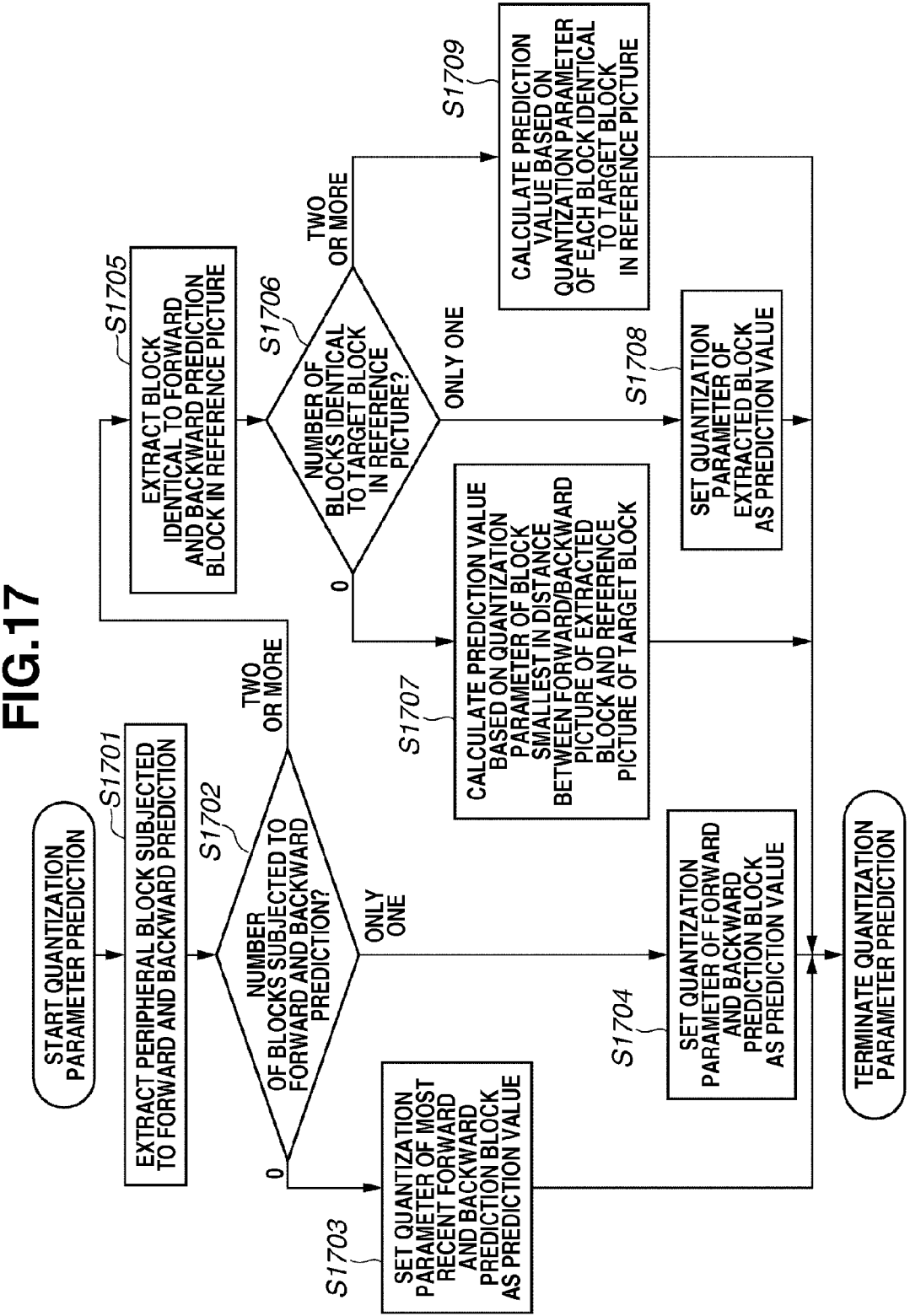
FIG. 17 is a flowchart illustrating an example of the quantization parameter prediction processing according to the fourth exemplary embodiment.

In step S1602, namely, the encoding target block is subjected to the forward and backward prediction. In this case, the quantization parameter prediction unit 112 calculates the quantization parameter prediction value with reference to a peripheral block that is currently subjected to the forward and backward prediction. FIG. 17 is a flowchart illustrating a detailed content of the processing to be performed in step S1602 according to the fifth exemplary embodiment. In step S1701, the quantization parameter prediction unit 112 extracts any peripheral block that is currently subjected to the forward and backward prediction.

In step S1702, the quantization parameter prediction unit 112 checks the number of peripheral blocks extracted in step S1701. If it is determined that there is not any peripheral block that is currently subjected to the forward and backward prediction, the operation proceeds to step S1703. Further, if in step S1702 it is determined that only one peripheral block is present, the operation proceeds to step S1704. If it is determined that a plurality of peripheral blocks is present, the operation proceeds to step S1705.

In step S1703, namely, there is not any peripheral block that has been subjected to the forward and backward prediction. In this case, the quantization parameter prediction unit 112 sets the quantization parameter of the most recently encoded forward and backward prediction block as the quantization parameter prediction value. If the most recently encoded forward and backward prediction block is not present, the quantization parameter prediction unit 112 can set a predetermined value as the quantization parameter prediction value.

In step S1704, namely, there is only one peripheral block that has been subjected to the forward and backward prediction. In this case, the quantization parameter prediction unit 112 sets the quantization parameter of the only one forward and backward prediction peripheral block as the quantization parameter prediction value. In step S1705, the quantization parameter prediction unit 112 extracts any forward and backward prediction peripheral block whose reference picture is identical to that in each of the L0 prediction and the L1 prediction of the encoding target block.

In step S1706, the quantization parameter prediction unit 112 checks the number of the L0 prediction and the L1 prediction reference pictures extracted in step S1705. If it is determined that there is not any peripheral block whose reference picture is identical to that in each of the L0 prediction and the L1 prediction of the encoding target block, the operation proceeds to step S1707. Further, in step S1706 if it is determined that only one peripheral block is present, the operation proceeds to step S1708. If it is determined that there are two or more peripheral blocks, the operation proceeds to step S1709.

In step S1707, namely, there is not any peripheral block whose reference picture is identical to that in each of the L0 prediction and the L1 prediction of the encoding target block. In this case, the quantization parameter prediction unit 112 refers to reference pictures of respective peripheral blocks. As a result, the quantization parameter prediction unit 112 sets the quantization parameter of a peripheral block whose reference picture is temporally smallest in distance from the encoding target picture as the quantization parameter prediction value.

If there are two or more peripheral blocks whose reference picture is smallest in distance, the quantization parameter prediction unit 112 sets a mean value as the quantization parameter prediction value. Alternatively, it is useful to select a median or set a unique value. In step S1708, namely, there is only one peripheral block whose reference picture is identical to that in each of the L0 prediction and the L1 prediction of the encoding target block. In this case, the quantization parameter prediction unit 112 sets the quantization parameter of the only one same reference picture peripheral block as the quantization parameter prediction value.

In step S1709, namely, there are two or more peripheral blocks whose reference picture is identical to that in each of the L0 prediction and the L1 prediction of the encoding target block. In this case, the quantization parameter prediction unit 112 sets a mean quantization parameter value of these peripheral blocks as the quantization parameter prediction value. Alternatively, it is useful to select a median or set a unique value.

Figure 18:
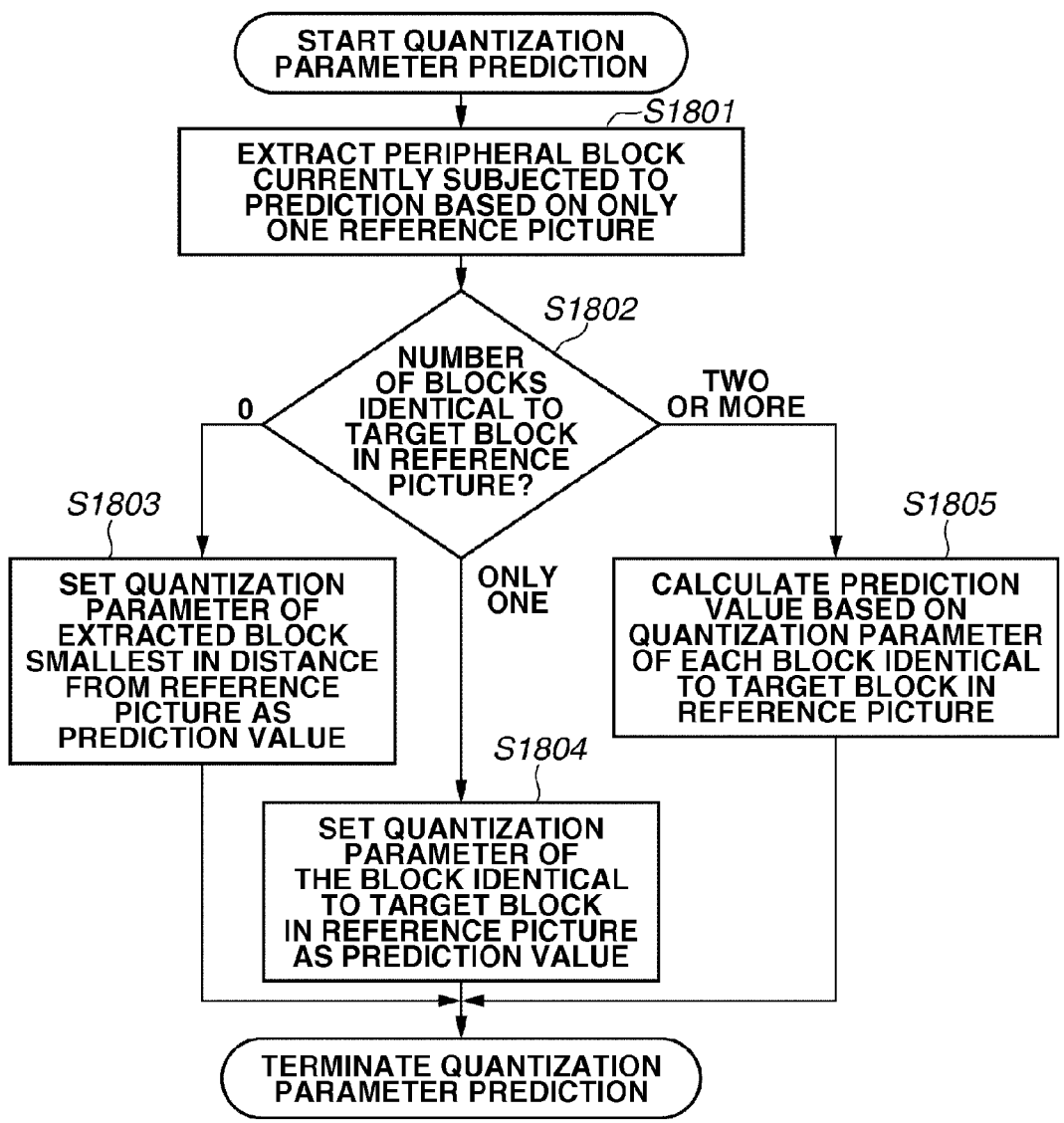
FIG. 18 is a flowchart illustrating an example of the quantization parameter prediction processing according to the fourth exemplary embodiment.

Referring back to FIG. 16, in step S1606, namely, the encoding target block is subjected to the forward prediction and the only one reference picture is referred to in the forward prediction, the quantization parameter prediction unit 112 calculates the quantization parameter prediction value based on the only one forward prediction peripheral block that refers to only one preference picture. FIG. 18 is a flowchart illustrating a detailed content of the processing to be performed in step S1606 according to the fifth exemplary embodiment.

In step S1801, the quantization parameter prediction unit 112 extracts any forward prediction peripheral block that refers to only one preference picture. In step S1802, the quantization parameter prediction unit 112 checks the number of the peripheral blocks extracted in step S1801. If it is determined that there is not any forward prediction peripheral block that refers to only one reference picture, the operation proceeds to step S1803. If in step S1802 it is determined that only one peripheral block is present, the operation proceeds to step S1804. If it is determined that there are two or more peripheral blocks, the operation proceeds to step S1805.

In step S1803, namely, there is not any forward prediction peripheral block that refers to only one reference picture. In this case, the quantization parameter prediction unit 112 sets the quantization parameter of the most recently encoded forward prediction block that refers to only one reference picture as the quantization parameter prediction value. If the most recently encoded forward prediction block that refers to only one reference picture is not present, the quantization parameter prediction unit 112 can calculate the quantization parameter prediction value with reference to an inter prediction peripheral block that has been encoded referring to the same reference picture. The calculation method is not limited to the above-described example. For example, it is also useful to select a peripheral block that refers to only one peripheral reference picture. It is also useful to use a predetermined value.

In step S1804, namely, there is only one forward prediction peripheral block that refers to only one reference picture. In this case, the quantization parameter prediction unit 112 sets the quantization parameter of the identified only one forward prediction peripheral block as the quantization parameter prediction value. In step S1805, namely, there are two or more forward prediction peripheral blocks that refer to the only one reference picture that is identical to that of the encoding target block. In this case, the quantization parameter prediction unit 112 calculates the quantization parameter prediction value based on the quantization parameter of each of the identified forward prediction peripheral blocks.

The quantization parameter prediction value calculation method is not limited to a specific method. An appropriate method, e.g., calculating a mean quantization parameter value of forward prediction peripheral blocks that are identical to the encoding target block in only one reference picture to be referred to, calculating a median, or setting a quantization parameter of the left block as the quantization parameter prediction value, is employable to calculate the quantization parameter prediction value.

Further, the quantization parameter prediction unit 112 can calculate the quantization parameter prediction value with reference to other information. For example, it is useful to refer to CBP encoded data of a peripheral block in the above-described determination. The CBP code represents the presence of a significant coefficient in the block. Therefore, the quantization parameter prediction unit 112 can set the quantization parameter of a block including many significant coefficients as the quantization parameter prediction value.

Figure 19:
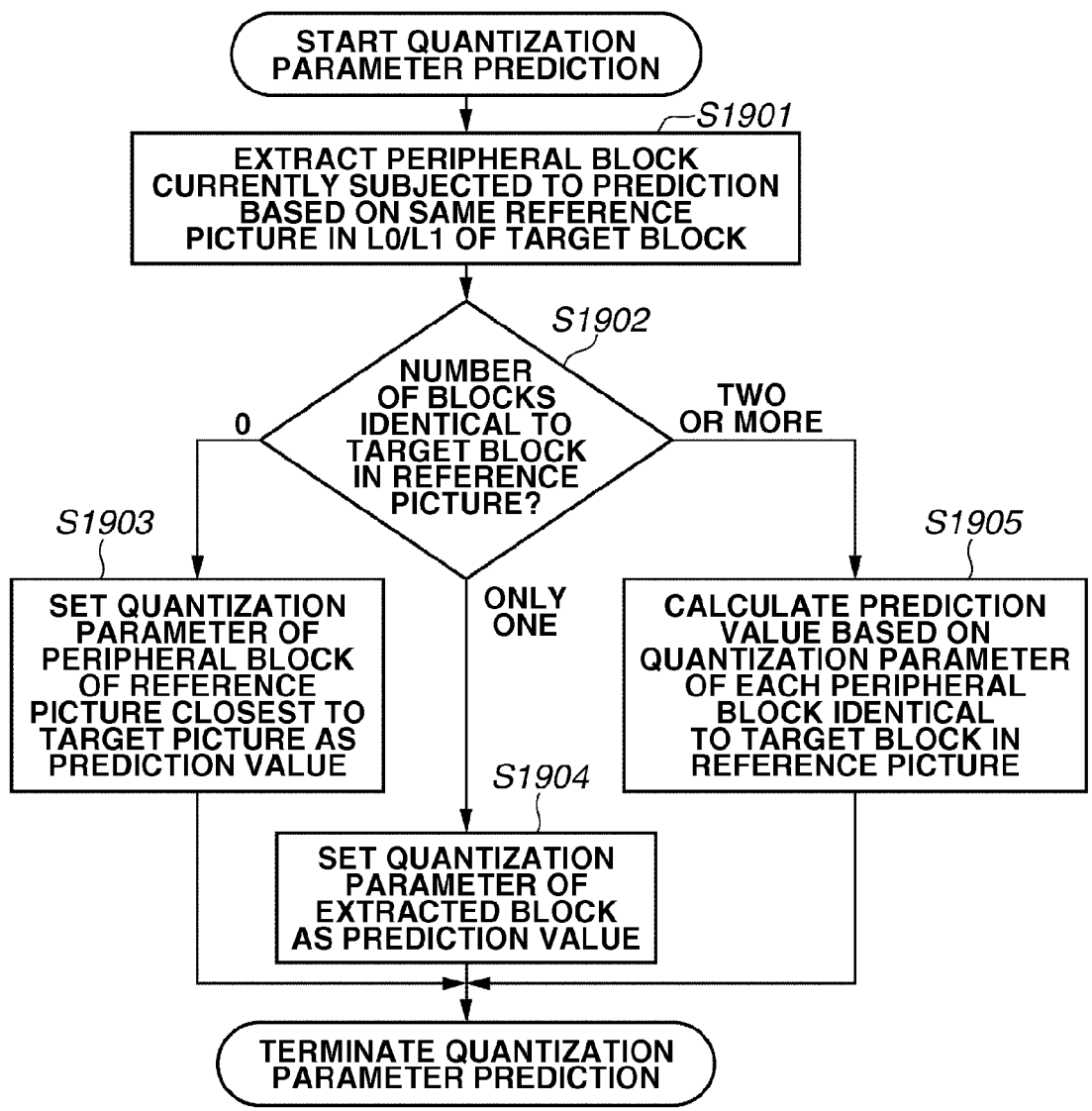
FIG. 19 is a flowchart illustrating an example of the quantization parameter prediction processing according to the fourth exemplary embodiment.

Referring back to FIG. 16, in step S1607, namely, the encoding target block is subjected to the forward prediction and a plurality of reference pictures is referred to in the forward prediction. In this case, the quantization parameter prediction unit 112 calculates the quantization parameter prediction value based on each forward prediction peripheral block that refers to a plurality of reference pictures. FIG. 19 is a flowchart illustrating a detailed content of the processing to be performed in step S1607 according to the fifth exemplary embodiment.

In step S1901, the quantization parameter prediction unit 112 extracts any forward prediction peripheral block that refers to a plurality of reference pictures and is identical to the encoding target block in reference picture to be referred to in each of the L0 prediction and the L1 prediction.

In step S1902, the quantization parameter prediction unit 112 checks the number of blocks extracted in step S1901. If it is determined that there is not any peripheral block that is identical to the encoding target block in reference picture to be referred to in each of the L0 prediction and the L1 prediction, the operation proceeds to step S1903. Further, if in step S1902 it is determined that only one peripheral block is present, the operation proceeds to step S1904. If it is determined that there are two or more peripheral blocks, the operation proceeds to step S1905.

In step S1903, namely, there is not any peripheral block that is identical to the encoding target block in reference picture to be referred to in each of the L0 prediction and the L1 prediction. In this case, the quantization parameter prediction unit 112 sets the quantization parameter of the most recently encoded forward prediction block that refers to a plurality of reference pictures as the quantization parameter prediction value. If the most recently encoded forward prediction block that refers to a plurality of reference pictures is not present, the quantization parameter prediction unit 112 can calculate the quantization parameter prediction value with reference to the most recent forward prediction peripheral block that refers to a plurality of reference pictures. The calculation method is not limited to the above-described example. For example, it is also useful to select the most recent forward prediction peripheral block. It is also useful to use a predetermined value.

In step S1904, namely, there is only one peripheral block that is identical to the encoding target block in reference picture to be referred to in each of the L0 prediction and the L1 prediction. In this case, the quantization parameter prediction unit 112 sets the quantization parameter of the identified only one peripheral block as the quantization parameter prediction value.

In step S1905, namely, a plurality of peripheral blocks is identical to the encoding target block in reference picture to be referred to in each of the L0 prediction and the L1 prediction. In this case, the quantization parameter prediction unit 112 calculates the quantization parameter prediction value based on the quantization parameter of each of the identified blocks. The quantization parameter prediction value calculation method is not limited to a specific method. An appropriate method, e.g., calculating a mean quantization parameter value of peripheral blocks that are identical to the encoding target block in reference picture to be referred to in the L0 prediction and the L1 prediction, calculating a median, or setting a quantization parameter of the left block as the quantization parameter prediction value, is employable to calculate the quantization parameter prediction value.

Further, the quantization parameter prediction unit 112 can calculate the quantization parameter prediction value with reference to other information. For example, it is useful to refer to CBP encoded data of a peripheral block in the above-described determination. The CBP code represents the presence of a significant coefficient in the block. Therefore, the quantization parameter prediction unit 112 can set the quantization parameter of a block including many significant coefficients as the quantization parameter prediction value. Referring back to FIG. 16, the quantization parameter prediction unit 112 terminates the quantization parameter prediction value calculation processing The image encoding apparatus having the above-described configuration and performing the above-described operations can encode the quantization parameter difference value on the block-by-block basis according to the reference picture in addition to the motion compensation information (in particular, according to the block prediction mode). Thus, further improving the coding efficiency is feasible.

Further, in the present exemplary embodiment, the H.264-based technique has been described as an example of the encoding technique. However, the claimed invention is not limited to the above-described example. Any other coding method (e.g., MPEG-1, MPEG-2, MPEG-4, or HEVC) is employable. In the present exemplary embodiment, the L0 prediction and the L1 prediction have been described as examples of the prediction usable in the H.264-based technique. However, any other prediction is employable.

Figure 20:
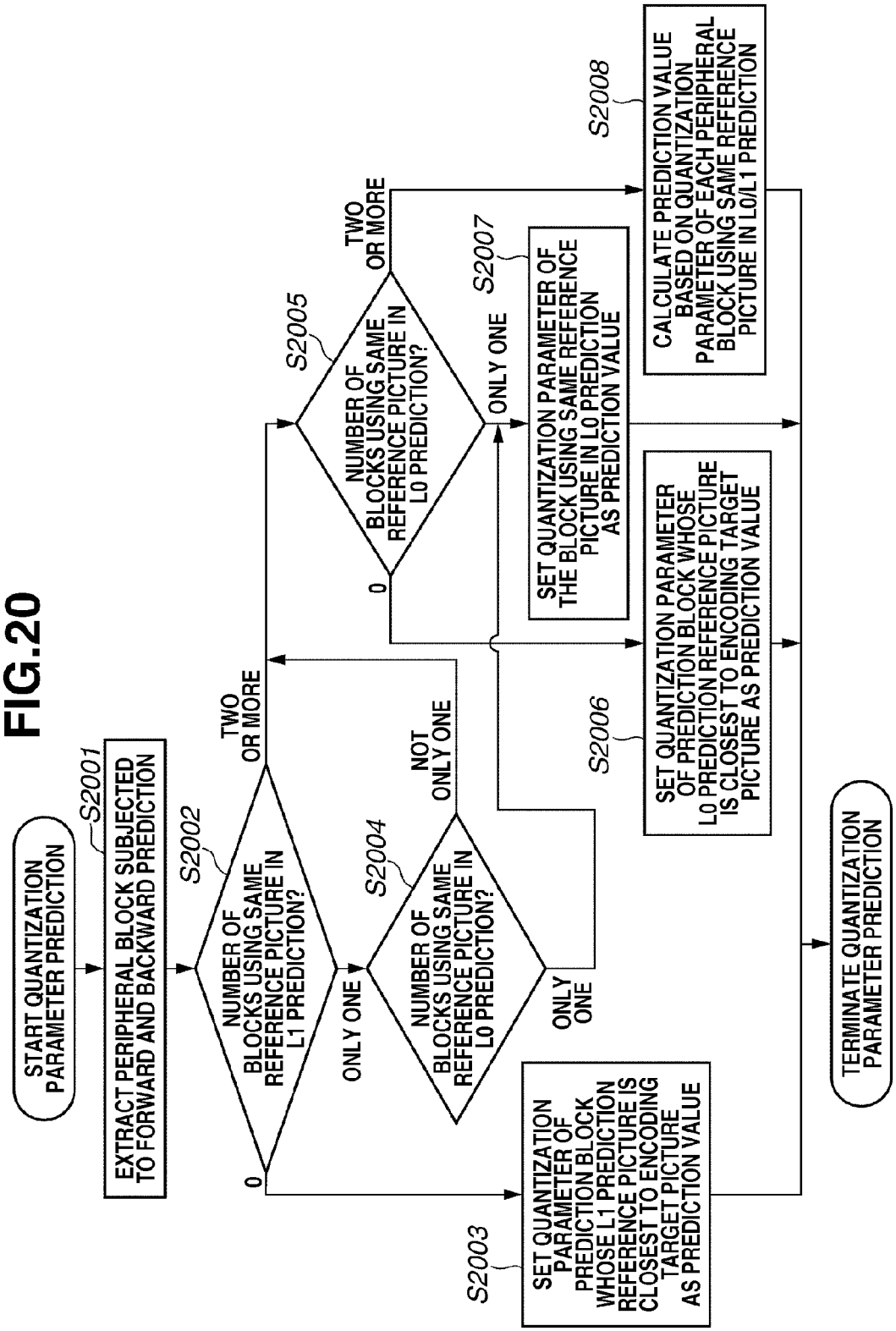
FIG. 20 is a flowchart illustrating another example of the quantization parameter prediction processing according to the fourth exemplary embodiment.

The order of determination processing in the present exemplary embodiment is not limited to the above-described example. FIG. 20 is a flowchart illustrating another quantization parameter prediction value calculation method, which is different in the order of determination processing in step S1602 illustrated in FIG. 16. In step S2001, the quantization parameter prediction unit 112 extracts any peripheral block of the encoding target block that is currently subjected to the forward and backward prediction. In step S2002, the quantization parameter prediction unit 112 checks the number of the L1 prediction and same reference picture peripheral blocks extracted in step S2001. If the L1 prediction and same reference picture peripheral block is not present, the operation proceeds to step S2003. If in step S2002 it is determined that only one peripheral block is present, the operation proceeds to step S2004. If it is determined that there are two or more peripheral blocks, the operation proceeds to step S2005.

In step S2003, the quantization parameter prediction unit 112 calculates the quantization parameter prediction value based on a peripheral block that refers to an L1 prediction reference picture that is closest to the reference picture of the encoding target block. In step S2004 and step S2005, the quantization parameter prediction unit 112 checks the number of the extracted blocks that are identical to the encoding target block in L0 prediction reference picture. In step S2004, if it is determined that there is only one block that is identical to the encoding target block in L0 prediction reference picture, the operation proceeds to step S2007. If it is determined that the number of blocks that are identical to the encoding target block in L0 prediction reference picture is not one, the operation proceeds to step S2005.

In step S2005, if it is determined that there is not any block that is identical to the encoding target block the L0 prediction reference picture, the operation proceeds to step S2006. If in step S2005 it is determined that only one block is present, the operation proceeds to step S2007. If in step S2005 it is determined that two or more blocks are present, the operation proceeds to step S2008. In step S2006, the quantization parameter prediction unit 112 refers to the same L1 prediction reference picture and calculates the quantization parameter prediction value based on a block whose L0 prediction reference picture is closest to the reference picture of the encoding target block.

In step S2007, namely, there is only one block that refers to the same reference picture in both the L1 prediction and the L0 prediction. In this case, the quantization parameter prediction unit 112 sets the quantization parameter of the identified only one block as the quantization parameter prediction value. In step S2008, namely, two or more blocks refer to the same reference picture in both the L1 prediction and the L0 prediction. In this case, the quantization parameter prediction unit 112 calculates the quantization parameter prediction value based on the quantization parameter of each identified block. As described above, it is feasible to arbitrarily change the order of determination processing.

An image processing apparatus according to a sixth exemplary embodiment of the claimed invention is described in detail below with reference to FIG. 21 through FIG. 25 and FIG. 8. The system configuration described in the present exemplary embodiment is a mere example. The claimed invention is not limited to the described configuration.

Figure 21:
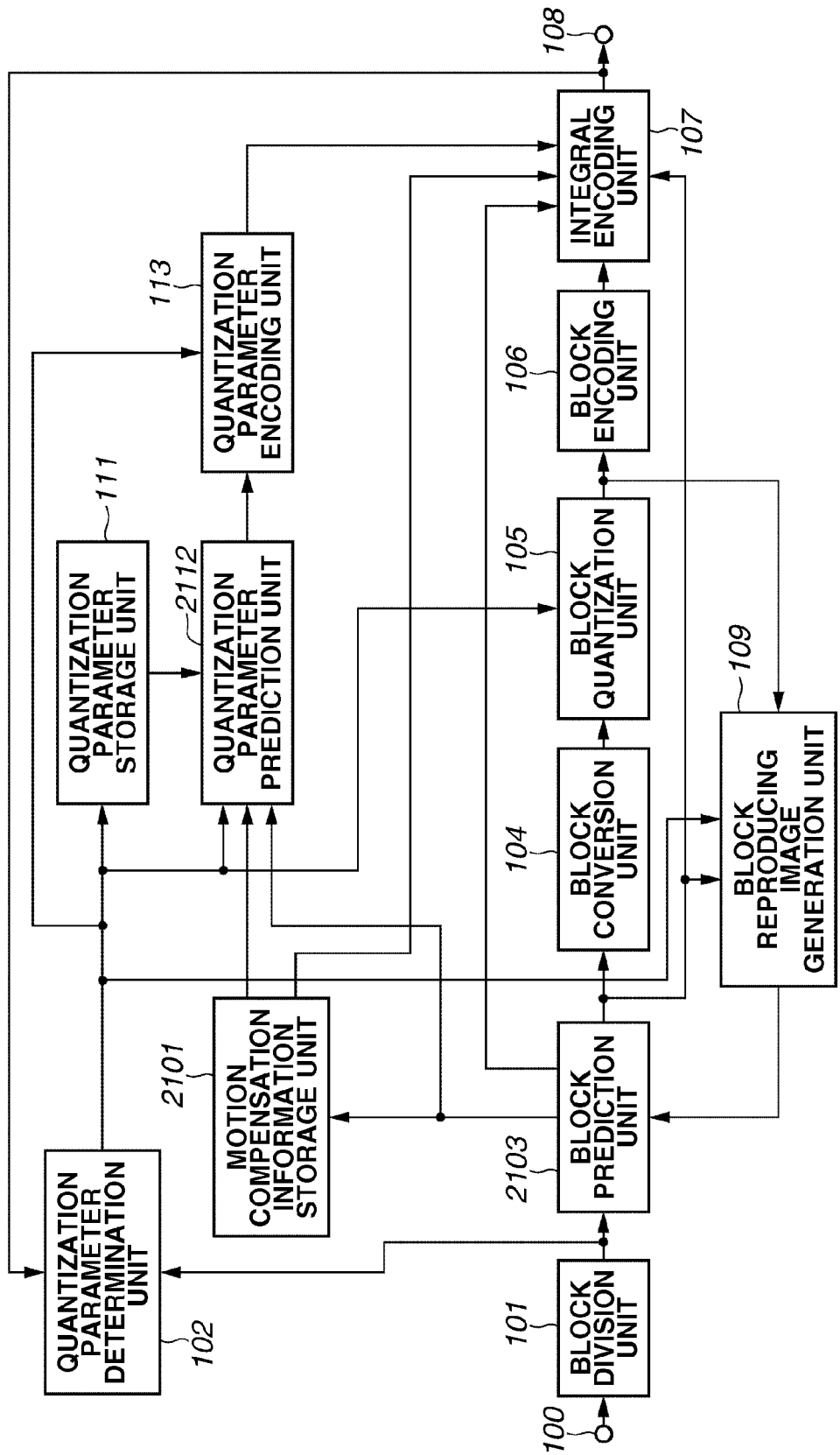
FIG. 21 is a block diagram illustrating an example configuration of an image encoding apparatus according to a fifth exemplary embodiment.

An exemplary embodiment of the claimed invention is described in detail below with reference to the attached drawing. FIG. 21 is a block diagram illustrating an image encoding apparatus according to the present exemplary embodiment. The image encoding apparatus according to the present exemplary embodiment can encode the bit stream generated in the first exemplary embodiment. In FIG. 21, constituent units that are functionally similar to those illustrated in FIG. 1 are denoted by the same numbers and the descriptions thereof are not repeated.

A block prediction unit 2103 can perform prediction for each divided block, similar to the block prediction unit 103 described in the first exemplary embodiment (see FIG. 1). If the encoding target picture is the inter-coded picture, the block prediction unit 2103 can generate motion compensation information that is required in motion compensation. The block prediction unit 2103 performs motion compensation prediction according to the motion compensation information with reference to the preceding and following pictures.

The motion compensation information includes its block prediction mode, L0 prediction reference picture, L1 prediction reference picture, L0 prediction motion vector, and L1 prediction motion vector. In particular, in the present exemplary embodiment, a combination of the reference picture and the motion vector in each of the L0 prediction and the L1 prediction can be regarded as prediction reference information. Similar to the block prediction unit 103 described in the first exemplary embodiment, the block prediction unit 2103 outputs the motion compensation information to a motion compensation information encoding unit 2101 and outputs the block coding mode to an integral encoding unit 2107.

The motion compensation information encoding unit 2101 can encode the motion compensation information, similar to the motion compensation information encoding unit 114 illustrated in FIG. 1 described in the first exemplary embodiment. The motion compensation information encoding unit 2101 is characteristic in its motion vector encoding processing, compared to the motion compensation information encoding unit 114 described in the first exemplary embodiment.

In the present exemplary embodiment, the motion compensation information encoding unit 2101 encodes each motion vector according to the AMVP method discussed in the JCT-VC contribution JCTVC-A205,Draft007. According to the AMVP method, as described above, the motion compensation information encoding unit 2101 predicts and encodes prediction reference information of the encoding target block based on prediction reference information of each peripheral block. The motion compensation information encoding unit 2101 can output motion compensation information encoded data to the integral encoding unit 2107, similar to the motion compensation information encoding unit 114 described in the first exemplary embodiment. Further, the motion compensation information encoding unit 2101 can output predicted prediction reference information to a quantization parameter prediction unit 2112.

The quantization parameter prediction unit 2112 can predict a quantization parameter, similar to the quantization parameter prediction unit 112 illustrated in FIG. 1 described in the first exemplary embodiment. The quantization parameter prediction unit 2112 is configured to predict the quantization parameter based on the prediction reference information received from the motion compensation information encoding unit 2101, different from the first exemplary embodiment.

Similar to the first exemplary embodiment, each input image data is divided into a plurality of blocks and output to the block prediction unit 2103. The block prediction unit 2103 determines a block coding mode, similar to the block prediction unit 103 described in the first exemplary embodiment. Then, the block prediction unit 2103 outputs the block coding mode to the integral encoding unit 107. If the block coding mode is the inter coding, the block prediction unit 2103 further performs motion compensation based on the peripheral block of the encoding target stored in the block reproduced image generation unit 109 and calculates a predicted error.

The block prediction unit 2103 searches for a block that is closest to the encoding target block with reference to a plurality of reference pictures that precedes or follows the encoding target picture, and obtains a motion vector. The obtained motion vector and the reference pictures are collectively referred to as the prediction reference information. The prediction reference information and the block prediction mode constitute the motion compensation information.

The block prediction unit 2103 outputs the motion compensation information to the motion compensation information encoding unit 2101. The motion compensation information encoding unit 2101 compares prediction reference information of the peripheral block with prediction reference information of the encoding target block, and encodes the prediction reference information. Further, the motion compensation information encoding unit 2101 encodes the block coding mode.

An example prediction of the prediction reference information is described below. In the following description, the peripheral block is any one of blocks located on the upper side, the upper left side, and the left side of the encoding target block or the block located at the same position in the previous picture, although the number and the position of the peripheral blocks are not limited to the above-described example.

If two or more peripheral blocks are identical to each other in reference picture and motion vector of prediction reference information, these blocks can be regarded as one. Thus, each prediction candidate of the prediction reference information of the encoding target block can be differentiated in prediction reference information.

For example, it is now assumed that the upper block has a motion vector (2,3) and refers to a picture positioned secondarily preceding the encoding target picture. Similar to the upper block, the upper left block has a motion vector (2,3) and refers to a picture positioned secondarily preceding the encoding target picture. The left block has a motion vector (4,2) and refers to a picture positioned thirdly preceding the encoding target picture. The same position block of the preceding picture has a motion vector (4,2) and refers to a picture positioned secondarily preceding the encoding target picture.

In this case, the first candidate of the prediction reference information of the encoding target block is a picture that has the motion vector (2,3) and refers to a picture positioned secondarily preceding the encoding target picture. The second candidate is a picture that has the motion vector (4,2) and refers to a picture positioned thirdly preceding the encoding target picture.

Reducing the number of prediction candidates as described above is useful in that the signals to be selected in encoding the prediction reference information of the encoding target block can be compressed from 2-bit that selects four to 1-bit that selects two. Each prediction candidate of the prediction reference information of the encoding target block is output to the quantization parameter prediction unit 2112.

The quantization parameter prediction unit 2112 compares the prediction reference information of the encoding target block with the prediction reference information of the above-described peripheral block, and calculates the quantization parameter prediction value based on these peripheral block quantization parameters. The image encoding apparatus according to the present exemplary embodiment performs quantization parameter prediction value calculation processing according to a flowchart similar to that illustrated in FIG. 8, although the processing contents in step S802, step S803, and step S804 are different.

Figure 23:
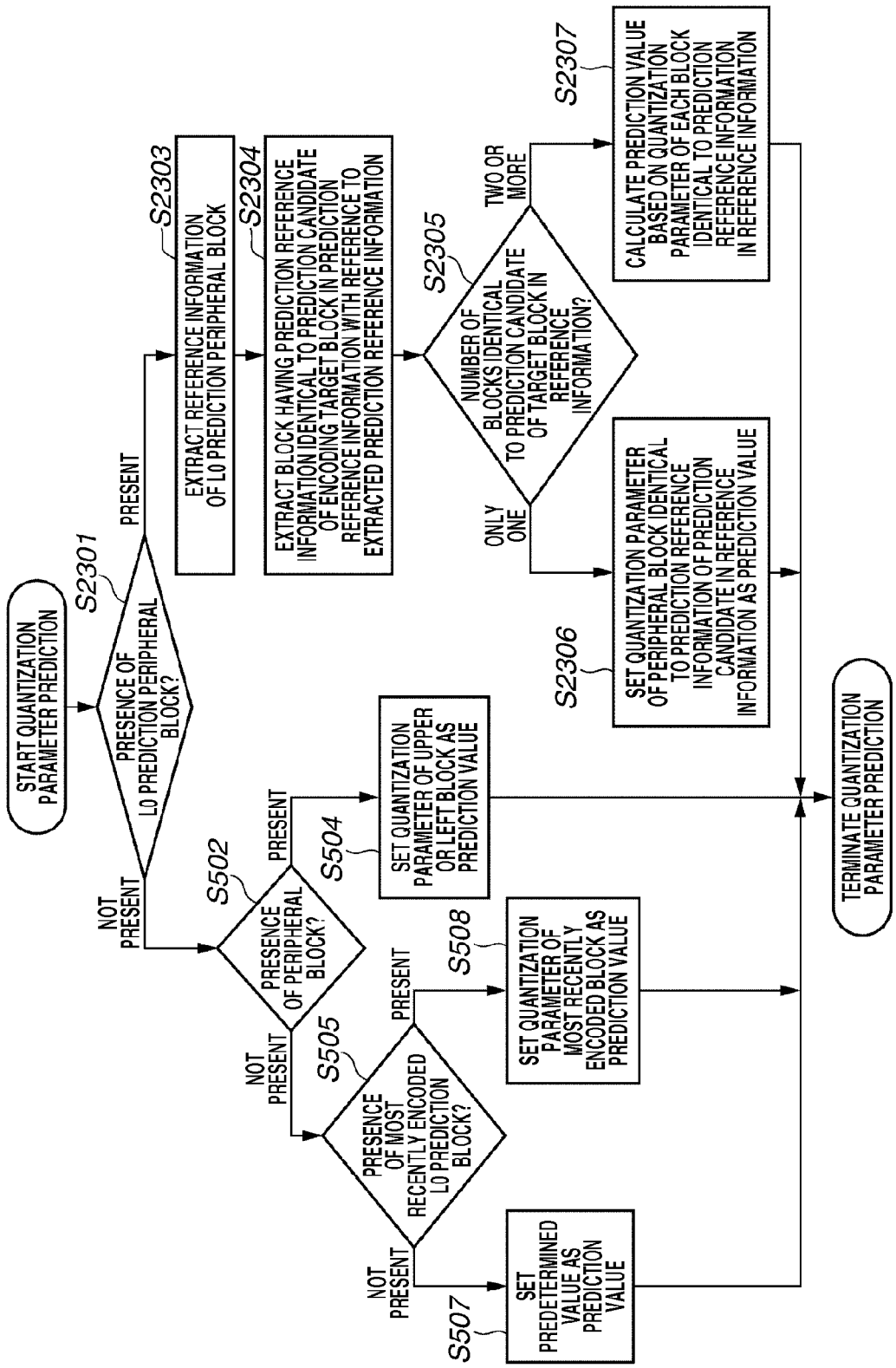
FIG. 23 is a flowchart illustrating an example of quantization parameter prediction processing according to the fifth and sixth exemplary embodiments.
Figure 24:
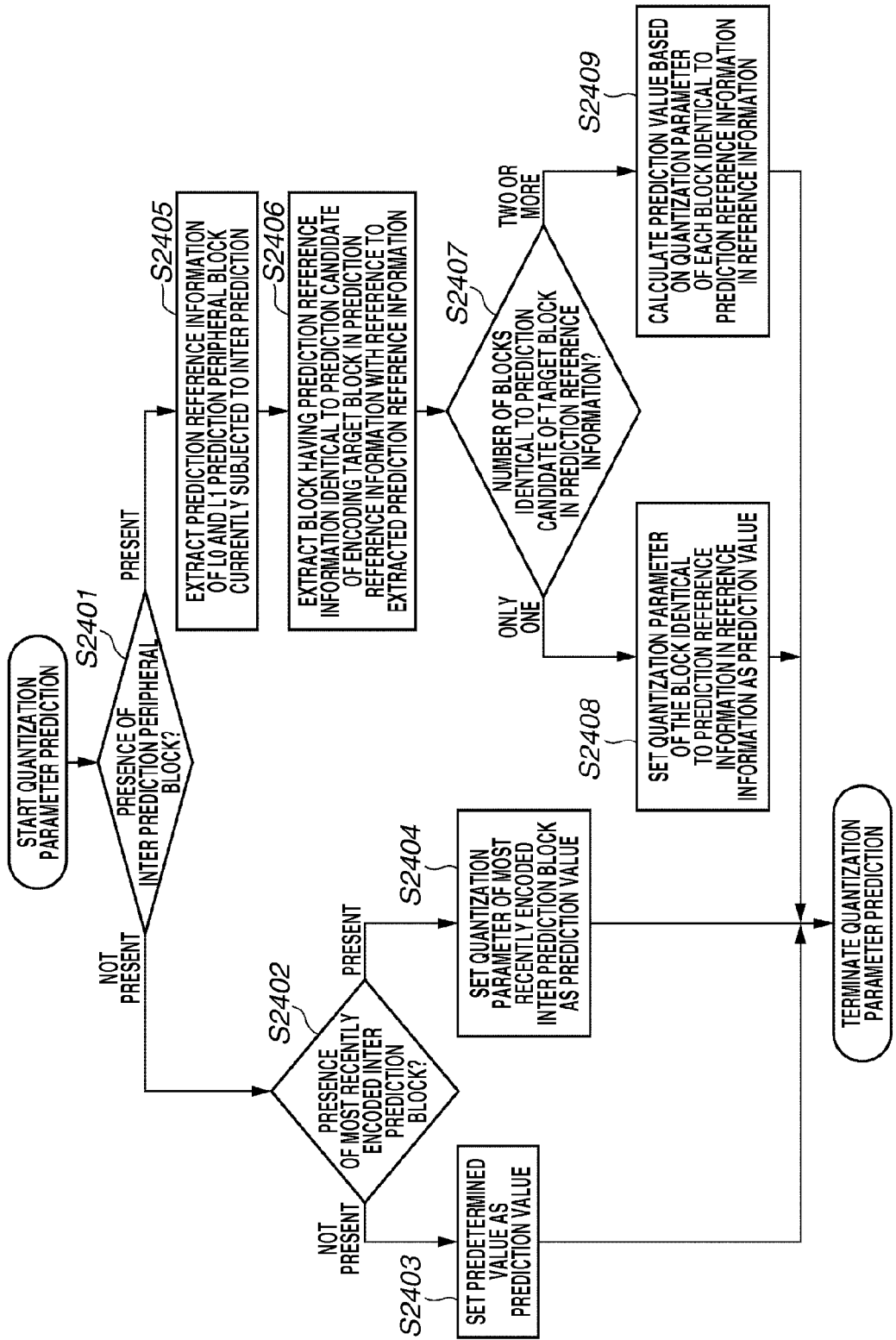
FIG. 24 is a flowchart illustrating an example of the quantization parameter prediction processing according to the fifth and sixth exemplary embodiments.

FIG. 23 is a flowchart illustrating an example of the processing to be performed in step S802 illustrated in FIG. 9. FIG. 24 is a flowchart illustrating an example of the processing to be performed in step S804. Although not illustrated, a flowchart illustrating the processing to be performed in step S803 is similar to the flowchart illustrated in FIG. 23, while the L0 prediction is replaced by the LC prediction and the L0 prediction in step S2301 is replaced by the LC prediction. Therefore, its description is omitted.

In FIG. 23, steps that are functionally similar to those of the flowchart illustrated in FIG. 5 are denoted by the same step numbers and the descriptions thereof are not repeated. In step S2301, the quantization parameter prediction unit 2112 checks the presence of any peripheral block that is currently subjected to the L0 prediction. If it is determined that there is not any peripheral block that is currently subjected to the L0 prediction, the operation proceeds to step S502. If it is determined that there is a L0 prediction peripheral block, the operation proceeds to step S2303.

In step S2303, the quantization parameter prediction unit 2112 extracts the peripheral block that is currently subjected to the L0 prediction. In step S2304, the quantization parameter prediction unit 2112 further extracts any block having prediction reference information identical to that of a prediction candidate selected in encoding the prediction reference information of the encoding target block, with reference to the prediction reference information of the extracted block. As described above, there maybe a plurality of peripheral blocks that is identical to the prediction candidate in motion compensation reference information.

In step S2305, the quantization parameter prediction unit 2112 checks the number of the peripheral blocks that is identical to the prediction candidate in prediction reference information. If it is determined that there is only one peripheral block that is identical to the prediction candidate in prediction reference information, the operation proceeds to step S2306. If in step S2305 it is determined that there are two or more peripheral blocks, the operation proceeds to step S2307.

In step S2306, namely, there is only one peripheral block that is identical to the prediction candidate in prediction reference information (more specifically, the reference picture coincides with the motion vector). In this case, the quantization parameter prediction unit 2112 sets the quantization parameter of the only one same reference information block as the quantization parameter prediction value.

In step S2307, namely, there are two or more peripheral blocks that are identical to the prediction candidate in prediction reference information. In this case, the quantization parameter prediction unit 2112 calculates the quantization parameter prediction value based on the quantization parameter of each identified block. According to the above-described example, if the prediction candidate is the picture that has the motion vector (2,3) and refers to a picture positioned secondarily preceding the encoding target picture, the quantization parameter prediction unit 2112 calculates the quantization parameter prediction value based on the quantization parameter of each of the upper block and the upper left block.

The quantization parameter prediction value calculation method is not limited to a specific method. An appropriate method, e.g., calculating a mean quantization parameter value of coincident peripheral blocks, calculating a median, or setting a quantization parameter of the left block as the quantization parameter prediction value, is employable to calculate the quantization parameter prediction value.

Further, the processing to be performed in step S804 is described with reference to the flowchart illustrated in FIG. 24. In step S2401, the quantization parameter prediction unit 2112 checks the presence of any peripheral block that is currently subjected to the inter prediction. If it is determined that there is not any inter prediction block, the operation proceeds to step S2402. If it is determined that there is only one inter prediction block, the operation proceeds to step S2405.

In step S2402, namely, there is not any peripheral block subjected to the inter prediction. In this case, the quantization parameter prediction unit 2112 checks the presence of the most recently encoded inter prediction block. If it is determined that the most recently encoded inter prediction block is not present, the operation proceeds to step S2403. If the most recently encoded inter prediction block is present, the operation proceeds to step S2404. In step S2403, namely, there is not any block that can be referred to. In this case, the quantization parameter prediction unit 2112 sets a predetermined value as the quantization parameter prediction value. In step S2404, the quantization parameter prediction unit 2112 sets the quantization parameter of the most recently encoded inter prediction block as the quantization parameter prediction value.

On the other hand, in step S2401, if it is determined that there is a peripheral block currently subjected to the inter prediction, the prediction of the prediction reference information according to the AMVP method is already performed. In step S2405, the quantization parameter prediction unit 2112 extracts prediction reference information of the identified inter prediction block. Further, in step S2406, the quantization parameter prediction unit 2112 extracts any peripheral block that is identical to the prediction candidate of the encoding target block in prediction reference information with reference to the extracted prediction reference information.

In step S2407, the quantization parameter prediction unit 2112 checks the number of peripheral blocks extracted in step S2406. If it is determined that the number of the extracted peripheral blocks is only one, the operation proceeds to step S2408. If it is determined that a plurality of peripheral blocks has been extracted, the operation proceeds to step S2409. In step S2408, namely, there is only one peripheral block that is identical to the prediction candidate of the encoding target block in prediction reference information. In this case, the quantization parameter prediction unit 2112 sets the quantization parameter of the identified block as the quantization parameter prediction value.

In step S2409, namely, there are two or more peripheral blocks that are identical to the prediction candidate of the encoding target block in prediction reference information. In this case, the quantization parameter prediction unit 2112 calculates the quantization parameter prediction value based on the quantization parameter of each identified block. The quantization parameter prediction value calculation method is not limited to a specific method. For example, an appropriate method, e.g., calculating a mean quantization parameter value of the peripheral blocks extracted in step S2406, calculating a median, or setting a quantization parameter of the left block as the quantization parameter prediction value, is employable to calculate the quantization parameter prediction value.

Referring back to FIG. 8, the quantization parameter prediction unit 2112 terminates the quantization parameter prediction value calculation processing. Referring back to FIG. 21, the quantization parameter prediction unit 2112 outputs the calculated quantization parameter prediction value to the quantization parameter encoding unit 113. Similar to the first exemplary embodiment, the quantization parameter encoding unit 113 calculates a difference between the quantization parameter of the encoding target block determined by the quantization parameter determination unit 102 and the input quantization parameter prediction value. The quantization parameter encoding unit 113 encodes the obtained difference, and generates a quantization parameter encoded data. The integral encoding unit 107 incorporates the generated quantization parameter encoded data into a bit stream and outputs the bit stream to an external device via the output terminal 108.

A flowchart illustrating image encoding processing that can be performed by an image encoding apparatus according to the sixth exemplary embodiment is similar to that illustrated in FIG. 2.

Figure 22:
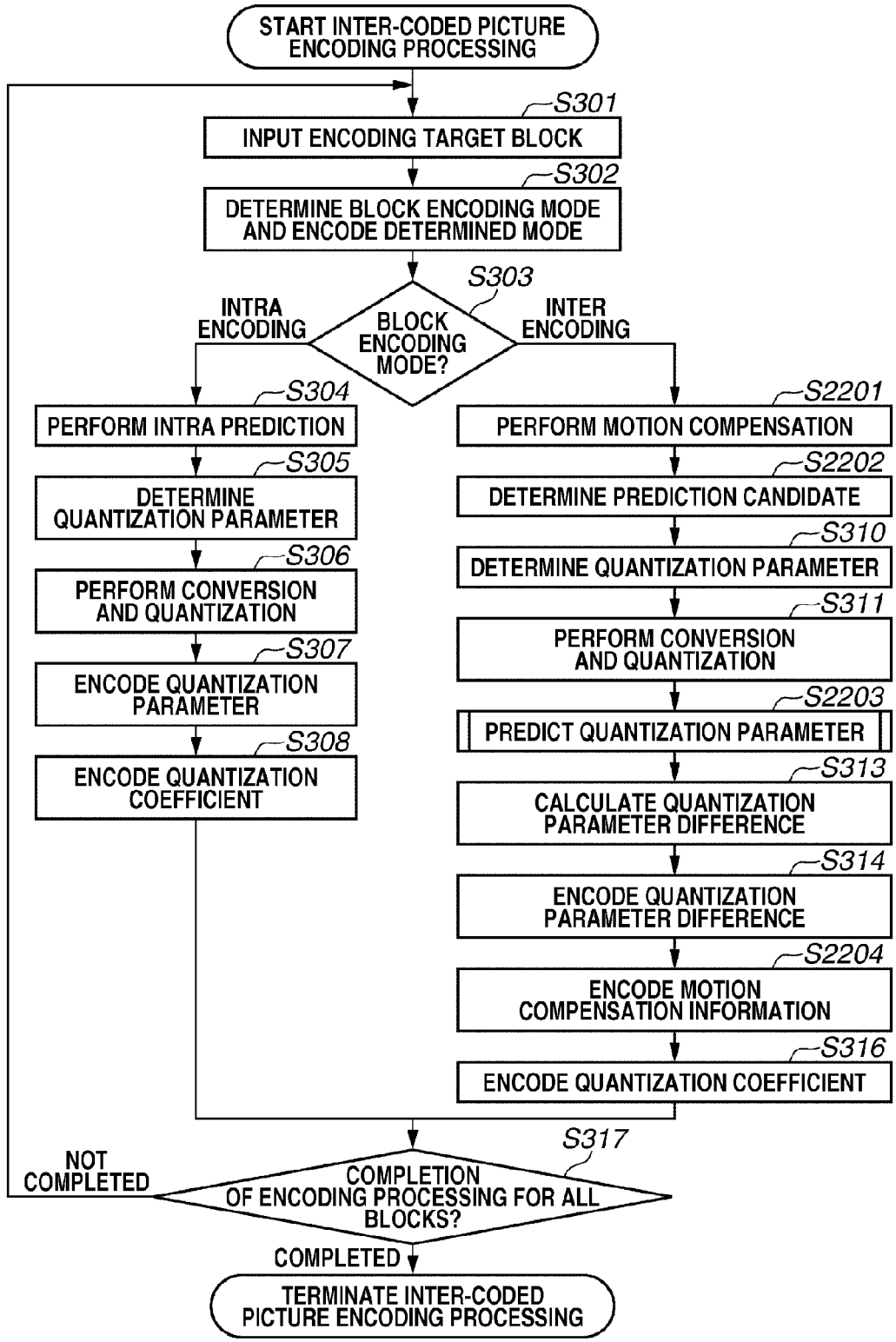
FIG. 22 is a flowchart illustrating an example of inter-coded picture encoding processing that can be performed by the image encoding apparatus according to the fifth exemplary embodiment.

FIG. 22 is a flowchart illustrating an example of the inter-coded picture encoding processing that can be performed by the image encoding apparatus according to the sixth exemplary embodiment. In FIG. 22, steps that are functionally similar to those of the flowchart illustrated in FIG. 3 described in the first exemplary embodiment are denoted by the same step numbers and the descriptions thereof are not repeated.

If instep S303 it is determined that the block coding mode is the inter encoding that uses the motion compensation in encoding, the operation proceeds to step S2201. In step S2201, the image encoding apparatus searches for a vector moving in the encoding target block and other reference picture. The image encoding apparatus selects an optimum block prediction mode, and determines prediction reference information including the motion vector and the reference picture. The image encoding apparatus determines motion compensation information based on the prediction reference information and the block prediction mode, and performs motion compensation prediction, and further calculates a predicted error.

In step S2202, the image encoding apparatus determines a prediction candidate to be used in encoding the prediction reference information of the encoding target block according to the AMVP method. In step S2203, the image encoding apparatus predicts the quantization parameter to encode the quantization parameter and calculates the quantization parameter prediction value. In the present exemplary embodiment, the image encoding apparatus performs processing of the flowcharts illustrated in FIG. 8, FIG. 23, and FIG. 24 to calculate the quantization parameter prediction value.

In step S313 and step S314, the image encoding apparatus calculates the quantization parameter difference value and encodes the calculated quantization parameter difference value to generate a quantization parameter encoded data. In step S2204, the image encoding apparatus encodes the motion compensation information determined instep S2201. The image encoding apparatus predicts and encodes the prediction reference information calculated in step S2201 using the prediction candidate determined in step S2202. The image encoding apparatus performs encoding (including the block coding mode) and generates a motion compensation information encoded data.

The image encoding apparatus having the above-described configuration and performing the above-described operations can encode a quantization parameter difference value of each block according to the motion compensation information (in particular, according to the prediction reference information (e.g., motion vector or reference picture)). The image encoding apparatus according to the present exemplary embodiment can improve the coding efficiency, for an object included in an encoding target, by predicting the quantization parameter according to the motion in the object and a block prediction mode that represents the motion.

The processing illustrated in FIG. 22 includes the prediction of the prediction reference information to be performed prior to the quantization parameter determination. However, the order of each processing is not limited to the above-described example. It is useful to perform parallel processing. It is also useful to perform the above-described processing in parallel or after completing the transform and quantization processing.

In the present exemplary embodiment, the image encoding apparatus has performed the quantization parameter prediction processing based on the prediction reference information. However, as an alternative embodiment, the image encoding apparatus can simply predict the motion vector of the encoding target block based on only the motion vector. Further, a prediction candidate derived from the motion vector of a peripheral block is usable.

Although the AMVP-based technique has been described in the present exemplary embodiment, the claimed invention is not limited to the illustrated example. According to the H.264-based technique, a prediction vector of the motion vector of the encoding target block can be obtained by calculating a median of the upper, upper right, and left motion vectors. The obtained prediction vector can be encoded as a prediction candidate.

Figure 25:
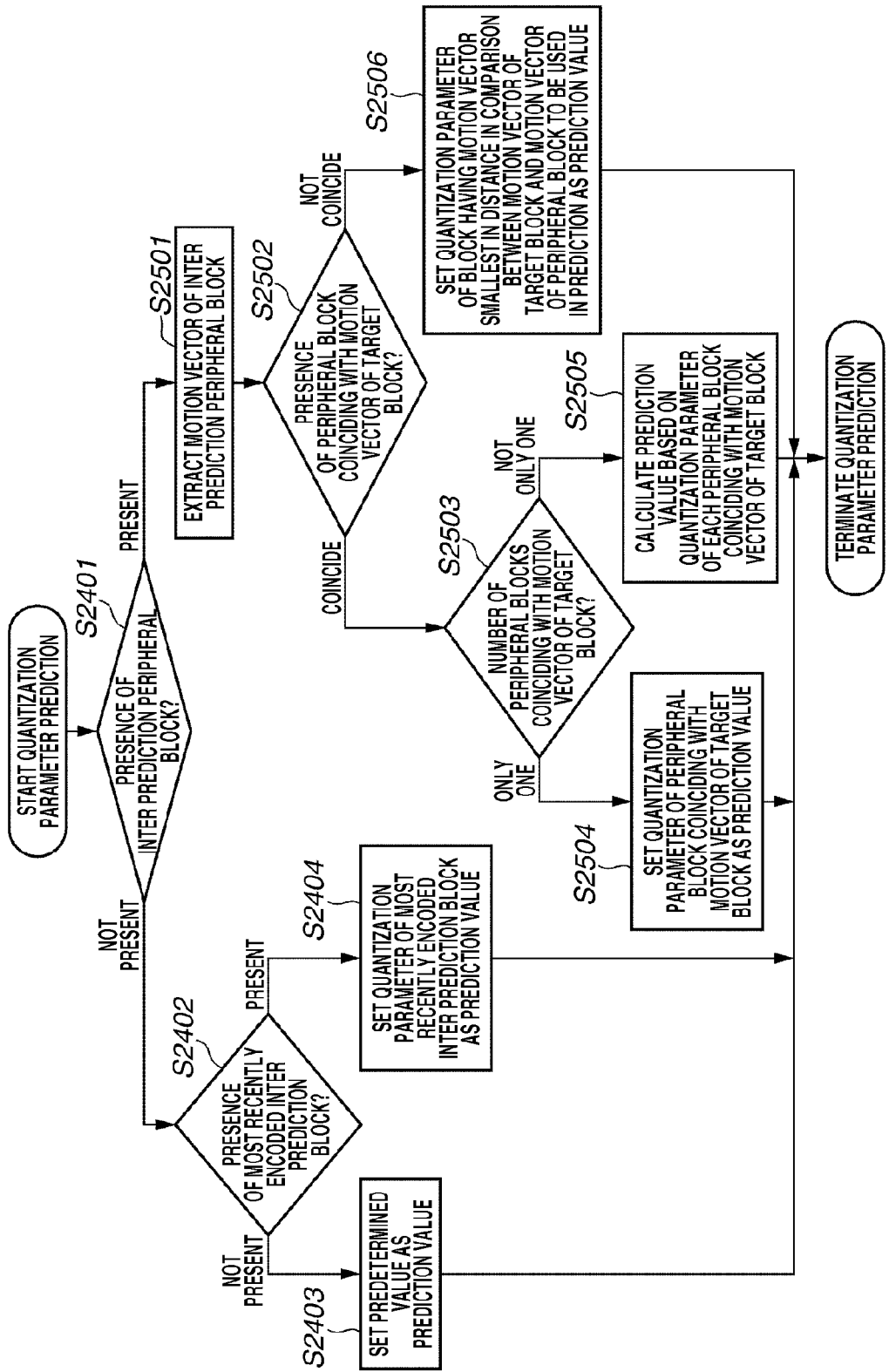
FIG. 25 is a flowchart illustrating an example of the quantization parameter prediction processing according to the fifth and sixth exemplary embodiments.

FIG. 25 is a flowchart illustrating an example of the quantization parameter prediction value calculation processing that can be performed in a case where the present exemplary embodiment is applied to the H.264-based technique. In FIG. 25, steps that are functionally similar to those of the flowchart illustrated in FIG. 24 are denoted by the same step numbers and the descriptions thereof are not repeated.

In step S2501, the image encoding apparatus extracts an inter prediction block from each peripheral block. In step S2502, the image encoding apparatus checks the presence of any peripheral block whose motion vector coincides with the prediction vector of the motion vector of the encoding target block. If it is determined that there is a peripheral block having the coincident motion vector, the operation proceeds to step S2503. If it is determined that there is not any peripheral block having the coincident motion vector, the operation proceeds to step S2506. In step S2503, the image encoding apparatus checks the number of peripheral blocks whose motion vector coincides with the prediction vector of the motion vector of the encoding target block. If it is determined that there is only one peripheral block having the coincident motion vector, the operation proceeds to step S2504. If it is determined that there are two or more peripheral blocks having the coincident motion vector, the operation proceeds to step S2505.

In step S2504, namely, there is only one peripheral block whose motion vector coincides with the prediction vector of the motion vector of the encoding target block. The image encoding apparatus sets the quantization parameter of the only one coincident peripheral block as the quantization parameter prediction value. In step S2505, the image encoding apparatus calculates the quantization parameter prediction value by obtaining a mean quantization parameter value of the peripheral blocks whose motion vector coincides with the prediction vector of the motion vector of the encoding target block. In step S2506, the image encoding apparatus compares the motion vector of the inter prediction peripheral block extracted in step S2501 with the motion vector of the encoding target block, and sets the quantization parameter of a peripheral block whose motion vector is smallest in distance as the quantization parameter prediction value.

It is understood that, when the image encoding apparatus performs the above-described operation, the present exemplary embodiment is applicable to the H.264-based technique.

Figure 26:
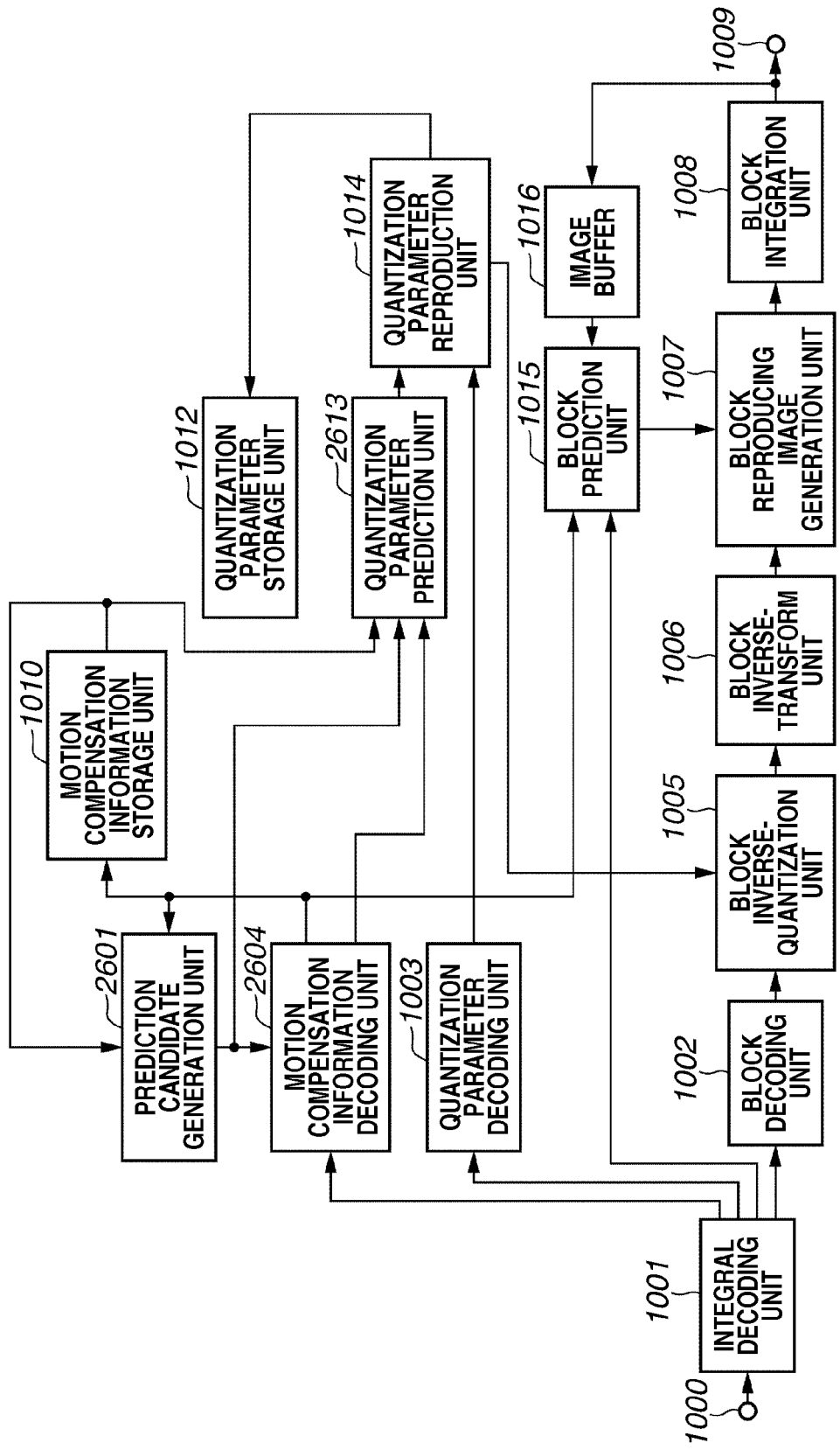
FIG. 26 is a block diagram illustrating an example configuration of an image decoding apparatus according to a seventh exemplary embodiment.

An image processing apparatus according to a seventh exemplary embodiment of the claimed invention is described in detail below with reference to FIG. 26 and FIG. 27. The system configuration described in the present exemplary embodiment is a mere example. The claimed invention is not limited to the described configuration. FIG. 26 is a block diagram illustrating an image decoding apparatus according to the present exemplary embodiment. The image decoding apparatus according to the present exemplary embodiment can decode the bit stream generated by the image encoding apparatus described in the sixth exemplary embodiment. In FIG. 26, constituent units that are functionally similar to those of the block diagram illustrated in FIG. 10 described in the third exemplary embodiment are denoted by the same numbers and the descriptions thereof are not repeated.

A prediction candidate generation unit 2601 stores the prediction reference information of each peripheral block and can generate a prediction candidate from the stored prediction reference information to decode the prediction reference information of the decoding target block. The generated prediction candidate information can be input to a motion compensation information decoding unit 2604 and a quantization parameter prediction unit 2613. The motion compensation information decoding unit 2604 can decode motion compensation information encoded data and can generate motion compensation information, similar to the motion compensation information decoding unit 1004 described in the third exemplary embodiment. However, the motion compensation information decoding unit 2604 can generate the prediction reference information using the prediction candidate, different from the third exemplary embodiment.

The quantization parameter prediction unit 2613 can perform quantization parameter prediction value calculation processing, which is characteristic in using the prediction candidate, compared to the quantization parameter prediction unit described in the third exemplary embodiment.

An image decoding operation that can be performed by the above-described image decoding apparatus is described in detail below.

Similar to the third exemplary embodiment, if the integral decoding unit 1001 receives a bit stream via the input the input terminal 1000, the integral decoding unit 1001 decodes the sequence header and the picture header and separates the quantization coefficients encoded data, the quantization parameter encoded data, and the motion compensation information encoded data. The separated motion compensation information encoded data is output to the motion information decoding unit 2604.

The motion information decoding unit 2604 decodes the motion compensation information encoded data of the decoding target block. The motion information decoding unit 2604 receives the prediction candidate from the prediction candidate generation unit 2601 and generates prediction reference information of the decoded motion compensation information. The prediction candidate generation unit 2601 uses peripheral blocks positioned on the upper side, the upper left side, and the left side of the decoding target block and the same position block of the preceding picture, as described in the sixth exemplary embodiment. The prediction candidate generation unit 2601 generates mutually different prediction candidates having prediction reference information of the decoding target block based on the motion compensation information of these blocks stored in the motion compensation information storage unit 1010.

The quantization parameter prediction unit 2613 receives the motion compensation information of each peripheral block from the motion compensation information storage unit 1010 and the motion compensation information from the motion compensation information decoding unit 2604. Further, the quantization parameter prediction unit 2613 receives the prediction candidate from the prediction candidate generation unit 2601 and the peripheral block quantization parameter from the quantization parameter holding unit 1012.

The quantization parameter prediction unit 2613 selects a prediction candidate based on the reproduced motion compensation information of the decoding target block, and compares the prediction reference information of the selected prediction candidate with the motion compensation information of each peripheral block to calculate the quantization parameter prediction value based on the quantization parameter of the peripheral block. To calculate the quantization parameter prediction value, the quantization parameter prediction unit 2613 can perform processing similar to that described in the sixth exemplary embodiment with reference to FIG. 23, FIG. 24, and FIG. 25, although the description thereof is not repeated. The quantization parameter prediction value calculated by the quantization parameter prediction unit 2613 is output to the quantization parameter reproduction unit 1014. The quantization parameter reproduction unit 1014 generates a quantization parameter.

A flowchart illustrating image decoding processing that can be performed by an image decoding apparatus according to the seventh exemplary embodiment is similar to that illustrated in FIG. 11.

Figure 27:
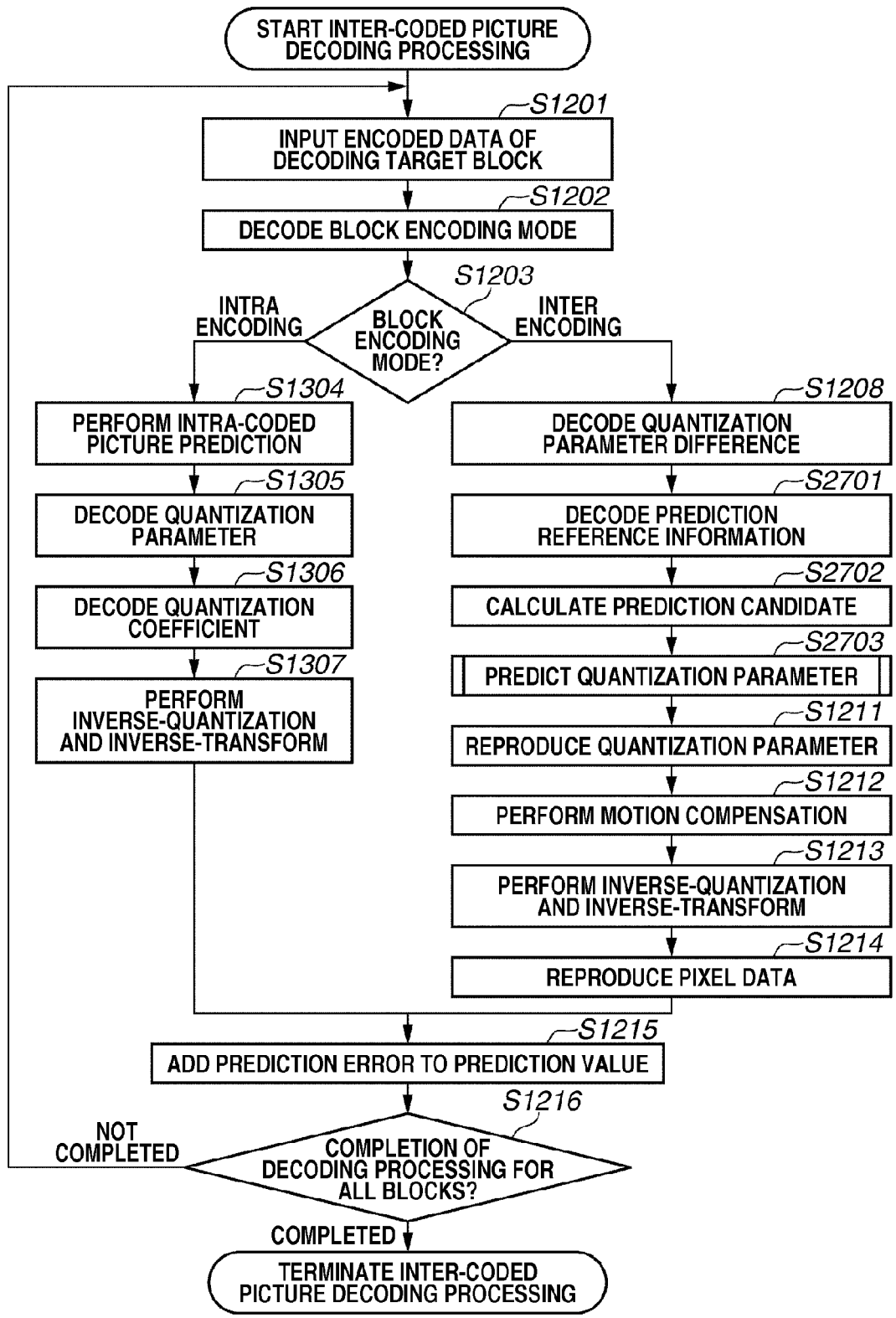
FIG. 27 is a flowchart illustrating an example of image decoding processing that can be performed by the image decoding apparatus according to the seventh exemplary embodiment.

FIG. 27 is a flowchart illustrating an example of the inter-coded picture decoding processing that can be performed by the image decoding apparatus according to the seventh exemplary embodiment. In FIG. 27, steps that are functionally similar to those of the flowchart illustrated in FIG. 12 described in the third exemplary embodiment are denoted by the same step numbers and the descriptions thereof are not repeated.

In step S1203, if it is determined that the block coding mode is the inter encoding that uses the motion compensation in encoding, the operation proceeds to step S1208. In step S1208, similar to the third exemplary embodiment, the image decoding apparatus decodes the motion compensation information encoded data of the decoding target block and reproduces the motion compensation information. In step S2701, the image decoding apparatus extracts the prediction reference information encoded data from the motion compensation information encoded data and decodes the extracted prediction reference information encoded data.

In step S2702, the image decoding apparatus obtains a prediction candidate based on the prediction reference information of the peripheral block. In step S2703, the image decoding apparatus predicts a quantization parameter from the peripheral block of the decoding target block to reproduce the quantization parameter and calculates the quantization parameter prediction value. More specifically, the image decoding apparatus determines a quantization parameter serving as the quantization parameter prediction value by comparing the prediction candidate obtained in step S2702 with the prediction reference information of the peripheral block and calculates the quantization parameter prediction value.

In this case, the image decoding apparatus calculates the quantization parameter prediction value through the processing of the flowcharts illustrated in FIG. 23, FIG. 24, and FIG. 25 described in the sixth exemplary embodiment. In step S2312, the image decoding apparatus reproduces the motion compensation information of the decoding target block based on the processing result in step S2701 and the prediction candidate obtained in step S2702. Then, the image decoding apparatus performs motion compensation and generates a predicted error. Subsequently, in step S1213 to step S1215, the image decoding apparatus reproduces an image data.

The image decoding apparatus having the above-described configuration and performing the above-described operations can obtain an optimum quantization parameter prediction value that is necessary in decoding a bit stream subjected to the encoding of a quantization parameter difference value on the block-by-block basis according to the motion compensation information (in particular, according to the prediction reference information and the prediction candidate). Thus, the image decoding apparatus according to the present exemplary embodiment can reproduce a decoded image by predicting the quantization parameter according to the motion in the object and a block prediction mode that represents the motion.

In the above-described exemplary embodiments, respective processing units have been described as hardware devices (see FIG. 1, FIG. 10, FIG. 21, and FIG. 26). Alternatively, computer programs are employable to realize processing that is comparable to the processing realized by the processing units illustrated in these drawings. An eighth exemplary embodiment is described below.

Figure 28:
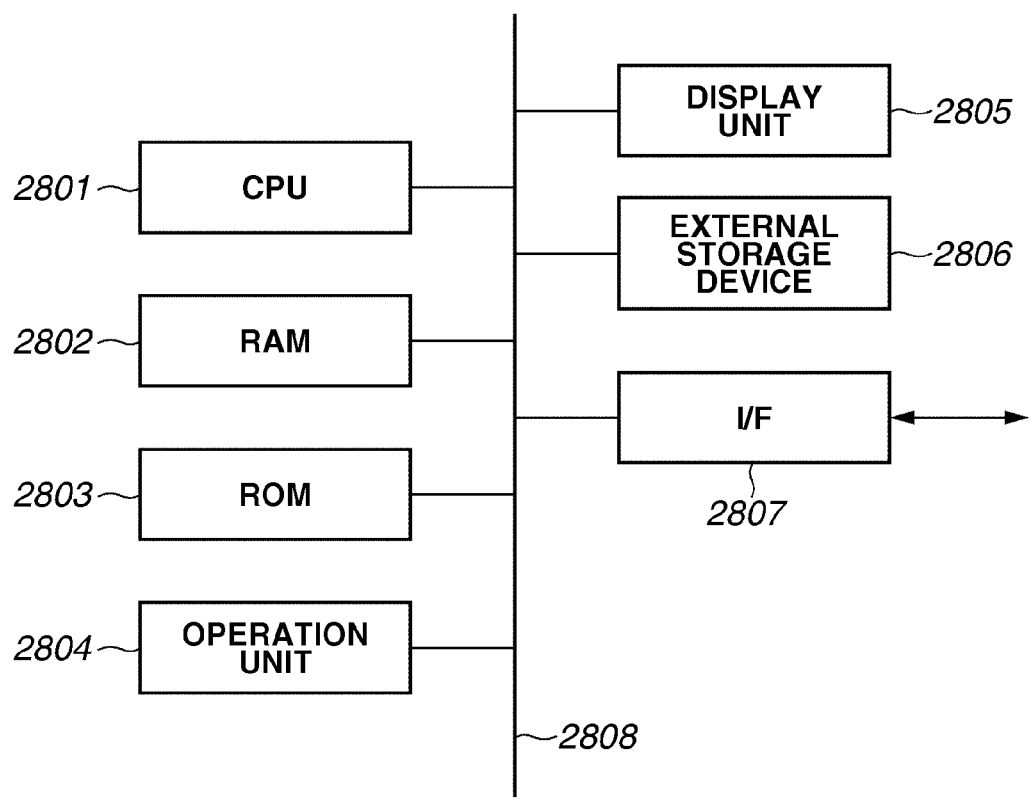
FIG. 28 is a block diagram illustrating an example hardware configuration of a computer that is applicable to the image encoding apparatus or the image decoding apparatus according to an example of the invention.
Figure 29:
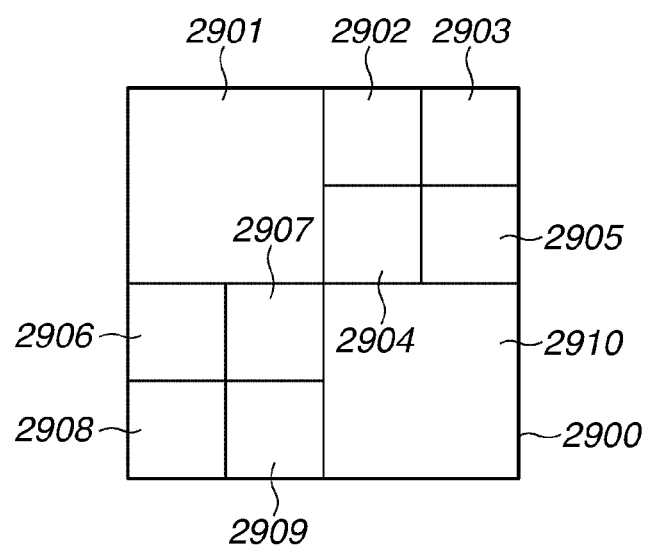
FIG. 29 illustrates an example of divided blocks.

FIG. 28 is a block diagram illustrating an example hardware configuration of a computer that can be applied to the image processing apparatus described in the above-described exemplary embodiments.

A central processing unit (CPU) 2801 can perform various controls to be performed by the computer, using computer program codes and data that are stored in a random access memory (RAM) 2802 and a read only memory (ROM) 2803. The CPU 2801 can execute the processing to be performed by the image processing apparatus described in each of the above-described exemplary embodiments. More specifically, the CPU 2801 is functionally operable as respective processing units illustrated in FIG. 1, FIG. 10, FIG. 21, and FIG. 26.

The RAM 2802 has a predetermined storage area, which is usable to temporarily store computer program codes and data loaded from an external storage device 2806 and data acquired from an external device via an interface (I/F) 2809. Further, the RAM 2802 has a work area, which is usable when the CPU 2801 executes various processing. More specifically, the RAM 2802 can provide a specific area, for example, allocated as a frame memory, or can appropriately provide other various areas.

The ROM 2803 stores setting data and a boot program of the computer. An operation unit 2804 includes a keyboard and a mouse, which enable a user of the computer to operate and input various instructions to the CPU 2801. A display unit 2805 can display a result of the processing performed by the CPU 2801. The display unit 2805 is, for example, a hold-type display device (e.g., a liquid crystal display device) or an impulse-type display device (e.g., field emission type display device).

The external storage device 2806 is a massive information storage device, which is represented by a hard disk drive. The external storage device 2806 stores an operating system (OS) and computer program codes that enable the CPU 2801 to realize the functions of respective units illustrated in FIG. 1, FIG. 10, FIG. 21, and FIG. 26. Further, each processing target (e.g., each image data) can be stored in the external storage device 2806.

Under the control of the CPU 2801, the computer program codes and data stored in the external storage device 2806 can be appropriately loaded into the RAM 2802 when they are processed as a processing target by the CPU 2801. An interface 2807 is connectable to a network (e.g., a local area network (LAN) or the internet) and other devices (e.g., a projection device and a display device). The computer illustrated in FIG. 28 can acquire and output various types of information via the interface 2807. The above-described functional units 2801 to 2807 are connected via a bus 2808.

The operation by the above-described configuration is chiefly controlled by the CPU 2801 to realize the operations described with reference to the above-described flowcharts.

<Other Exemplary Embodiment> an example of the claimed invention can be realized by supplying a storage medium storing computer program codes, which can realize the above-described functions, to a system and causing the system to read and execute the computer program codes. In this case, computer program codes read from the storage medium can realize the functions of the above-described exemplary embodiments. The storage medium storing the computer program codes can constitute an example of the claimed invention. Further, when an operating system (OS) running on the computer performs a part or the whole of actual processing based on instructions of the program codes, the above-described functions can be realized by the processing of the operating system.

Further, the following configuration is employable to realize an example of the claimed invention. More specifically, the computer program codes read out of a storage medium can be written into a memory of a function expansion card inserted into a slot of a computer or into a function expansion unit connected to the computer. Then, based on instructions of the computer program codes, a CPU provided on the function expansion card or the function expansion unit can execute a part or the whole of actual processing so that the functions of the above-described exemplary embodiments can be realized.

In a case where an example of the claimed invention is applied to the above-described storage medium, the computer program codes that correspond to the above-described flowcharts are stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-243938 filed Nov. 7, 2011, which is hereby incorporated by reference herein in its entirety.

What is claimed is:

1. An encoding method comprising for a picture:
   performing motion compensation processing for a target block to be encoded in a target picture using first information of motion compensation which is obtained based on at least one of pictures that temporally precede and follow the picture;
   transforming a result of the performing motion compensation to generate a transform coefficients for the target block;
   quantizing the transform coefficients using a first quantization parameter for the target block; and
   encoding a difference value between the first quantization parameter and a second quantization parameter for a peripheral block of the target block, the second quantization parameter being selected based on the first information of motion compensation and second information of motion compensation which is used for performing motion compensation processing for the peripheral block.

2. The encoding method according to claim 1, wherein
   the first information of motion compensation includes information of at least one of a motion vector, a reference picture, and a prediction mode for performing motion compensation processing for the target block, and
   the second information of motion compensation includes information of at least one of a motion vector, a reference picture, and a prediction mode for performing motion compensation processing for the peripheral block.

3. The encoding method according to claim 1, wherein the first information of motion compensation includes a prediction mode used for performing motion compensation processing for the target block, the prediction mode indicating a forward prediction, a backward prediction, or a bidirectional prediction.

4. The encoding method according to claim 1, wherein the first information of motion compensation includes information of a prediction mode which is used for performing motion compensation processing for the target block,
   the second information of motion compensation includes information of a prediction mode which is used for performing motion compensation processing for the peripheral block, and
   the second quantization parameter is a quantization parameter of the peripheral block whose prediction mode is the same as the prediction mode of the target block.

5. The encoding method according to claim 1, wherein the first information of motion compensation includes information of a reference picture which is used for performing motion compensation processing for the target block,
   the second information of motion compensation includes information of a reference which is used for performing motion compensation processing for the peripheral block, and
   the second quantization parameter is a quantization parameter of the peripheral block whose reference picture is same as a reference picture of the encoding target block.

6. The encoding method according to claim 1, wherein the first information of motion compensation includes information of a motion vector and a reference picture which is used for performing motion compensation processing for the target block,
   the second information of motion compensation includes information of a motion vector and a reference picture which is used for performing motion compensation processing for the peripheral block, and
   the second quantization parameter is a quantization parameter of the peripheral block of the encoding target block whose motion vector is the similar to a motion vector of the target block and whose reference picture coincides with a prediction candidate of reference picture of the target block.

7. The encoding method according to claim 1, further comprising
   encoding the first information of motion compensation to generate encoding data relating to motion compensation.

8. The encoding method according to claim 1, further comprising
   obtaining the first information of motion compensation which is used for performing motion compensation processing for the target block.

9. The encoding method according to claim 1, further comprising
   obtaining the first information of motion compensation including a prediction mode which is used for performing motion compensation processing for the target block; and
   obtaining a number of blocks whose prediction mode which is the same as the obtained prediction mode of the target block, the blocks being the peripheral blocks of the target block
   wherein encoding the difference value between the first quantization parameter and the second quantization parameter, the second quantization parameter being selected based on the obtained number of blocks.

* * * * *